United States Patent
Li et al.

(10) Patent No.: US 10,712,867 B2
(45) Date of Patent: Jul. 14, 2020

(54) PIXELATED SELF-CAPACITANCE WATER REJECTION

(71) Applicant: Apple Inc., Cupertino, CA (US)

(72) Inventors: Yingxuan Li, Saratoga, CA (US); Weijun Yao, San Jose, CA (US); Vivek Pant, San Jose, CA (US); Martin Paul Grunthaner, Los Altos Hills, CA (US); Marduke Yousefpor, San Jose, CA (US); Sumant Ranganathan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 15/522,737

(22) PCT Filed: Oct. 27, 2015

(86) PCT No.: PCT/US2015/057644
§ 371 (c)(1),
(2) Date: Apr. 27, 2017

(87) PCT Pub. No.: WO2016/069642
PCT Pub. Date: May 6, 2016

(65) Prior Publication Data
US 2018/0275824 A1 Sep. 27, 2018

Related U.S. Application Data

(60) Provisional application No. 62/069,231, filed on Oct. 27, 2014.

(51) Int. Cl.
*G06F 3/041* (2006.01)
*G06F 3/044* (2006.01)
*G06F 3/0354* (2013.01)

(52) U.S. Cl.
CPC ........ *G06F 3/0418* (2013.01); *G06F 3/03547* (2013.01); *G06F 3/044* (2013.01); *G06F 3/0412* (2013.01)

(58) Field of Classification Search
CPC .. G06F 3/03547; G06F 3/0412; G06F 3/0418; G06F 3/044
See application file for complete search history.

(56) References Cited

U.S. PATENT DOCUMENTS

| 4,087,625 | A | 5/1978 | Dym et al. |
| 4,090,092 | A | 5/1978 | Serrano |

(Continued)

FOREIGN PATENT DOCUMENTS

| CN | 1246638 A | 3/2000 |
| CN | 1527274 A | 9/2004 |

(Continued)

OTHER PUBLICATIONS

Final Office Action dated Jul. 27, 2018, for U.S. Appl. No. 15/097,179, filed Apr. 12, 2016, 11 pages.

(Continued)

*Primary Examiner* — Hong Zhou
(74) *Attorney, Agent, or Firm* — Kubota & Basol LLP

(57) ABSTRACT

A touch sensor panel is disclosed. In some examples, the touch sensor panel comprises a plurality of touch node electrodes. In some examples, the touch sensor panel comprises a touch controller configured to drive and sense the plurality of touch node electrodes in a fully bootstrapped configuration to obtain a fully bootstrapped touch image, drive and sense the plurality of touch node electrodes in a second configuration, different from the fully bootstrapped configuration, to obtain a second touch image, the second touch image including an effect of water on the touch sensor panel, and determine a final touch image based on the fully (Continued)

bootstrapped touch image and the second touch image, the final touch image not including the effect of the water on the touch sensor panel. In some examples, the second configuration comprises a mutual capacitance configuration. In some examples, the second configuration comprises a partially bootstrapped configuration.

19 Claims, 34 Drawing Sheets

(56) References Cited

U.S. PATENT DOCUMENTS

| | | |
|---|---|---|
| 4,304,976 A | 12/1981 | Gottbreht et al. |
| 4,475,235 A | 10/1984 | Graham |
| 4,550,221 A | 10/1985 | Mabusth |
| 4,659,874 A | 4/1987 | Landmeier |
| 5,194,862 A | 3/1993 | Edwards |
| 5,317,919 A | 6/1994 | Awtrey |
| 5,483,261 A | 1/1996 | Yasutake |
| 5,488,204 A | 1/1996 | Mead et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,914,465 A | 6/1999 | Allen et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,239,788 B1 | 5/2001 | Nohno et al. |
| 6,310,610 B1 | 10/2001 | Beaton et al. |
| 6,323,846 B1 | 11/2001 | Westerman et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,412,586 B1 | 8/2008 | Rajopadhye et al. |
| 7,504,833 B1 | 3/2009 | Seguine |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,719,523 B2 | 5/2010 | Hillis |
| 7,701,539 B2 | 8/2010 | Shih et al. |
| 7,907,126 B2 | 3/2011 | Yoon et al. |
| 7,932,898 B2 | 4/2011 | Philipp et al. |
| 8,026,904 B2 | 9/2011 | Westerman |
| 8,040,321 B2 | 10/2011 | Peng et al. |
| 8,040,326 B2 | 10/2011 | Hotelling et al. |
| 8,045,783 B2 | 10/2011 | Lee et al. |
| 8,058,884 B2 | 11/2011 | Betancourt |
| 8,068,097 B2 | 11/2011 | GuangHai |
| 8,120,371 B2 | 2/2012 | Day et al. |
| 8,125,312 B2 | 2/2012 | Orr |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,507,811 B2 | 8/2013 | Hotelling et al. |
| 8,508,495 B2 | 8/2013 | Hotelling et al. |
| 8,537,126 B2 | 9/2013 | Yousefpor et al. |
| 8,542,208 B2 | 9/2013 | Krah et al. |
| 8,593,410 B2 | 11/2013 | Hong et al. |
| 8,593,425 B2 | 11/2013 | Hong et al. |
| 8,614,688 B2 | 12/2013 | Chang |
| 8,680,877 B2 | 3/2014 | Lee et al. |
| 8,760,412 B2 | 6/2014 | Hotelling et al. |
| 8,773,146 B1 * | 7/2014 | Hills ................. G01N 27/22 |
| | | 324/658 |
| 8,810,543 B1 | 8/2014 | Kurikawa |
| 8,884,917 B2 | 11/2014 | Seo |
| 8,902,172 B2 | 12/2014 | Peng et al. |
| 8,922,521 B2 | 12/2014 | Hotelling et al. |
| 8,957,874 B2 | 2/2015 | Elias |
| 8,976,133 B2 | 3/2015 | Yao et al. |
| 8,982,096 B2 | 3/2015 | Hong et al. |
| 8,982,097 B1 * | 3/2015 | Kuzo ................. G06F 3/0418 |
| | | 345/174 |
| 9,001,082 B1 | 4/2015 | Rosenberg et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,261,997 B2 | 2/2016 | Chang et al. |
| 9,280,251 B2 | 3/2016 | Shih |
| 9,292,137 B2 | 3/2016 | Kogo |
| 9,329,674 B2 | 5/2016 | Lee et al. |
| 9,329,723 B2 | 5/2016 | Benbasat et al. |
| 9,372,576 B2 | 6/2016 | Westerman |
| 9,582,131 B2 | 2/2017 | Elias |
| 9,690,397 B2 | 6/2017 | Shepelev et al. |
| 9,874,975 B2 | 1/2018 | Benbasat et al. |
| 9,880,655 B2 | 1/2018 | O'Connor |
| 9,886,141 B2 | 2/2018 | Yousefpor |
| 2002/0152048 A1 | 10/2002 | Hayes |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0188151 A1 | 9/2004 | Gerpheide et al. |
| 2004/0239650 A1 | 12/2004 | Mackey |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |

(56) References Cited

U.S. PATENT DOCUMENTS

| | | |
|---|---|---|
| 2007/0268275 A1 | 11/2007 | Westerman et al. |
| 2007/0279395 A1 | 12/2007 | Philipp |
| 2007/0283832 A1 | 12/2007 | Hotelling |
| 2007/0285365 A1 | 12/2007 | Lee |
| 2008/0006454 A1 | 1/2008 | Hotelling |
| 2008/0007533 A1 | 1/2008 | Hotelling |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0070681 A1 | 3/2009 | Dawes et al. |
| 2009/0073138 A1 | 3/2009 | Lee et al. |
| 2009/0085894 A1 | 4/2009 | Gandhi et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1 | 7/2009 | Westerman |
| 2009/0174688 A1 | 7/2009 | Westerman |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey, IV et al. |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0156846 A1 | 6/2010 | Long et al. |
| 2010/0182278 A1 | 7/2010 | Li et al. |
| 2010/0194696 A1 | 8/2010 | Chang et al. |
| 2010/0194697 A1 | 8/2010 | Hotelling et al. |
| 2010/0194707 A1 | 8/2010 | Hotelling et al. |
| 2010/0245286 A1 | 9/2010 | Parker |
| 2010/0253638 A1 | 10/2010 | Yousefpor et al. |
| 2010/0328248 A1 | 12/2010 | Mozdzyn |
| 2010/0328263 A1 | 12/2010 | Lin |
| 2011/0006832 A1* | 1/2011 | Land ................ G06F 3/044 327/517 |
| 2011/0007020 A1 | 1/2011 | Hong et al. |
| 2011/0025623 A1 | 2/2011 | Lin |
| 2011/0025629 A1* | 2/2011 | Grivna ............. G06F 3/0416 345/173 |
| 2011/0025635 A1 | 2/2011 | Lee |
| 2011/0096016 A1 | 4/2011 | Yilmaz |
| 2011/0134050 A1 | 6/2011 | Harley |
| 2011/0199105 A1 | 8/2011 | Otagaki et al. |
| 2011/0227874 A1 | 9/2011 | Faahraeus et al. |
| 2011/0231139 A1 | 9/2011 | Yokota |
| 2011/0241907 A1 | 10/2011 | Cordeiro |
| 2011/0248949 A1 | 10/2011 | Chang et al. |
| 2011/0254795 A1 | 10/2011 | Chen et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050206 A1 | 3/2012 | Welland |
| 2012/0050214 A1* | 3/2012 | Kremin ............. G06F 3/0418 345/174 |
| 2012/0050216 A1 | 3/2012 | Kremin et al. |
| 2012/0054379 A1 | 3/2012 | Leung et al. |
| 2012/0056662 A1 | 3/2012 | Wilson et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0113047 A1 | 5/2012 | Hanauer et al. |
| 2012/0146726 A1 | 6/2012 | Huang |
| 2012/0146942 A1 | 6/2012 | Kamoshida et al. |
| 2012/0154324 A1 | 6/2012 | Wright et al. |
| 2012/0162133 A1 | 6/2012 | Chen et al. |
| 2012/0162134 A1 | 6/2012 | Chen et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2012/0313881 A1 | 12/2012 | Ge et al. |
| 2012/0320385 A1 | 12/2012 | Mu et al. |
| 2013/0015868 A1 | 1/2013 | Peng |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1* | 2/2013 | Chang ................ G06F 3/044 345/174 |
| 2013/0057511 A1 | 3/2013 | Shepelev et al. |
| 2013/0069911 A1 | 3/2013 | You |
| 2013/0076648 A1 | 3/2013 | Krah et al. |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |

(56) References Cited

U.S. PATENT DOCUMENTS

| | | | |
|---|---|---|---|
| 2013/0176271 A1 | 7/2013 | Sobel et al. |
| 2013/0176273 A1 | 7/2013 | Li et al. |
| 2013/0215049 A1 | 8/2013 | Lee |
| 2013/0234964 A1 | 9/2013 | Kim et al. |
| 2013/0257785 A1 | 10/2013 | Brown et al. |
| 2013/0257797 A1 | 10/2013 | Wu et al. |
| 2013/0265276 A1 | 10/2013 | Obeidat et al. |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0307821 A1 | 11/2013 | Kogo |
| 2013/0321289 A1 | 12/2013 | Dubery et al. |
| 2013/0342479 A1 | 12/2013 | Pyo et al. |
| 2014/0002406 A1 | 1/2014 | Cormier et al. |
| 2014/0009438 A1 | 1/2014 | Liu et al. |
| 2014/0022201 A1 | 1/2014 | Boychuk |
| 2014/0043546 A1 | 2/2014 | Yamazaki et al. |
| 2014/0071084 A1 | 3/2014 | Sugiura |
| 2014/0078096 A1 | 3/2014 | Tan et al. |
| 2014/0104225 A1 | 4/2014 | Davidson et al. |
| 2014/0104228 A1 | 4/2014 | Chen et al. |
| 2014/0125628 A1 | 5/2014 | Yoshida et al. |
| 2014/0132560 A1 | 5/2014 | Huang et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0168540 A1 | 6/2014 | Wang et al. |
| 2014/0204058 A1* | 7/2014 | Huang .............. G06F 3/044 345/174 |
| 2014/0240291 A1 | 8/2014 | Nam |
| 2014/0247245 A1 | 9/2014 | Lee |
| 2014/0253470 A1 | 9/2014 | Havilio |
| 2014/0267070 A1 | 9/2014 | Shahparnia et al. |
| 2014/0267146 A1 | 9/2014 | Chang et al. |
| 2014/0285469 A1* | 9/2014 | Wright .............. G06F 1/3262 345/174 |
| 2014/0347574 A1 | 11/2014 | Tung et al. |
| 2014/0362034 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0015528 A1 | 1/2015 | Vandermeijden |
| 2015/0026398 A1 | 1/2015 | Kim |
| 2015/0042600 A1* | 2/2015 | Lukanc ............. G06F 3/0412 345/174 |
| 2015/0042607 A1 | 2/2015 | Takanohashi |
| 2015/0049043 A1 | 2/2015 | Yousefpor |
| 2015/0049044 A1 | 2/2015 | Yousefpor |
| 2015/0077375 A1 | 3/2015 | Hotelling et al. |
| 2015/0091587 A1 | 4/2015 | Shepelev et al. |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0227240 A1 | 8/2015 | Hong et al. |
| 2015/0242028 A1 | 8/2015 | Roberts et al. |
| 2015/0248177 A1 | 9/2015 | Maharyta |
| 2015/0253907 A1 | 9/2015 | Elias |
| 2015/0268789 A1 | 9/2015 | Liao et al. |
| 2015/0268795 A1 | 9/2015 | Kurasawa et al. |
| 2015/0309610 A1 | 10/2015 | Rabii et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0018348 A1 | 1/2016 | Yau et al. |
| 2016/0048234 A1* | 2/2016 | Chandran .......... G06F 3/044 345/174 |
| 2016/0062533 A1 | 3/2016 | O'Connor |
| 2016/0139728 A1 | 5/2016 | Jeon et al. |
| 2016/0154505 A1 | 6/2016 | Chang |
| 2016/0154529 A1 | 6/2016 | Westerman |
| 2016/0224177 A1 | 8/2016 | Krah |
| 2016/0224189 A1 | 8/2016 | Yousefpor et al. |
| 2016/0246423 A1 | 8/2016 | Fu |
| 2016/0266676 A1 | 9/2016 | Wang et al. |
| 2016/0266679 A1 | 9/2016 | Shahparnia et al. |
| 2016/0283023 A1 | 9/2016 | Shin et al. |
| 2016/0299603 A1 | 10/2016 | Tsujioka et al. |
| 2016/0357344 A1 | 12/2016 | Benbasat et al. |
| 2017/0090619 A1 | 3/2017 | Yousefpor |
| 2017/0097703 A1 | 4/2017 | Lee |
| 2017/0139539 A1 | 5/2017 | Yao et al. |
| 2017/0168626 A1 | 6/2017 | Konicek |
| 2017/0285804 A1 | 10/2017 | Yingxuan et al. |
| 2018/0067584 A1 | 3/2018 | Zhu et al. |
| 2018/0307374 A1 | 10/2018 | Shah et al. |
| 2018/0307375 A1 | 10/2018 | Shah et al. |

FOREIGN PATENT DOCUMENTS

| | | |
|---|---|---|
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101419516 A | 4/2009 |
| CN | 102023768 A | 4/2011 |
| CN | 103049148 A | 4/2013 |
| CN | 103294321 A | 9/2013 |
| CN | 103809810 A | 5/2014 |
| CN | 104020908 A | 9/2014 |
| DE | 11 2008 001 245 T5 | 3/2010 |
| EP | 0 853 230 A1 | 7/1998 |
| EP | 1 192 585 A1 | 4/2002 |
| EP | 1 192 585 B1 | 4/2002 |
| EP | 1 573 706 A2 | 2/2004 |
| EP | 1 573 706 A3 | 2/2004 |
| EP | 1 455 264 A2 | 9/2004 |
| EP | 1 455 264 A3 | 9/2004 |
| EP | 1 644 918 A2 | 12/2004 |
| EP | 1 717 677 A2 | 11/2006 |
| EP | 1 717 677 A3 | 11/2006 |
| EP | 1 986 084 A1 | 10/2008 |
| EP | 2 077 489 A1 | 7/2009 |
| EP | 2 256 606 A2 | 12/2010 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2005-301373 A | 10/2005 |
| JP | 2007-018515 A | 1/2007 |
| JP | 2008-510251 A | 4/2008 |
| JP | 2008-225415 A | 9/2008 |
| KR | 10-20040091728 A | 10/2004 |
| KR | 10-20070002327 A | 1/2007 |
| KR | 10-2008-0019125 A | 3/2008 |
| KR | 10-2013-0094495 A | 8/2013 |
| KR | 10-2013-0117499 A | 10/2013 |
| KR | 10-2014-0074454 A | 6/2014 |
| KR | 10-1609992 B1 | 4/2016 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |
| TW | M344544 | 11/2008 |
| TW | 201115442 A1 | 5/2011 |
| TW | 201401129 A | 1/2014 |
| TW | 201419071 A | 5/2014 |
| WO | WO-99/35633 A2 | 7/1999 |

(56) References Cited

FOREIGN PATENT DOCUMENTS

| | | |
|---|---|---|
| WO | WO-01/097204 A1 | 12/2001 |
| WO | WO-2005/114369 A2 | 12/2005 |
| WO | WO-2005/114369 A3 | 12/2005 |
| WO | WO-2006/020305 A2 | 2/2006 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/066488 A1 | 6/2007 |
| WO | WO-2007/089766 A2 | 8/2007 |
| WO | WO-2007/115032 A2 | 10/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/047990 A1 | 4/2008 |
| WO | WO-2008/076237 A2 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | WO-2011/137200 A1 | 11/2011 |
| WO | WO-2013/158570 A1 | 10/2013 |
| WO | WO-2014/127716 A1 | 8/2014 |
| WO | WO-2015/017196 A1 | 2/2015 |
| WO | WO-2015/023410 A1 | 2/2015 |
| WO | WO-2015/072722 A1 | 5/2015 |
| WO | WO-2015/107969 A1 | 7/2015 |
| WO | WO-2015/178920 A1 | 11/2015 |
| WO | WO-2016/048269 A1 | 3/2016 |
| WO | WO-2016/069642 A1 | 5/2016 |
| WO | WO-2016/126525 A1 | 8/2016 |
| WO | WO-2016/144437 A1 | 9/2016 |
| WO | WO-2017/058415 A1 | 4/2017 |

OTHER PUBLICATIONS

Non-Final Office Action dated Jun. 20, 2018, for U.S. Appl. No. 15/009,774, filed Jan. 28, 2016, 17 pages.
Final Office Action dated May 14, 2018, for U.S. Appl. No. 15/006,987, filed Jan. 26, 2016, 11 pages.
Final Office Action dated May 17, 2018, for U.S. Appl. No. 15/017,463, filed Feb. 5, 2016, 22 pages.
Final Office Action dated Dec. 5, 2017, for U.S. Appl. No. 15/006,987, filed Jan. 26, 2016, 16 pages.
Non-Final Office Action dated Dec. 22, 2017 , for U.S Appl. No. 14/993,017, filed Jan. 11, 2016, 23 pages.
Notice of Allowance dated Oct. 3, 2017, for U.S. Appl. No. 14/082,003, filed Nov. 15, 2013, nine pages.
Notice of Allowance dated Oct. 13, 2017, for U.S. Appl. No. 14/558,529, filed Dec. 2, 2014, eight pages.
Non-Final Office Action dated Sep. 14, 2017 , for U.S. Appl. No. 15/017,463, filed Feb. 5, 2016, 22 pages.
Notice of Allowance dated Sep. 20, 2017, for U.S. Appl. No. 14/082,003, filed Nov. 15, 2013, eight pages.
Notice of Allowance dated Sep. 20, 2017, for U.S Appl. No. 15/144,706, filed May 2, 2016, nine pages.
Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.
Chinese Search Report completed Dec. 14, 2011, for CN Patent Application No. ZL201020108330X, filed Feb. 2, 2010, with English Translation, 12 pages.
Chinese Search Report completed May 18, 2015, for CN Patent Application No. 201310042816.6, filed Feb. 2, 2010, two pages.
European Search Report dated Jul. 21, 2010, for EP Patent Application 10151969.2, three pages.
European Search Report dated Apr. 25, 2012, for EP Patent Application No. 08022505.5, 12 pages.
European Search Report dated Dec. 3, 2012, for EP Patent Application No. 12162177.5, seven pages.
European Search Report dated Feb. 13, 2013, for EP Patent Application No. 12192450.0, six pages.
European Search Report dated Aug. 31, 2015, for EP Application No. 15166813.4, eight pages.
Final Office Action dated Jan. 5, 2012, for U.S. Appl. No. 12/206,680, filed Sep. 8, 2008, 15 pages.
Final Office Action dated Jan. 3, 2013, for U.S. Appl. No. 11/818,498, filed Jun. 13, 2007, 17 pages.
Final Office Action dated Feb. 1, 2013, for U.S. Appl. No. 12/642,466, filed Dec. 18, 2009, nine pages.
Final Office Action dated Feb. 5, 2013, for U.S. Appl. No. 12/500,911, filed Jul. 10, 2009, 15 pages.
Final Office Action dated Apr. 30, 2013, for U.S. Appl. No. 12/494,173, filed Jun. 29, 2009, 7 pages.
Final Office Action dated May 22, 2013, for U.S. Appl. No. 12/206,680, filed Sep. 8, 2008, 16 pages.
Final Office Action dated Jun. 21, 2013, for U.S. Appl. No. 12/545,754, filed Aug. 21, 2009, 6 pages.
Final Office Action dated Jul. 19, 2013, for U.S. Appl. No. 12/545/604, filed Aug. 21, 2009, 17 pages.
Final Office Action dated Aug. 12, 2013, for U.S. Appl. No. 12/238,333, filed Sep. 25, 2008, 19 pages.
Final Office Action dated Aug. 13, 2013, for U.S. Appl. No. 12/238,342, filed Sep. 25, 2008, 14 pages.
Final Office Action dated Jan. 27, 2014, for U.S. Appl. No. 12/206,680, filed Sep. 8, 2008, 20 pages.
Final Office Action dated Apr. 23, 2014 for U.S. Appl. No. 12/847,987, filed Jul. 30, 2010, 16 pages.
Final Office Action dated May 9, 2014, for U.S. Appl. No. 12/642,466, filed Dec. 18, 2009, 13 pages.
Final Office Action dated Jul. 16, 2014, for U.S. Appl. No. 12/545,604, filed Aug. 21, 2009, 18 pages.
Final Office Action dated Oct. 22, 2014, for U.S. Appl. No. 12/238,342, filed Sep. 25, 2008, 16 pages.
Final Office Action dated Oct. 22, 2014, for U.S. Appl. No. 13/448,182, filed Apr. 16, 2012, 11 pages.
Final Office Action dated Apr. 22, 2015, for U.S. Appl. No. 12/238,333, filed Sep. 25, 2008, 23 pages.
Final Office Action dated Jun. 11, 2015, for U.S. Appl. No. 13/448,182, filed Apr. 16, 2012, 12 pages.
Final Office Action dated Nov. 12, 2015, for U.S. Appl. No. 14/082,074, filed Nov. 15, 2013, 22 pages.
Final Office Action dated Jan. 4, 2016, for U.S. Appl. No. 14/082,003, filed Nov. 15, 2013, 25 pages.
Final Office Action dated Jan. 29, 2016, for U.S. Appl. No. 12/642,466, filed Dec. 18, 2009, nine pages.
Final Office Action dated Apr. 8, 2016, for U.S. Appl. No. 13/899,391, filed May 21, 2013, ten pages.
Final Office Action dated May 9, 2016, for U.S. Appl. No. 14/318,157, filed Jun. 27, 2014, ten pages.
Final Office Action dated May 27, 2016, for U.S. Appl. No. 14/645,120, filed Mar. 11, 2015, twelve pages.
Final Office Action dated Jun. 14, 2016, for U.S. Appl. No. 14/550,686, filed Nov. 21, 2014, ten pages.
Final Office Action dated Sep. 29, 2016, for U.S. Appl. No. 14/558,529, filed Dec. 2, 2014, 22 pages.
Final Office Action dated Nov. 4, 2016, for U.S. Appl. No. 14/082,003, filed Nov. 15, 2013, 18 pages.
International Search Report dated Mar. 10, 2010, for PCT Application No. PCT/US2010/22868, filed Feb. 2, 2010, three pages.
International Search Report dated Jan. 14, 2011, for PCT Application No. PCT/US2010/029698, filed Apr. 1, 2010, 4 pages.
International Search Report dated May 2, 2011, for PCT Application No. PCT/US2010/058988, filed Dec. 3, 2010, five pages.

(56) References Cited

OTHER PUBLICATIONS

International Search Report dated Aug. 6, 2013, for PCT Application No. PCT/US2013/036662, filed Apr. 15, 2013, three pages.
International Search Report dated Jan. 29, 2015, for PCT Application No. PCT/US2014/047888, filed Jul. 23, 2014, six pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04, ACM* pp. 289-296.
Non-Final Office Action dated Feb. 4, 2011, for U.S. Appl. No. 12/038,760, filed Feb. 27, 2008, 18 pages.
Non-Final Office Action dated Jun. 9, 2011, for U.S. Appl. No. 12/206,680, filed Sep. 8, 2008, 13 pages.
Non-Final Office Action dated Mar. 9, 2012, for U.S. Appl. No. 12/238,342, filed Sep. 25, 2008, 26 pages.
Non-Final Office Action dated May 3, 2012, for U.S. Appl. No. 12/238,333, filed Sep. 25, 2008, 22 pages.
Non-Final Office Action dated May 25, 2012, for U.S. Appl. No. 11/818,498, filed Jun. 13, 2007, 16 pages.
Non-Final Office Action dated Jun. 7, 2012, for U.S. Appl. No. 12/500,911, filed Jul. 10, 2009, 16 pages.
Non-Final Office Action dated Aug. 28, 2012, for U.S. Appl. No. 12/642,466, filed Dec. 18, 2009, nine pages.
Non-Final Office Action dated Sep. 26, 2012, for U.S. Appl. No. 12/206,680, filed Sep. 8, 2008, 14 pages.
Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Nov. 28, 2012, for U.S. Appl. No. 12/494,173, filed Jun. 29, 2009, six pages.
Non-Final office Action dated Jan. 7, 2013, for U.S. Appl. No. 12/545,604, filed Aug. 21, 2009, 12 pages.
Non-Final Office Action dated Jan. 7, 2013, for U.S. Appl. No. 12/238,333, filed Sep. 25, 2008, 20 pages.
Non-Final Office Action dated Feb. 15, 2013, for U.S. Appl. No. 12/238,342, filed Sep. 25, 2008, 15 pages.
Non-Final Office Action dated Mar. 29, 2013 for U.S. Appl. No. 13/737,779, filed Jan. 9, 2013, nine pages.
Non-Final Office Action dated Sep. 6, 2013, for U.S. Appl. No. 12/847,987, filed Jul. 30, 2010, 15 pages.
Non-Final Office Action dated Sep. 10, 2013, for U.S. Appl. No. 12/545,754, filed Aug. 21, 2009, six pages.
Non-Final Office Action dated Sep. 30, 2013, for U.S. Appl. No. 12/206,680, filed Sep. 8, 2008, 18 pages.
Non-Final Office Action dated Nov. 8, 2013, for U.S. Appl. No. 12/642,466, filed Dec. 18, 2009, 12 pages.
Non-Final Office Action dated Dec. 19, 2013, for U.S. Appl. No. 12/545,604, filed Aug. 21, 2009, 17 pages.
Non-Final Office Action dated Jan. 2, 2014, for U.S. Appl. No. 12/545,754, filed Aug. 21, 2009, 11 pages.
Non-Final Office Action dated Jan. 3, 2014 , for U.S. Appl. No. 12/545,557, filed Aug. 21, 2009, 9 pages.
Non-Final Office Action dated Jan. 31, 2014, for U.S. Appl. No. 13/448,182 filed Apr. 16, 2012, 18 pages.
Non-Final Office Action dated Mar. 12, 2014, for U.S. Appl. No. 12/238,342, filed Sep. 25, 2008, 15 pages.
Non-Final Office Action dated Apr. 10, 2014, for U.S. Appl. No. 14/055,717, filed Oct. 16, 2013, 10 pages.
Non-Final Office Action dated Sep. 18, 2014, for U.S. Appl. No. 12/238,333, filed Sep. 25, 2008, 21 pages.
Non-Final Office Action dated Apr. 10, 2015, for U.S. Appl. No. 14/082,074, filed Nov. 15, 2013, 23 pages.
Non-Final Office Action dated May 4, 2015, for U.S. Appl. No. 12/642,466, filed Dec. 18, 2009, nine pages.
Non-Final Office Action dated May 8, 2015, for U.S. Appl. No. 14/082,003, filed Nov. 15, 2013, 25 pages.
Non-Final Office Action dated Aug. 20, 2015 , for U.S. Appl. No. 14/550,686, filed Nov. 21, 2014, ten pages.
Non-Final Office Action dated Oct. 5, 2015, for U.S. Appl. No. 13/899,391, filed May 21, 2013, ten pages.
Non-Final Office Action dated Oct. 6, 2015, for U.S. Appl. No. 14/318,157, filed Jun. 27, 2014, seven pages.
Non-Final Office Action dated Oct. 27, 2015, for U.S. Appl. No. 14/645,120, filed Mar. 11, 2015, eight pages.
Non-Final Office Action dated Apr. 14, 2016, for U.S. Appl. No. 14/558,529, filed Dec. 2, 2014, twenty pages.
Non-Final Office Action dated May 25, 2016, for U.S. Appl. No. 14/082,003, filed Nov. 15, 2013, 23 pages.
Non-Final Office Action dated Jun. 1, 2016, for U.S. Appl. No. 14/615,186, filed Feb. 5, 2015, eight pages.
Non-Final Office Action dated Dec. 14, 2016, for U.S. Appl. No. 14/550,686, filed Nov. 21, 2014, eight pages.
Non-Final Office Action dated Dec. 16, 2016, for U.S. Appl. No. 14/645,120, filed Mar. 11, 2015, ten pages.
Non-Final Office Action dated Dec. 19, 2016, for U.S. Appl. No. 14/318,157, filed Jun. 27, 2014, eleven pages.
Non-Final Office Action dated Mar. 13, 2017, for U.S. Appl. No. 14/082,003, filed Nov. 15, 2013, 20 pages.
Non-Final Office Action dated Apr. 7, 2017, for U.S. Appl. No. 15/144,706, filed May 2, 2016, eight pages.
Notice of Allowance dated Jun. 10, 2013, for U.S. Appl. No. 12/545,557, filed Aug. 21, 2009, 9 pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Notice of Allowance dated Apr. 11, 2014, for U.S. Appl. No. 12/545,557, filed Aug. 21, 2009, 9 pages.
Notice of Allowance dated Aug. 21, 2014, for U.S. Appl. No. 12/545,754, filed Aug. 21, 2009, ten pages.
Notice of Allowance dated Oct. 15, 2014, for U.S. Appl. No. 12/494,173, filed Jun. 29, 2009, eight pages.
Notice of Allowance dated Nov. 7, 2014, for U.S. Appl. No. 14/055,717, filed Oct. 16, 2013, six pages.
Notice of Allowance dated Mar. 16, 2015, for U.S. Appl. No. 14/312,489, filed Jun. 23, 2014, eight pages.
Notice of Allowance dated Dec. 1, 2015, for U.S. Appl. No. 12/238,333, filed Sep. 25, 2008, nine pages.
Notice of Allowance dated Jan. 8, 2016, for U.S. Appl. No. 13/448,182, filed Apr. 16, 2012, nine pages.
Notice of Allowance dated Dec. 2, 2016, for U.S. Appl. No. 14/615,186, filed Feb. 5, 2015, seven pages.
Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-120].
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Search Report dated Apr. 29, 2009, for NL Application No. 2001672, with English translation of Written Opinion, eight pages.
Search Report dated Oct. 14, 2015, for TW Application No. 103116003, one page.
Search Report dated Nov. 12, 2015, for ROC (Taiwan) Patent Application No. 103105965, with English translation, two pages.
TW Search Report dated May 3, 2016, for TW Application No. 104115152, one page.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

(56) References Cited

OTHER PUBLICATIONS

Wilson, A.D. (Oct. 15, 2006). "Robust Computer Vision-Based Detection of Pinching for One and Two-Handed Gesture Input," *ACM, USIT '06*, Montreux, Switzerland, Oct. 15-18, 2006, pp. 255-258.

Yang, J-H. et al. (Jul. 2013). "A Noise-Immune High-Speed Read-out Circuit for In-Cell Touch Screen Panels," *IEEE Transactions on Circuits and Systems-1: Regular Papers* 60(7):1800-1809.

Non-Final Office Action dated Apr. 3, 2018, for U.S. Appl. No. 14/318,157, filed Jun. 27, 2014, twelve pages.

Notice of Allowance dated Mar. 1, 2018, for U.S. Appl. No. 14/645,120, filed Mar. 11, 2015, five pages.

European Search Report dated Jul. 27, 2017, for EP Application No. 14902458.0, four pages Final Office Action dated Jul. 26, 2017, for U.S. Appl. No. 14/318,157, filed Jun. 27, 2014, 10 pages.

Final Office Action dated Aug. 10, 2017, for U.S. Appl. No. 14/645,120, filed Mar. 11, 2015, twelve pages.

Final Office Action dated Aug. 21, 2017, for U.S. Appl. No. 14/550,686, filed Nov. 21, 2014, 11 pages.

Non-Final Office Action dated Jun. 14, 2017, for U.S. Appl. No. 15/006,987, filed Jan. 26, 2016, 14 pages.

Non-Final Office Action dated Jun. 26, 2017, for U.S. Appl. No. 14/558,529, filed Dec. 2, 2014, six pages.

Final Office Action dated Aug. 16, 2018, for U.S. Appl. No. 14/993,017, filed Jan. 11, 2016, 35 pages.

European Search Report dated Jan. 31, 2018, for EP Application No. 17183937.6, four pages.

Non-Final Office Action dated Jan. 22, 2018 , for U.S. Appl. No. 15/097,179, filed Apr. 12, 2016, 11 pages.

Notice of Allowance dated Feb. 9, 2018, for U.S. Appl. No. 14/550,686, filed Nov. 21, 2014, 11 pages, \* cited by examiner

PIXELATED SELF-CAPACITANCE WATER REJECTION

CROSS-REFERENCE TO RELATED APPLICATIONS

This application is a National Phase Patent Application under 35 U.S.C. § 371 of International Application No. PCT/US2015/057644, filed Oct. 27, 2015, which claims the benefit of U.S. Provisional Patent Application No. 62/069,231, filed Oct. 27, 2014, the entire disclosures of which are incorporated herein by reference for all purposes.

FIELD OF THE DISCLOSURE

This relates generally to touch sensor panels, and more particularly to rejecting water on a pixelated self-capacitance touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates made of materials such as Indium Tin Oxide (ITO). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). Touch events can be sensed on the touch screens by detecting changes in the self-capacitance of the conductive plates (touch node electrodes). In some examples, water or water droplets may be present on the touch screen of the disclosure. It can also be beneficial to be able to differentiate between water (e.g., water droplets) that may be present on the touch screen, which can be ignored, and finger touch activity, which can be processed as touch activity. In some examples, isolated water droplets (i.e., water droplets that are not touching a grounded user or object) on the touch screen of the disclosure may not appear on a fully bootstrapped scan of the touch screen, but may appear to various degrees on partially bootstrapped and mutual capacitance scans of the touch screen. Thus, a comparison of a fully bootstrapped scan of the touch screen and a partially bootstrapped and/or mutual capacitance scan of the touch screen can be used to identify the presence of water on the touch screen, and to ignore or discard the water from the final touch image that can be analyzed for touch activity.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). Touch events can be sensed on the touch screens by detecting changes in the self-capacitance of the conductive plates (touch node electrodes). In some examples, water or water droplets may be present on the touch screen of the disclosure. It can also be beneficial to be able to differentiate between water (e.g., water droplets) that may be present on the touch screen, which can be ignored, and finger touch activity, which can be processed as touch activity. In some examples, isolated water droplets (i.e., water droplets that are not touching a grounded user or object) on the touch screen of the disclosure may not appear on a fully bootstrapped scan of the touch screen, but may appear to various degrees on partially bootstrapped and mutual capacitance scans of the touch screen. Thus, a comparison of a fully bootstrapped scan of the touch screen and a partially bootstrapped and/or mutual capacitance scan of the touch screen can be used to identify the presence of water on the touch screen, and to ignore or discard the water from the final touch image that can be analyzed for touch activity. Although the examples of the disclosure are described with reference to water, it is understood that the examples of the disclosure can be utilized to detect liquids other than water on the touch screen, and more generally, the presence of ungrounded objects on the touch screen.

Figure 1C:
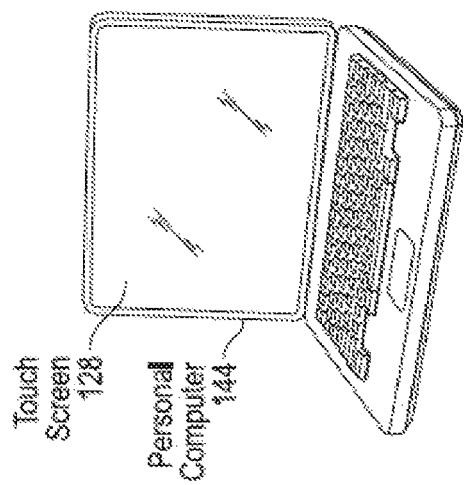
FIGS. 1A-1C illustrate an example mobile telephone, an example media player, and an example portable computing device that can each include an exemplary touch screen according to examples of the disclosure.
Figure 1B:
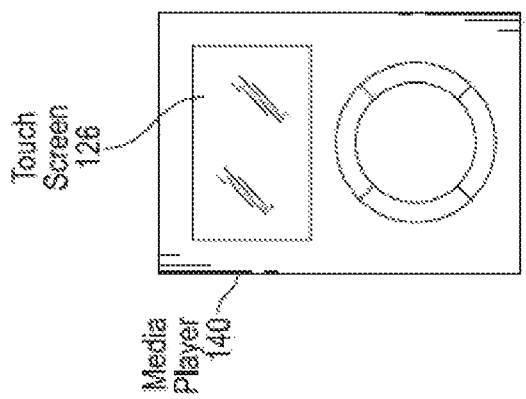
Figure 1A:
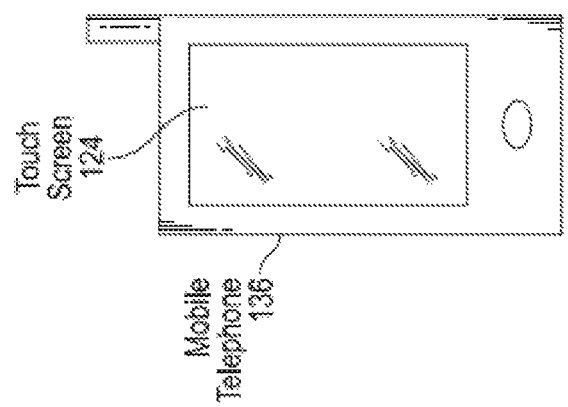

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. Touch screens 124, 126, and 128 can be based on self-capacitance. It is understood that the above touch screens can be implemented in other devices as well, including in wearable devices. A self-capacitance based touch system can include a matrix of individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (hovering) (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

Figure 2:
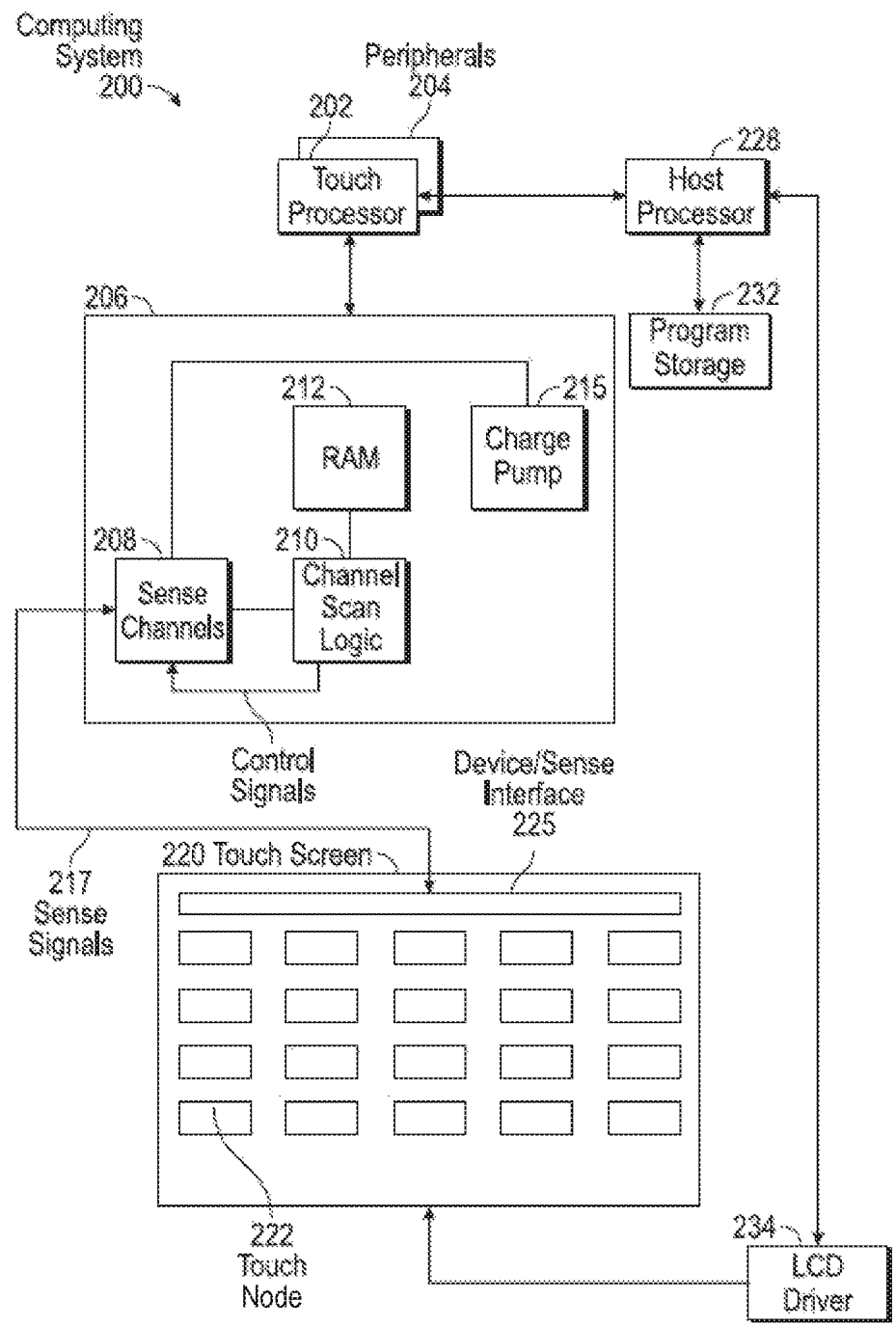
FIG. 2 is a block diagram of an exemplary computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch node electrodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration and operation of electrodes and sense channels, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
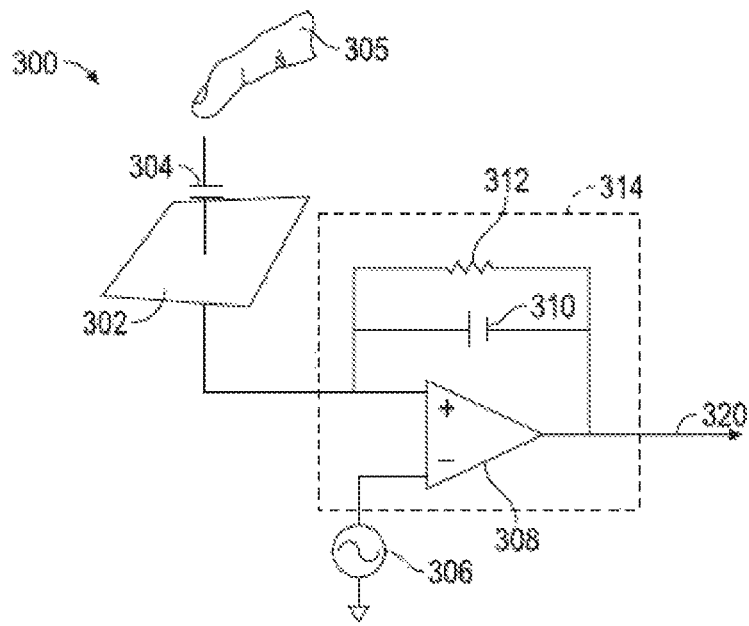
FIG. 3 illustrates an exemplary touch sensor circuit corresponding to a self-capacitance touch node electrode and sensing circuit according to examples of the disclosure.

FIG. 3 illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314 (which can correspond to sense channels 208). Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting (−) input of operational amplifier 308. An AC voltage source 306 (Vac) can be coupled to the non-inverting (+) input of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor (e.g., touch controller 206) to determine the presence of a proximity or touch event, or the output can be inputted into a discrete logic network to determine the presence of a touch or proximity event. It is understood that a "touch event," as used in this disclosure, can encompass a finger or object touching the touch sensor panel (i.e., being in physical contact with the touch sensor panel), as well as the finger or object being in proximity to, but not touching, the touch sensor panel (e.g., hovering over the touch sensor panel).

Figure 4:
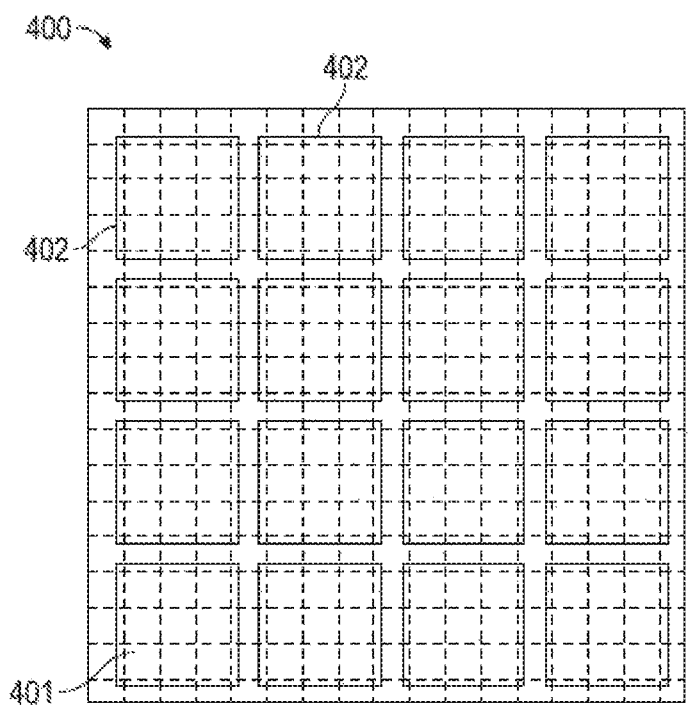
FIG. 4 illustrates an example configuration in which common electrodes can form portions of the touch sensing circuitry of a touch sensing system according to examples of the disclosure.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 4 illustrates an example configuration in which common electrodes 402 can form portions of the touch sensing circuitry of a touch sensing system—in some examples of this disclosure, the common electrodes can form touch node electrodes used to detect a touch image on touch screen 400, as described above. Each common electrode 402 (i.e., touch node electrode) can include a plurality of display pixels 401 (illustrated as the small squares having dashed-line borders), and each display pixel 401 can include a portion of a common electrode 402, which can be a circuit element of the display system circuitry in the display pixel stackup (i.e., the stacked material layers forming the display pixels) of the display pixels of some types of LCD or other displays—in other words, the common electrodes can operate as part of the display system to display a display image on touch screen 400.

In the example shown in FIG. 4, each common electrode 402 can serve as a multi-function circuit element that can operate as display circuitry of the display system of touch screen 400 and can also operate as touch sensing circuitry of the touch sensing system. In this example, each common electrode 402 can operate as a common electrode of the display circuitry of the touch screen 400, as described above, and can also operate as touch sensing circuitry of the touch screen. For example, a common electrode 402 can operate as a capacitive part of a touch node electrode of the touch sensing circuitry during the touch sensing phase. Other circuit elements of touch screen 400 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch node electrode in an "off" state. Stimulation signals can be applied to common electrode 402. Changes in the total self-capacitance of common electrode 402 can be sensed through an operational amplifier, as previously discussed. The change in the total self-capacitance of common electrode 402 can depend on the proximity of a touch object, such as finger 305, to the common electrode. In this way, the measured change in total self-capacitance of common electrode 402 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch node electrodes) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure.

While the discussion in this disclosure focuses on touch screens, it is understood that some or all of the examples of the disclosure can similarly be implemented in a touch sensor panel (i.e., a panel having touch sensing circuitry without display circuitry). For brevity, however, the examples of the disclosure have been, and will be, described in the context of a touch screen.

Water Rejection

In self-capacitance touch screens, capacitance seen by a self-capacitance touch node electrode can affect the total self-capacitance measured at that touch node electrode, and can thus affect touch measurements at that touch node electrode. Therefore, in some examples, it can be beneficial to "bootstrap" the touch screen in order to reduce or cancel unwanted capacitances that may contribute to the total self-capacitance measured at a touch node electrode. "Bootstrapping" the touch screen can entail driving one or more components or portions of a touch screen with a voltage at the same frequency and phase as is used to drive and sense a touch node electrode (as described above), so that capacitances that may exist between the touch node electrode and the one or more portions of the touch screen can be effectively canceled. For example, bootstrapping the touch screen can entail driving one or more gate lines of the touch screen with a voltage at the same frequency and phase as is used to drive and sense a touch node electrode. It can also be beneficial to be able to differentiate between water (e.g., water droplets) that may be present on the touch screen, which can be ignored, and finger touch activity, which can be processed as touch activity. It should be noted that while the water detection and rejection examples of the disclosure are described in the context of a bootstrapped touch screen, the water detection and rejection schemes can similarly apply to touch sensor panels (not simply touch screens) in which no bootstrapping is occurring, but in which the touch node electrodes are driven, sensed and/or grounded in the manners described below.

Figure 5A:
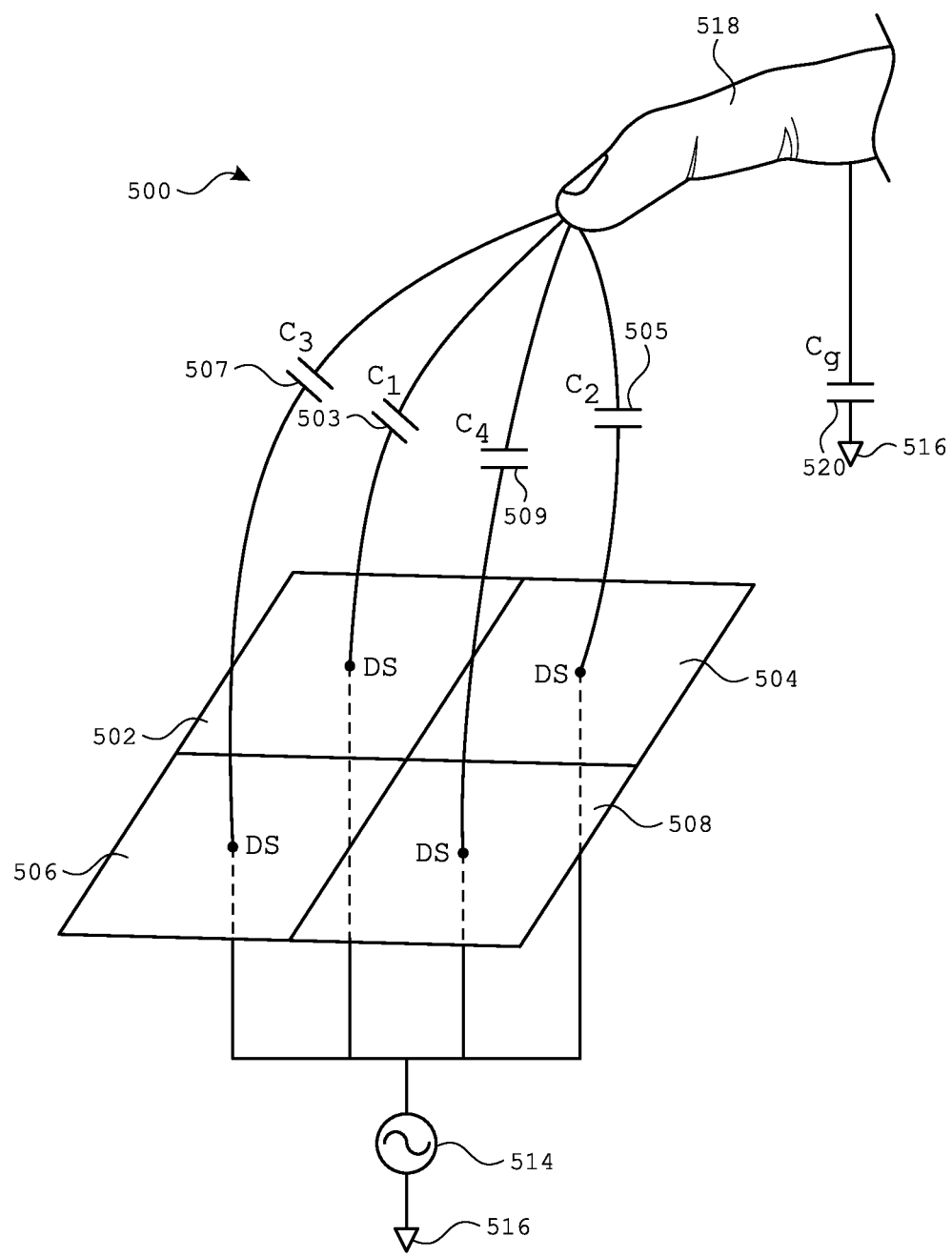
FIG. 5A illustrates an exemplary fully bootstrapped touch screen in which every touch node electrode can be driven and sensed simultaneously according to examples of the disclosure.

FIG. 5A illustrates an exemplary fully bootstrapped touch screen 500 in which every touch node electrode can be driven and sensed simultaneously. Touch screen 500 can include touch node electrodes 502, 504, 506 and 508. Touch node electrodes 502, 504, 506 and 508 can be a portion of the touch node electrodes that can be included in touch screen 500. Other touch node electrodes are omitted for ease of description, but it is understood that the scope of the disclosure includes touch screens that include more than four touch node electrodes. In some examples, all of the touch node electrodes on a touch screen may be driven and sensed simultaneously in a fully bootstrapped configuration. In some examples, the touch screen may be sensed in a fully bootstrapped configuration in a portion-by-portion fashion (e.g., 25% of the touch screen at a time, similar to as described with reference to FIG. 10B), in which all of the touch node electrodes in the portion of the touch screen being sensed can be driven and sensed simultaneously (e.g., in a fully bootstrapped configuration)—subsequently, the remaining portions of the touch screen can be similarly sensed, sequentially, in a fully bootstrapped configuration until the entire touch screen has been sensed. In some examples, touch node electrodes in those portions of the touch screen that are not currently being sensed in the fully bootstrapped configuration can be biased at a bias voltage (AC or DC), or can be driven with the same stimulation signal as is used to drive and sense the touch node electrodes in the portion of the touch screen that is currently being sensed in the fully bootstrapped configuration.

Each of touch node electrodes 502, 504, 506 and 508 can be driven and sensed (signified by "DS") simultaneously (or sensed sequentially while driven) with the same stimulation signal from stimulation source 514, which can be coupled to the system ground 516 of whichever device touch screen 500 can be included in (e.g., any of the devices illustrated in FIGS. 1A-1C). Stimulation source 514 can correspond to sensing circuit 314 and/or voltage source 306 in FIG. 3A. Although touch node electrodes 502, 504, 506 and 508 are illustrated as being coupled to the same stimulation source 514, it is understood that substantially the same result can be obtained if the touch node electrodes were coupled to any combination of different stimulation sources that provide the same stimulation signals. Because each of touch node electrodes 502, 504, 506 and 508 can be driven and sensed simultaneously (or sensed sequentially while driven) with the same stimulation signal, capacitances that may exist between the touch node electrodes can be effectively canceled, and the sensed total self-capacitances of the touch node electrodes can be limited to the capacitances that can exist between the touch node electrodes and finger (or object) 518, and potentially other capacitances (e.g., parasitic capacitances) that may exist between the touch node electrodes and other system components (e.g., system ground). These capacitances can be represented by $C_1$ 503, $C_2$ 505, $C_3$ 507 and $C_4$ 509.

$C_g$ 520, as illustrated in FIG. 5A, can represent a total capacitance between finger 518 and system ground, and can be a combination of various capacitances, as will be described below. Specifically, finger 518 can have capacitance $C_{body}$ between it and earth ground, where $C_{body}$ can represent a human body to earth ground capacitance, for example. Finger 518 can also have capacitance $C_{F-SG}$ between it and the device in which touch screen 500 can be included, where $C_{F-SG}$ can represent a finger-to-system (device) ground capacitance. The device in which touch screen 500 can be included can have capacitance $C_{SG-EG}$ between it and earth ground, where $C_{SG-EG}$ can represent a system (device) ground-to-earth ground capacitance. In some examples, $C_{body}$ can be much larger than $C_{F-SG}$ and $C_{SG-EG}$. Thus, finger 518 can be considered to be effectively shorted to earth ground through $C_{body}$. Therefore, $C_{SG-EG}$ can be considered to be between system (device) ground and finger 518 (which can be shorted to earth ground); and, from before, $C_{F-SG}$ can be another capacitance between system (device) ground and finger 518. As a result, $C_{F-SG}$ and $C_{SG-EG}$ can be parallel capacitances that can exist between finger 518 and system ground 516. $C_g$ 520, the total capacitance between finger 518 and system ground, can then be expressed as:

$$C_g = C_{F-SG} + C_{SG-EG} \quad (1)$$

Current from touch node electrodes 502, 504, 506 and 508 can flow through finger 518 and $C_g$ 520 to system ground 516. However, because an impedance associated with $C_g$ 520 can at least partially isolate finger 518 from system ground 516, the voltage at finger 518 can move further and further away from system ground 516 as more current flows from touch node electrodes 502, 504, 506 and 508 through finger 518 to system ground 516. Because each of touch node electrodes 502, 504, 506 and 508 can be driven and sensed simultaneously, current from all four touch node electrodes can flow through finger 518 to system ground 522. As a result, the voltage at finger 518 can be relatively high with respect to system ground, and relatively little voltage can be dropped across each of $C_1$ 503, $C_2$ 505, $C_3$ 507 and $C_4$ 509—this can result in an reduction of charge coupling and attenuation of the capacitance sensed at each of the touch node electrodes associated with capacitances $C_1$, $C_2$, $C_3$ and $C_4$. This attenuation can be reflected in an attenuation factor by which the full $C_1$ 503, $C_2$ 505, $C_3$ 507 and $C_4$ 509 capacitances can be multiplied, which can be expressed as:

$$\alpha = C_g/C_{Total} \quad (2)$$

where $\alpha$ can represent the attenuation factor, and:

$$C_{Total} = C_g + C_1 + C_2 + C_3 + C_4 \quad (3)$$

Thus, the effective self-capacitance sensed at any one touch node electrode can be expressed as:

$$C_{Eff,X} = \alpha * C_X \quad (4)$$

where $C_X$ can be $C_1$ 503, $C_2$ 505, $C_3$ 507 or $C_4$ 509. This attenuation of the sensed self-capacitance of the touch node electrodes can make it difficult to sense touch on touch screen 500. In examples in which touch screen 500 includes more touch node electrodes that are all being driven and sensed simultaneously, and in which many parts of a user's hand (or other object) are in proximity to/touching the touch screen (e.g., the user's palm, thumb and many fingers touching the touch screen), the attenuation factor $\alpha$ can be as low as 4%. It is understood that in some examples, finger 518 may be well-grounded, in which case $C_g$ can be very large (or effectively infinite), and $\alpha$ can be approximately 1 (i.e., no attenuation). In the case of an ungrounded finger 518, detecting touch with so much touch signal attenuation can be difficult. In some examples, the amount of touch signal attenuation that can be exhibited can be reduced by partially, rather than fully, bootstrapping the touch screen.

Figure 5B:
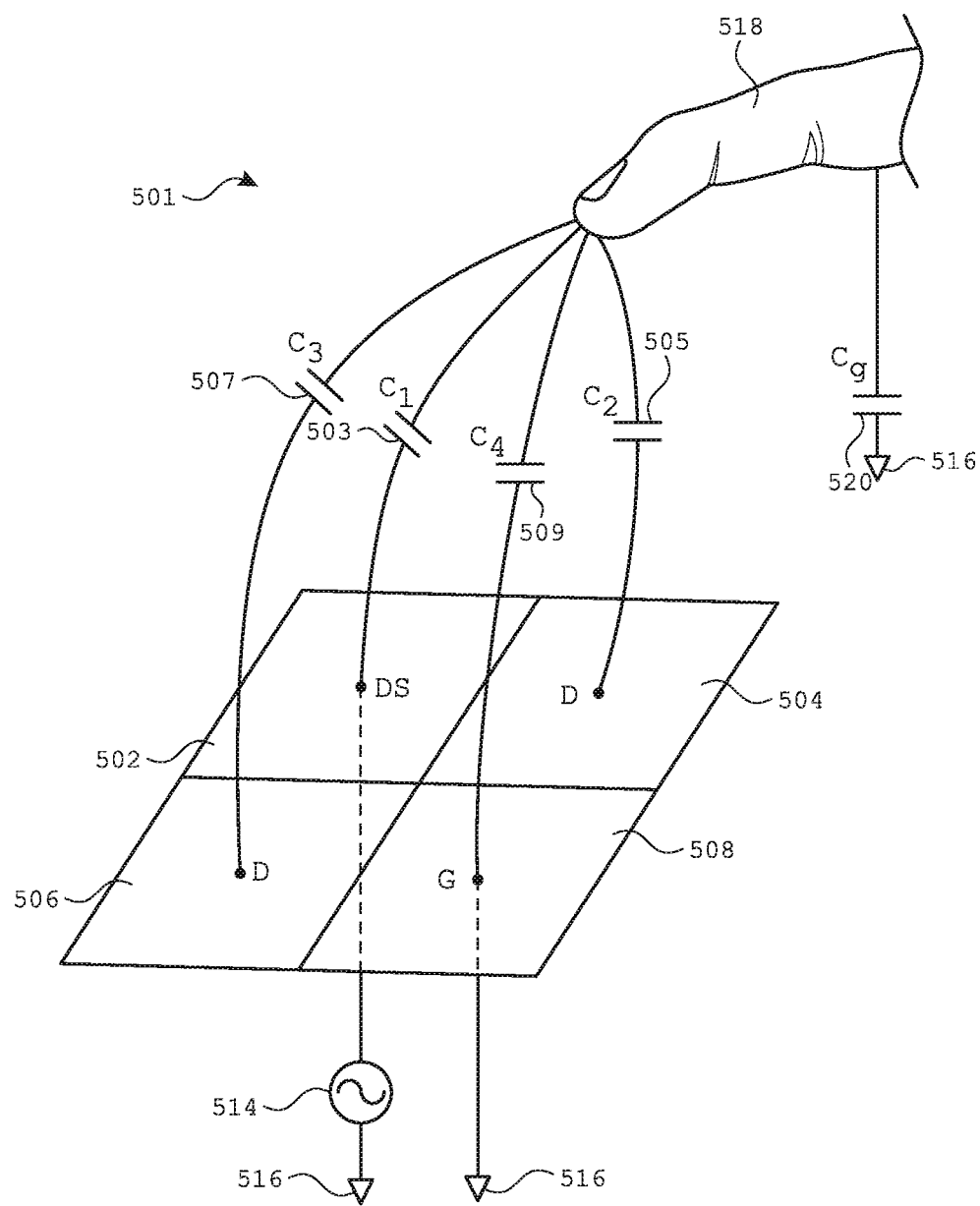
FIG. 5B illustrates an exemplary partially bootstrapped touch screen in which less than all of the touch node electrodes can be driven and sensed simultaneously according to examples of the disclosure.

FIG. 5B illustrates an exemplary partially bootstrapped touch screen 501 in which less than all of the touch node electrodes can be driven and sensed at a given moment in time. Touch screen 501 can be the same as touch screen 500, except that instead of all of touch node electrodes 502, 504, 506 and 508 being driven and sensed simultaneously as in touch screen 500, only touch node electrode 502 (touch node electrode DS) can be driven and sensed in touch screen 501. Touch node electrodes 504 and 506 (touch node electrodes D) can be driven but not sensed, and touch node electrode 508 (touch node electrode G) can be grounded to system ground 516. Though not illustrated for clarity, touch node electrodes 504 and 506 can be coupled to a stimulation source to be driven by the same stimulation signal as can be driving touch node electrode 502. Additionally, it is understood that in touch screens that have more touch node electrodes than those illustrated in FIG. 5B, the DS, D and G touch node electrode pattern can be repeated across some or all of the touch screen in accordance with the examples of the disclosure. Further, in some examples, a partially bootstrapped scan of a touch screen can include at least one touch node electrode that is driven and sensed, and at least one touch node electrode that is grounded—the remaining touch node electrodes can be driven and sensed, merely driven, grounded, floating, or in any other electrical state.

Partially bootstrapped touch screen 501 can exhibit many of the benefits of fully bootstrapped touch screen 500. Specifically, capacitances between touch node electrode 502 (the touch node electrode of interest—i.e., the touch node electrode for which the total self-capacitance is being sensed) and touch node electrodes 504 and 506 can continue to be effectively canceled, because touch node electrodes 502, 504 and 506 can be driven with the same stimulation signal. Capacitances between touch node electrode 502 and touch node electrode 508 may not be canceled because touch node electrode 508 can be coupled to system ground 516; however, because touch node electrodes 502 and 508 can be diagonally disposed with respect to one another (though it is understood that they need not be), capacitances that may exist between the two can be relatively small. Therefore, the total self-capacitance sensed at touch node electrode 502 can be substantially free of capacitances that may exist between touch node electrode 502 and the other touch node electrodes, which can be one benefit of a fully bootstrapped touch screen.

Partially bootstrapped touch screen 501 can also exhibit less touch signal attenuation than fully bootstrapped touch screen 500. Whereas in touch screen 500 the only current path from the touch node electrodes to ground could be through finger 518 and $C_g$ 520, in touch screen 501, the current from the touch node electrodes to ground can flow through $C_4$ 509 to system ground 516 as well as through finger 518 and $C_g$ 520. Therefore, the voltage at finger 518 can be brought down closer to system ground 516, which can result in more voltage being dropped across $C_1$ 503 than in touch screen 500; thus, more charge coupling and less attenuation of $C_1$ 503 can be sensed at touch node electrode 502. The partially bootstrapped touch screen attenuation factor can be expressed as:

$$\alpha = (C_g + C_4)/C_{Total} \quad (5)$$

Similar to before, the effective self-capacitance sensed at touch node electrode 502 can be expressed as:

$$C_{Eff,1} = \alpha * C_1 \quad (6)$$

In examples in which touch screen 501 includes more touch node electrodes that are being driven, sensed, and grounded in the illustrated partially bootstrapped pattern, and in which many parts of a user's hand are in proximity to/touching the touch screen (e.g., the user's palm, thumb and many fingers touching the touch screen), the attenuation factor can be increased from ~4% in the fully bootstrapped touch screen to ~25% in the partially bootstrapped touch screen. This increase can result from the additional $C_4$ term that can be included in the numerator of equation (5), and can relax a signal-to-noise requirement of the touch screen sensing circuitry by more than six times as compared with touch screen 500, which can ease the difficulty of sensing touch on the touch screen.

As stated above, in some examples, water or water droplets may be present on the touch screen of the disclosure. It can be beneficial to be able to differentiate the presence of water from the presence of a finger to ensure proper touch screen operation.

Figure 6A:
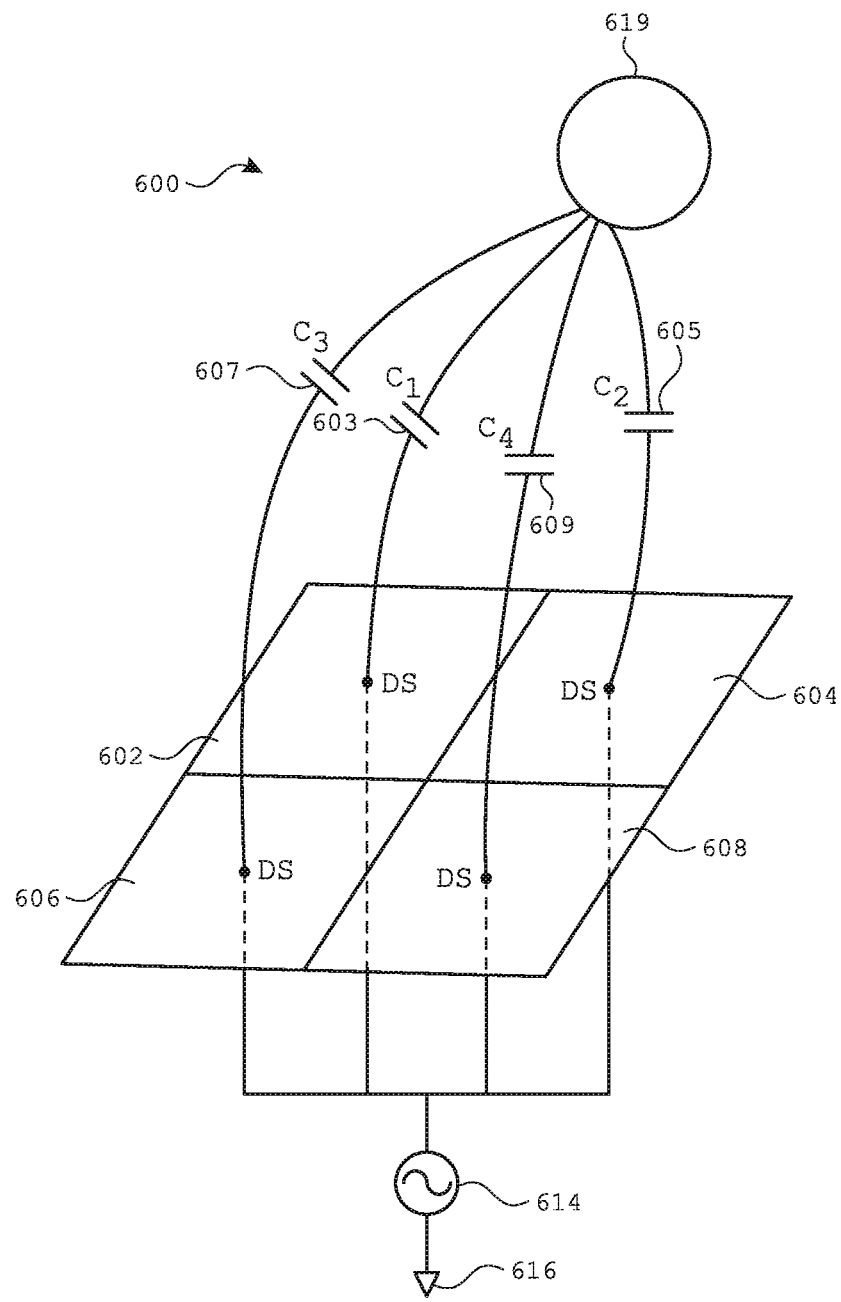
FIG. 6A illustrates an exemplary fully bootstrapped touch screen on which an isolated water droplet can reside according to examples of the disclosure.

FIG. 6A illustrates an exemplary fully bootstrapped touch screen 600 on which isolated water droplet 619 can reside according to examples of the disclosure. Touch screen 600 can be substantially similar to touch screen 500 in FIG. 5A, except that finger 518 can be replaced by isolated water droplet 619. Isolated water droplet 619 can be a water droplet that can reside on the surface of touch screen 600, and can be "isolated" in that it may not be touching a user, a user's finger, or any other object that may be at least partially grounded. As in touch screen 500, touch screen 600 can be fully bootstrapped.

Because isolated water droplet 619 can be isolated from ground, there can be no path to ground from the water droplet, and thus no current can flow from touch node electrodes 602, 604, 606 and 608 through the isolated water droplet to ground. As a result, isolated water droplet 619 can cause substantially no change in the self-capacitance of any of touch node electrodes 602, 604, 606 and 608, and therefore the isolated water droplet can cause no self-capacitance touch image of its own. In other words, for a fully bootstrapped touch screen, water droplets can be automatically ignored/rejected from touch scans.

Figure 6B:
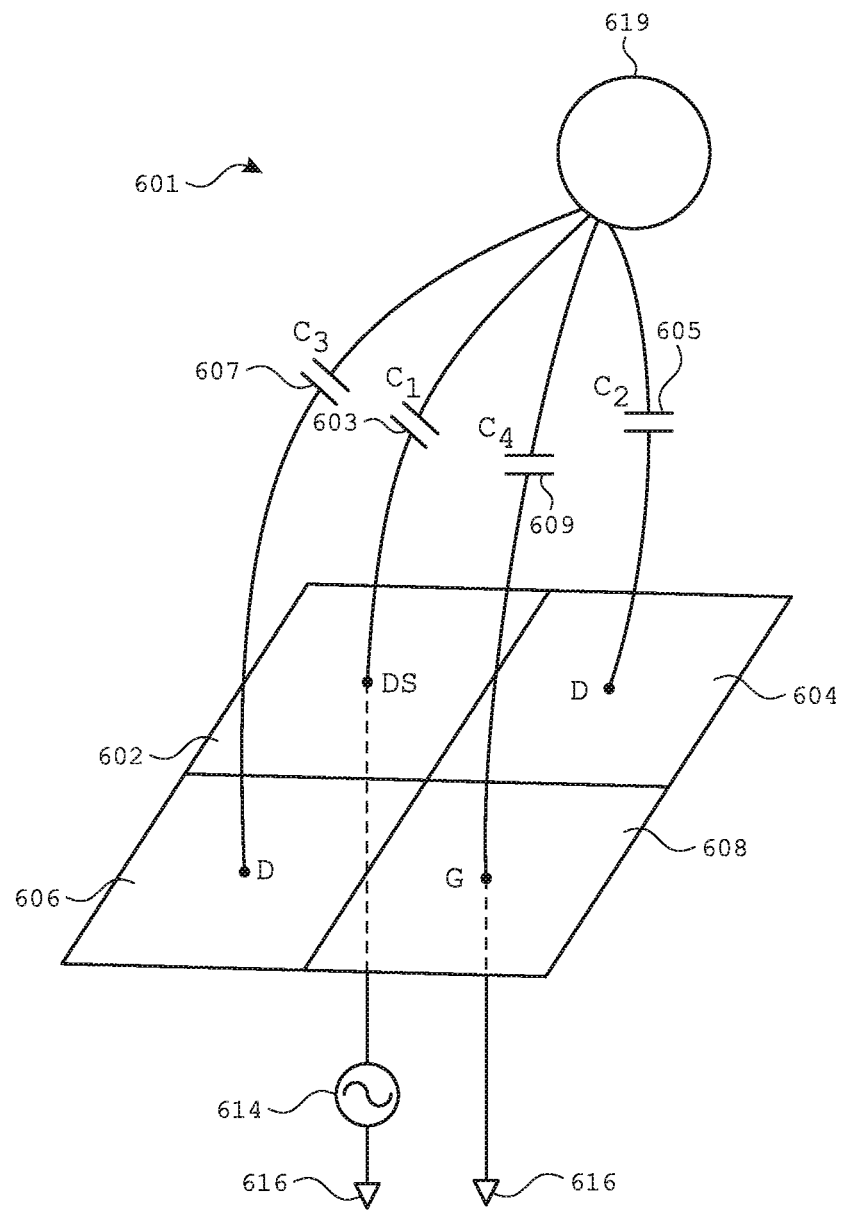
FIG. 6B illustrates an exemplary partially bootstrapped touch screen on which an isolated water droplet can reside according to examples of the disclosure.

However, for the reasons given above, sometimes the touch screen of the disclosure can be operated in a partially bootstrapped configuration. FIG. 6B illustrates an exemplary partially bootstrapped touch screen 601 on which isolated water droplet 619 can reside, according to examples of the disclosure. Touch screen 601 can be substantially similar to touch screen 501 in FIG. 5B, except that finger 518 can be replaced by water droplet 619, as in FIG. 6A. In contrast to FIG. 6A, because touch screen 601 can be partially bootstrapped, a path to ground can exist from water droplet 619. Specifically, water droplet 619 can be coupled to ground 616 through $C_4$ 609 and touch node electrode 608. As a result, current can be injected from touch node electrodes 602, 604 and 606 through water droplet 619 to ground 616. Therefore, water droplet 619 can appear in the self-capacitance touch image obtained on partially bootstrapped touch screen 601.

For similar reasons as described above with respect to FIG. 5B, the attenuation factor associated with water droplet 619 can be expressed as:

$$\alpha = C_4/C_{Total} \quad (7)$$

Similar to before, the effective self-capacitance sensed at touch node electrode 602 can be expressed as:

$$C_{Eff,1} = \alpha * C_1 \quad (8)$$

Thus, an attenuated self-capacitance touch image of water droplet 619 can be detected on touch screen 601 in a partially bootstrapped configuration.

Figure 6C:
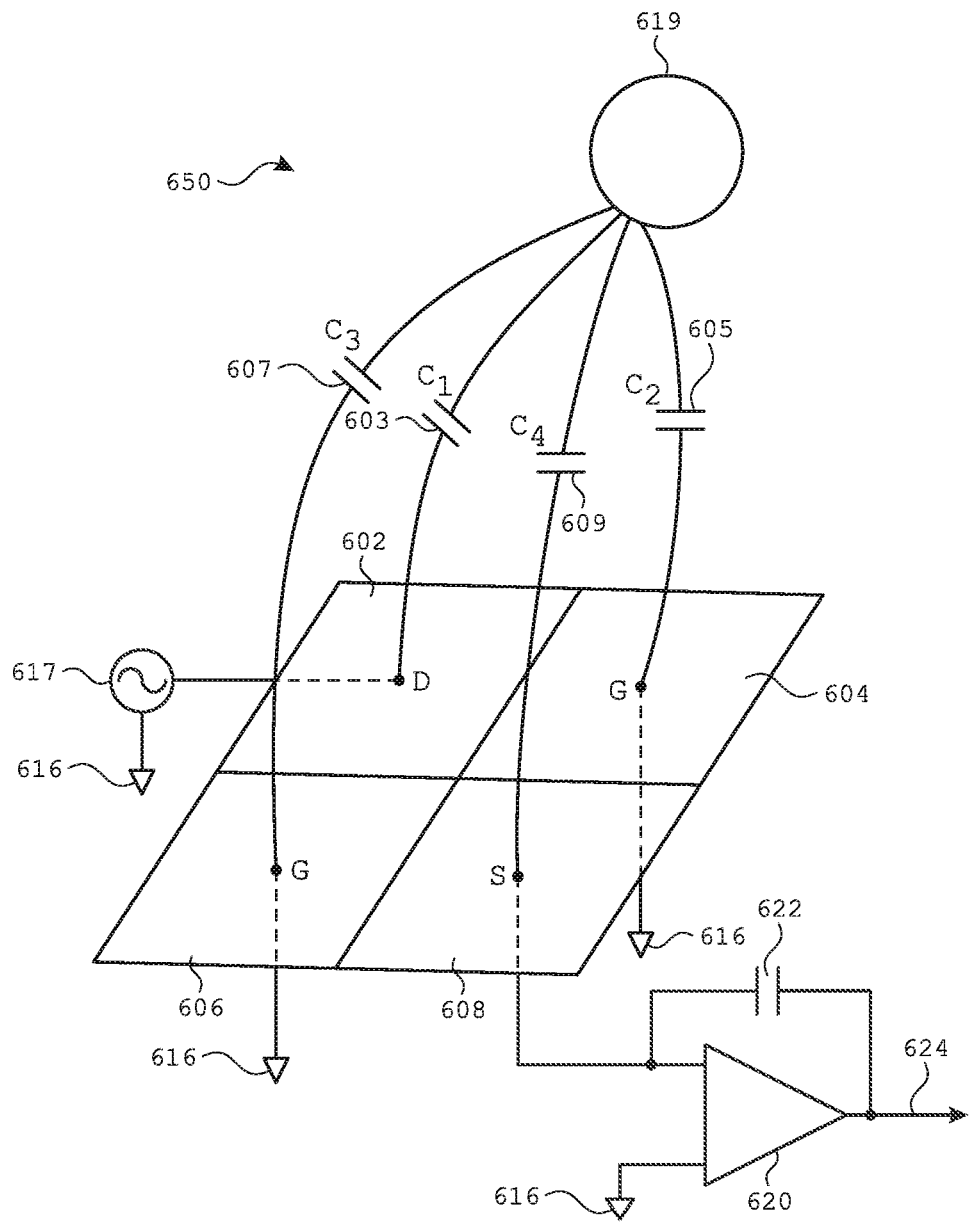
FIG. 6C illustrates an exemplary touch screen operating in a mutual capacitance configuration on which a water droplet can reside according to examples of the disclosure.

In some examples, the touch screen of the disclosure can additionally or alternatively be operated in a mutual capacitance configuration. In some examples, the touch screen can be operated in a mutual capacitance configuration in order to correct for the above-discussed attenuation associated with an ungrounded (or poorly-grounded) user, and in some examples, the touch screen can be operated in a mutual capacitance configuration as part of distinguishing and rejecting water from actual touch activity, as will be described herein. Ungrounded user attenuation correction will be discussed later in the disclosure. FIG. 6C illustrates an exemplary touch screen 650 operating in a mutual capacitance configuration on which water droplet 619 can reside according to examples of the disclosure. The mutual capacitance driving and sensing scheme illustrated can be utilized before, after, or during the fully/partially bootstrapped schemes described above, as will be described in more detail later. Additionally, the exemplary mutual capacitance driving and sensing scheme of FIG. 6C illustrates the scheme as applied to four touch node electrodes, but it is understood that the scheme can similarly extend to additional touch node electrodes that may exist on the touch screen of the disclosure. For example, a group of four touch node electrodes on the touch screen can be driven, sensed and grounded as described below. In some examples, the groups of four touch node electrodes can be driven, sensed and grounded sequentially, one at a time. In some examples, the groups of four touch node electrodes can be driven, sensed and grounded at least partially simultaneously, more than one at a time.

A mutual capacitance driving and sensing scheme will now be described. During a first mutual capacitance scan time period, the touch node electrodes of the touch screen can be driven and sensed as shown in FIG. 6C. Specifically, the top-left touch node electrode 602 can be driven (D touch node electrode) via stimulation source 617. Stimulation source 617 can be any appropriate voltage source for providing a voltage to touch node electrode 602. The bottom-right touch node electrode 608 can be sensed (S touch node electrode) via sense amplifier 620 (e.g., D touch node electrode 602 and S touch node electrode 608 can be diagonally disposed). The top-right and bottom-left touch node electrodes 604 and 606 (G touch node electrodes) can be grounded (or biased at another reference voltage). The above-described configuration of touch node electrodes can allow for measurement of a mutual capacitance between the D and S touch node electrodes 602 and 608, respectively. In some examples, this mutual capacitance measurement can be obtained by stimulating one or more D touch node electrodes on the touch screen with one or more stimulation buffers, grounding one or more G touch node electrodes with one or more AC ground buffers, and/or sensing one or more S touch node electrodes with one or more sense amplifiers (e.g., sense circuitry). The mechanisms for driving, sensing and/or grounding the touch node electrodes can be similar to the schemes described previously (e.g., with respect to FIGS. 5A-5B and 6A-6B), and/or other equivalent schemes, the details of which will not be repeated here for brevity.

In some examples, a second mutual capacitance scan can be performed during a second mutual capacitance scan time period. During the second mutual capacitance scan time period, the touch node electrodes can be driven and sensed such that the top-right touch node electrode can be driven, the bottom-left touch node electrode can be sensed, and the top-left and bottom-right touch node electrodes can be grounded. After the two mutual capacitance scan time periods have elapsed, mutual capacitance measurements between each pair of diagonal touch node electrodes on the touch screen can have been obtained. It is understood that other driving and sensing configurations can be utilized to obtain the mutual capacitance measurements of the examples of the disclosure, and that the provided configurations are only one example. For example, in FIG. 6C, instead of driving the top-left touch node electrode and sensing the bottom-right touch node electrode, the bottom-right touch node electrode can be driven, and the top-left touch node electrode can be sensed to achieve substantially the same result. It is understood that "mutual capacitance," as used in this disclosure, can refer to the nominal capacitance seen between multiple components (e.g., between D and S touch node electrodes) of the touch screen, or the change in the nominal capacitance seen between the multiple components of the touch screen, as appropriate.

FIG. 6C also illustrates various capacitances associated with the mutual capacitance driving and sensing schemes of the disclosure. Water droplet 619 can have capacitance $C_1$ 603 between it and touch node electrode 602, capacitance $C_2$ 605 between it and touch node electrode 604, capacitance $C_3$ 607 between it and touch node electrode 606 and capacitance $C_4$ 609 between it and touch node electrode 608. When driving one touch node electrode and sensing another touch node electrode, a through-water droplet 619 mutual capacitance can be sensed. For example, a mutual capacitance from touch node electrode 602 through $C_1$ 603 to water droplet 619 through capacitance $C_4$ 608 to touch node electrode 608 can be sensed. The through-water droplet 619 mutual capacitance between touch node electrodes 602 and 608 can be expressed as:

$$C_{M\text{-}water}=(C_1*C_4)/(C_1+C_2+C_3+C_4) \quad (9)$$

Thus, water droplet 619 can present itself in a mutual capacitance measurement of the touch screen of the disclosure. Though not illustrated, a finger or other object (whether partially or fully grounded) can similarly present itself in a mutual capacitance measurement of the touch screen of the disclosure. The through-finger (or through-object) mutual capacitance between touch node electrodes 602 and 608 can be expressed as:

$$C_{M\text{-}finger}=(C_1*C_4)/(C_g+C_1+C_2+C_3+C_4) \quad (10)$$

where $C_g$ can represent a total capacitance between the finger and system ground, as discussed previously with respect to FIGS. 5A-5B.

Figure 7A:
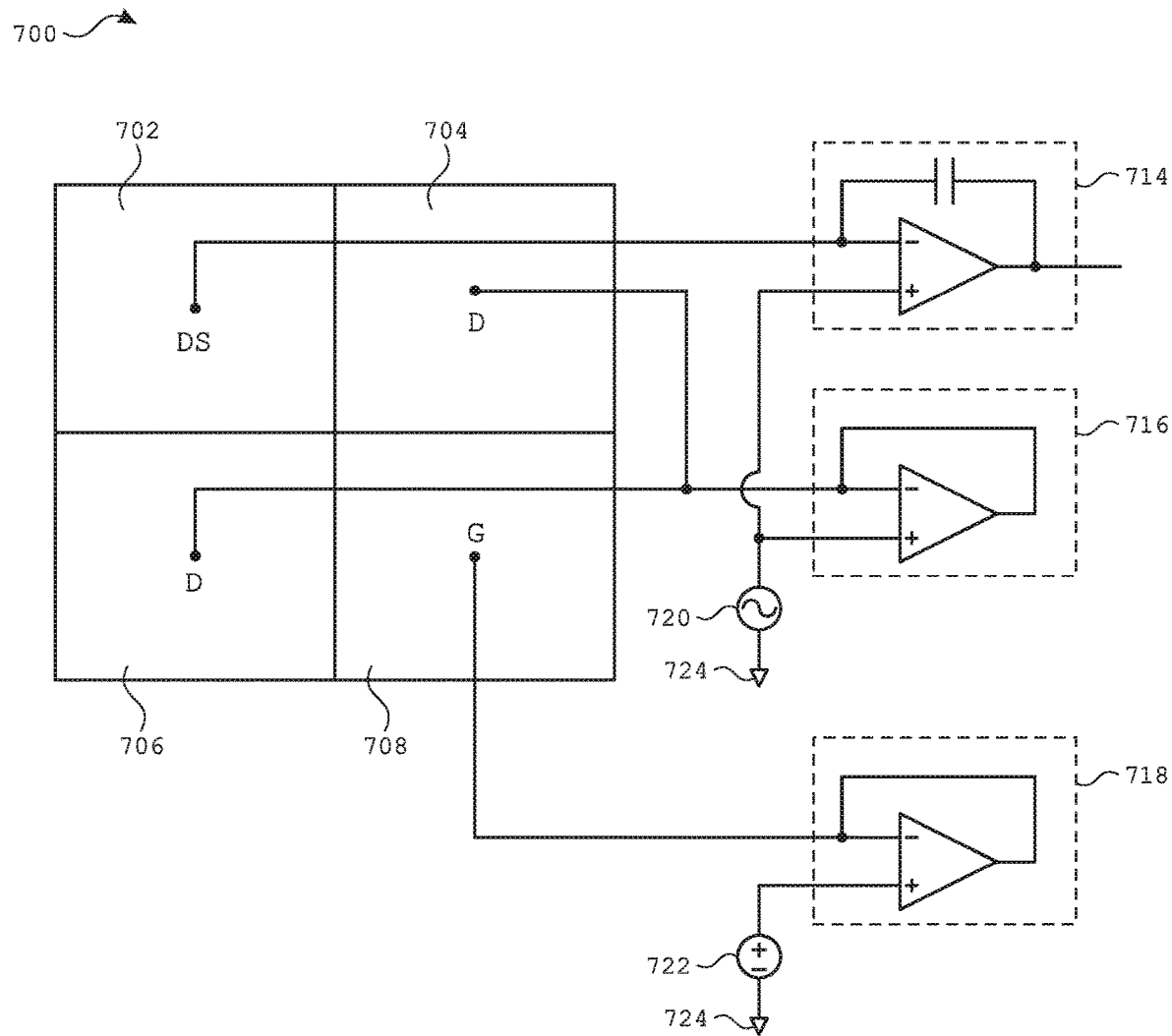
FIG. 7A illustrates an exemplary configuration of a partially bootstrapped touch screen having touch nodes coupled to appropriate circuitry according to examples of the disclosure.

The touch nodes of the touch screen of the disclosure can be driven, sensed and/or grounded using any appropriate circuitry. FIG. 7A illustrates an exemplary configuration of partially bootstrapped touch screen 700 having touch nodes coupled to appropriate circuitry—fully bootstrapped and/or mutual capacitance configurations can operate with analogously appropriate circuitry. Touch screen 700 can be substantially the same as touch screens 501 and 601. Touch node 702, which can be driven and sensed, can be coupled to sense circuitry 714. Sense circuitry 714 can correspond to sense circuitry 314 in FIG. 3, for example. Touch nodes 704 and 706, which can be driven but not sensed, can be coupled to stimulation buffer 716. In some examples, sense circuitry 714 and stimulation buffer 716 can share stimulation source 720, because touch nodes 702, 704 and 706 can be driven by the same stimulation signal; it is understood, however, that the sense circuitry and the stimulation buffer need not necessarily share the same stimulation source. Touch node 708, which can be grounded, can be coupled to AC ground buffer 718. Voltage source 722 can provide a DC bias to the AC ground provided by AC ground buffer 718. In some examples, sense circuitry 714, stimulation buffer 716 and/or AC ground buffer 718 can be included in touch controller 206, and in some examples, in sense channels 208. Further, sense circuitry 714, stimulation buffer 716 and/or AC ground buffer 718 are provided as examples only, and it is understood that other circuitry can be utilized to similarly drive, sense and ground the touch nodes of the disclosure.

Figure 7B:
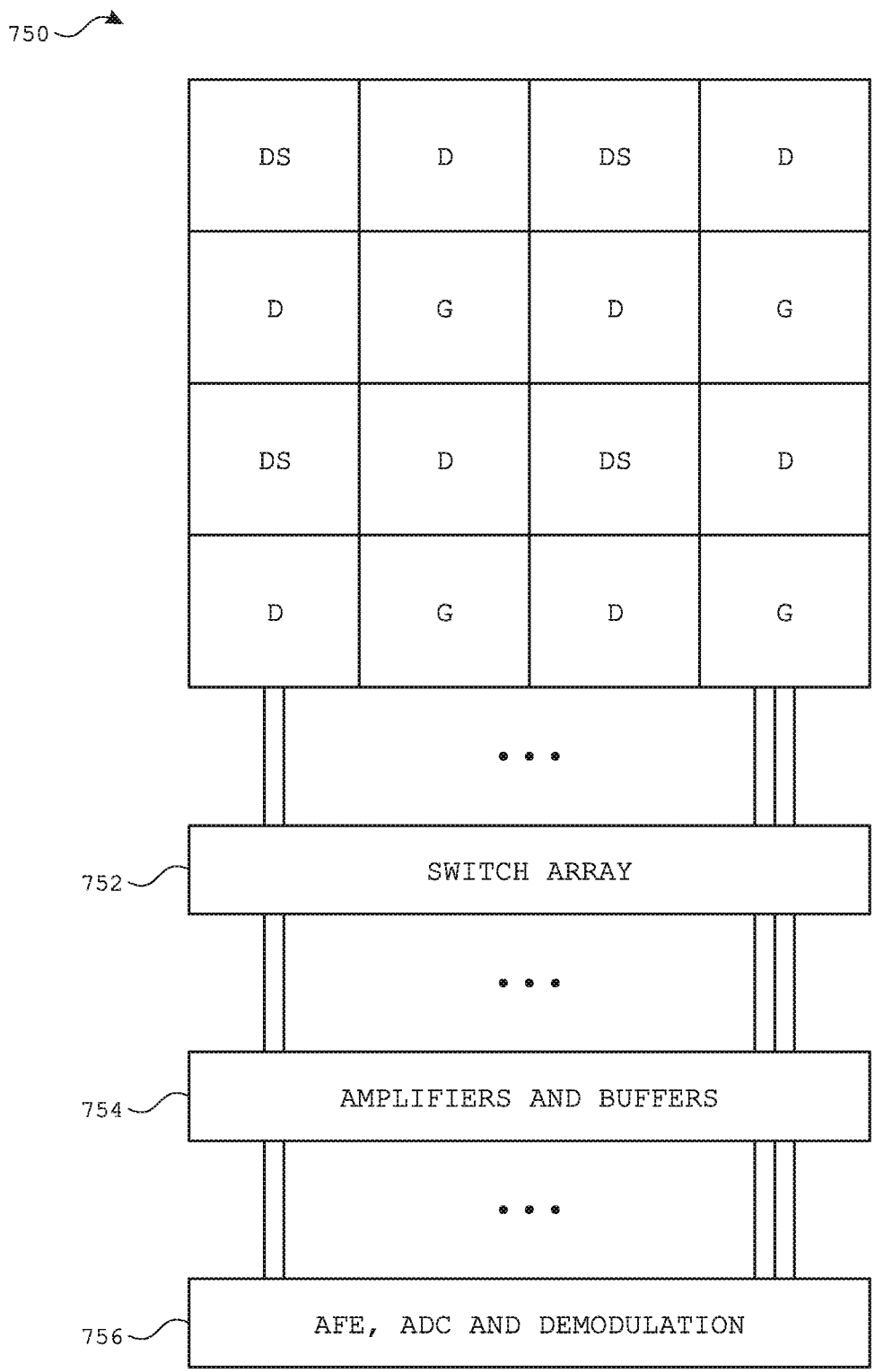
FIG. 7B illustrates an exemplary configuration of a partially bootstrapped touch screen that can utilize a switch array to couple appropriate circuitry to touch nodes, according to examples of the disclosure.

FIG. 7B illustrates an exemplary configuration of partially bootstrapped touch screen 750 that can utilize switch array 752 to couple appropriate circuitry to touch nodes. Touch nodes in touch screen 750 can be coupled to switch array 752. Switch array 752 can include switches and/or multiplexers or other circuitry that can couple an input to one or more outputs of the switch array. Switch array 752 can be coupled to amplifier circuitry 754, which can include circuitry such as sense circuitry/circuitries 714, stimulation buffer(s) 716 and AC ground buffer(s) 718 illustrated in FIG. 7A. Amplifier circuitry section 754 can be coupled to touch processing circuitry 756, such as analog front-ends (AFEs), analog-to-digital converters (ADCs) and demodulation circuits for processing touch signals detected on touch screen 750.

Circuitry such as sense circuitry 714, stimulation buffer 716 and AC ground buffer 718 need not be permanently coupled to the touch nodes for proper touch screen operation. Instead, such circuitry can be coupled to the touch nodes through switch array 752 such that appropriate touch nodes can be coupled to appropriate circuitry only when needed. This can allow multiple touch nodes to share common circuitry, which can reduce the amount of circuitry needed for touch screen operation. For example, a first touch node that is to be driven and sensed (a first DS touch node) can be coupled to sense circuitry 714 using switch array 752. When a second touch node is to be driven and sensed (a second DS touch node), switch array can couple that same sense circuitry 714 to the second touch node to drive and sense the second touch node instead of the first touch node. Such switch array 752 operation can analogously apply to couple stimulation buffers 716, AC ground buffers 718, and any other appropriate circuitry to appropriate touch nodes. Switch array 752 can be any suitable switching network that can couple touch nodes to appropriate circuitry in amplifier circuitry section 754.

In some examples, touch nodes on touch screen 750 can be stimulated in a single stimulation configuration, as generally described in this disclosure (e.g., a single sense circuitry 714 in amplifier circuitry section 754 can stimulate and sense a single touch node at any moment in time). In some examples, the touch screen scans of the disclosure can be extended to a multi-stimulation implementation in which touch nodes on touch screen 750 can be stimulated in a multi-stimulation configuration (e.g., a single sense circuitry 714 in amplifier circuitry section 754 can stimulate and sense multiple touch nodes at any moment in time). In a multi-stimulation configuration, any suitable multi-stimulation scheme can be utilized, and can be implemented using switch array 752 as appropriate. For example, a Hadamard/Circulant matrix driving and sensing scheme can be utilized with receive-side coding in which the distribution of touch nodes that receive a positive phase stimulation signal and touch nodes that receive a negative phase stimulation signal can be equal for each touch scanning step, except for a common mode touch scanning step.

As illustrated in FIGS. 5B, 6B and 7A, at any one moment in time, it can be the case that only one out of every four touch nodes can be driven and sensed in a partially-bootstrapped scan configuration. Thus, only one-fourth of the total self-capacitance touch image can be captured. Additionally, as illustrated in FIG. 6C, at any one moment in time, it can be the case that the mutual capacitance associated with only one pair out of every four touch nodes can be sensed. Thus, only half of the total mutual capacitance touch image can be captured. Thus, it can be beneficial to drive, sense and/or ground every touch node at some point in time so as to capture a full self-capacitance and/or mutual capacitance touch image on the touch screen. Various self- and mutual capacitance scan schemes will be described below. It should be noted that the examples of the disclosure can be extended to other partially bootstrapped, fully bootstrapped, and mutual capacitance schemes in which different numbers and arrangements of touch nodes can be driven and sensed, driven but not sensed, sensed, and grounded; however, the examples of the disclosure will focus on the four-touch node configurations provided for ease of description.

As described above, isolated water droplets (i.e., water droplets that are not touching a grounded user or object) on the touch screen of the disclosure may not appear on a fully bootstrapped scan of the touch screen, but may appear to various degrees on partially bootstrapped and mutual capacitance scans of the touch screen. Thus, a comparison of a fully bootstrapped scan of the touch screen and a partially bootstrapped and/or mutual capacitance scan of the touch screen can be used to identify the presence of water on the touch screen, and to ignore or discard the water from the final touch image that can be analyzed for touch activity. It is understood that the water detection and rejection schemes of the disclosure apply to isolated water droplets that may exist on the touch screen, not water droplets that may be touching a user's finger, for example.

Figure 8A:
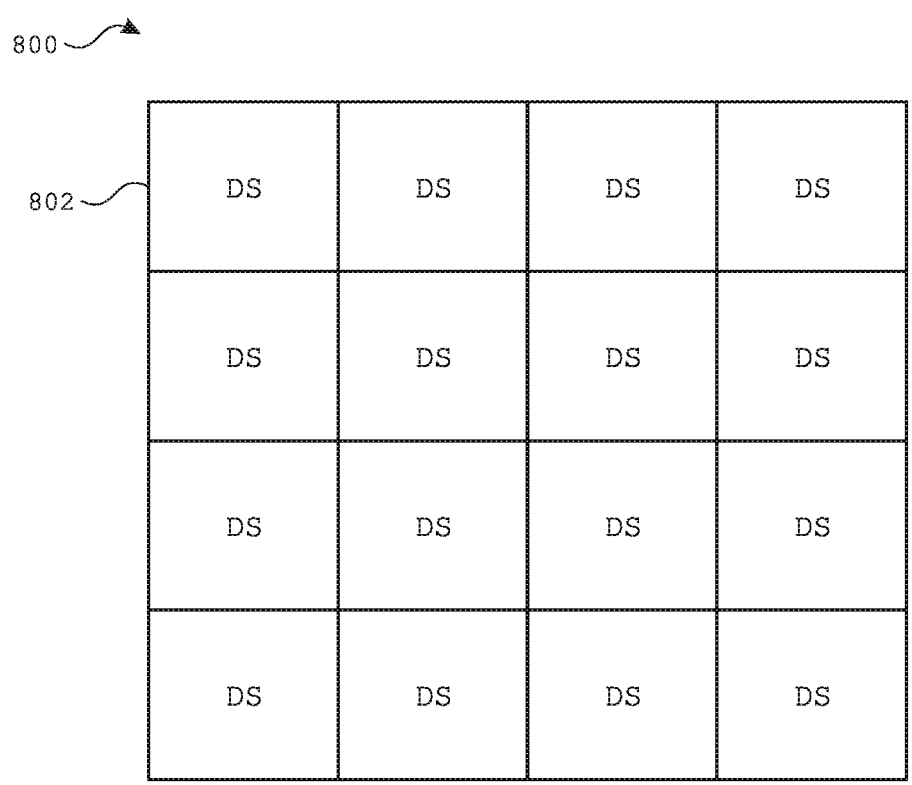
FIG. 8A illustrates an exemplary fully bootstrapped scan on a touch screen according to examples of the disclosure.

FIG. 8A illustrates an exemplary fully bootstrapped scan on touch screen 800, according to examples of the disclosure. The fully bootstrapped scan illustrated in FIG. 8A can be substantially similar to the fully bootstrapped scans illustrated in FIGS. 5A and 6A. As discussed above, touch activity on touch screen 800 may be sensed as a result of the fully bootstrapped scan illustrated (attenuated touch activity in the case of an ungrounded or poorly-grounded user), but water may not be. Thus, the fully bootstrapped scan of FIG. 8A can provide a touch image that includes touch activity but not water, the touch image having a resolution of 4×4 touch nodes (each of touch nodes 802 can be independently driven and sensed, whether simultaneously or otherwise).

Figure 8B:
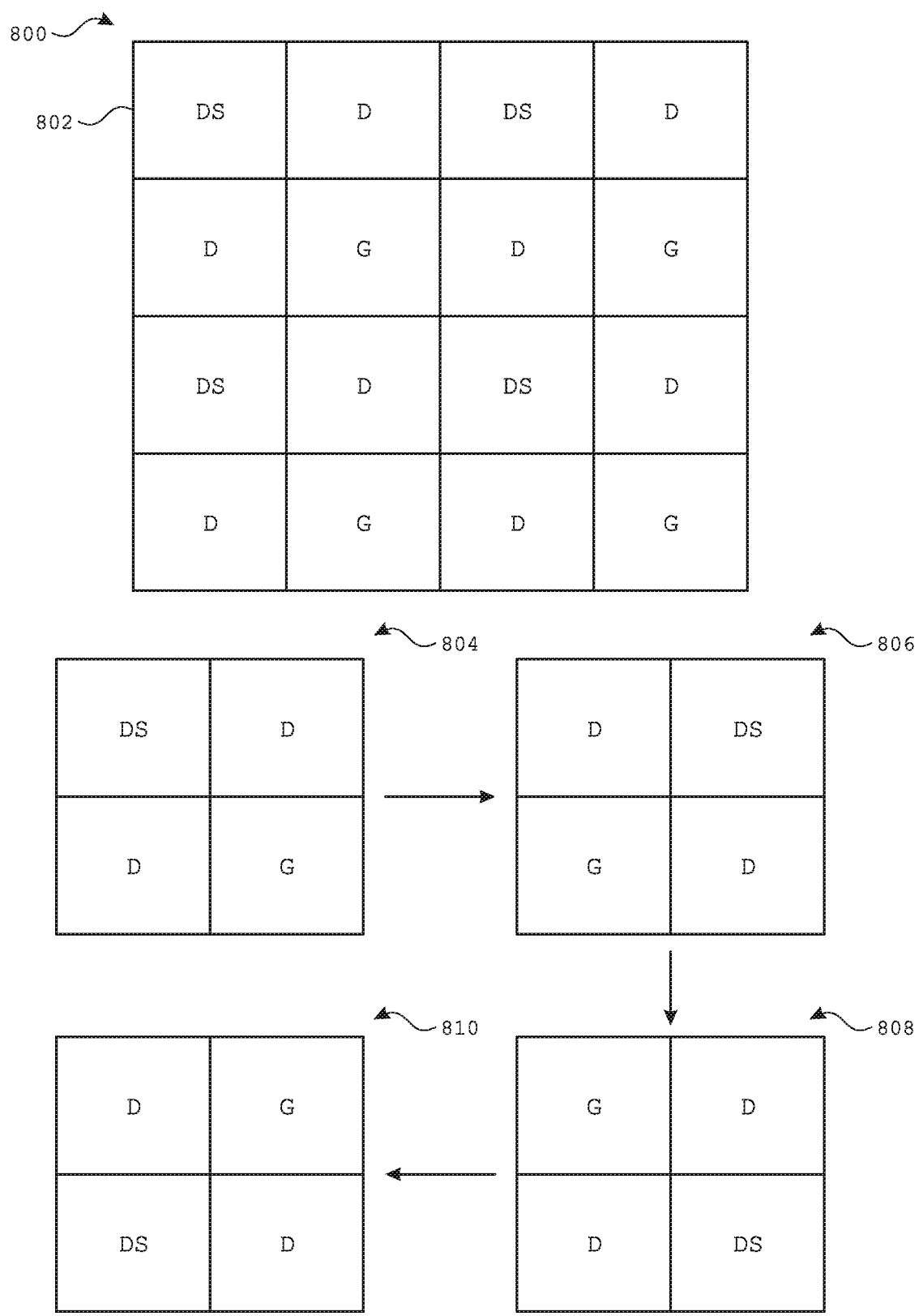
FIG. 8B illustrates an exemplary partially bootstrapped scan on a touch screen according to examples of the disclosure.

FIG. 8B illustrates an exemplary partially bootstrapped scan on touch screen 800, according to examples of the disclosure. The partially bootstrapped scan illustrated in FIG. 8B can be substantially similar to the partially bootstrapped scans illustrated in FIGS. 5B and 6B. In some examples, the partially bootstrapped scan can proceed in at least four steps, during which different ones of touch nodes 802 in a group of four touch nodes can be driven and sensed, driven but not sensed, and grounded. Specifically, in a first step 804, an upper-left touch node 802 can be driven and sensed, a lower-right touch node can be grounded, and the remaining two touch nodes (lower-left and upper-right) can be driven but not sensed. The second 806, third 808 and fourth 810 steps can drive and sense, drive but not sense, and ground different permutations of touch nodes, as illustrated, such that at the end of the fourth step, all of the touch nodes in the group of four touch nodes has been driven and sensed at some point in time. The order of scan steps provided is exemplary only, and it is understood that a different order of scan steps could be utilized.

Because water that may be on touch screen 800 can be reflected in a partially bootstrapped scan of the touch screen, as described above, the partially bootstrapped scan of FIG. 8B can result in a touch image that includes touch activity and water, the touch image having a resolution of 4×4 touch nodes. This touch image can be compared to the touch image obtained in FIG. 8A, which can include touch activity but not water, to determine whether water is present on touch screen 800, and the location(s) at which the water may be present—the parts of the touch image that are associated with the water can then be discarded or ignored when analyzing touch on the touch screen.

Figure 8C:
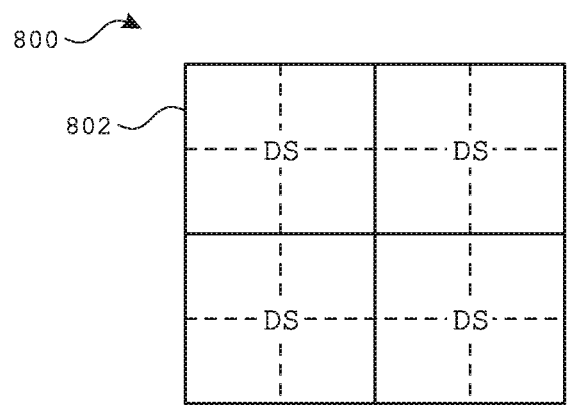
FIG. 8C illustrates an exemplary reduced-resolution fully bootstrapped scan on a touch screen according to examples of the disclosure.

In some examples, in order to save time or reduce the utilization of resources (e.g., sense circuitry), or both, the resolution of the fully bootstrapped scan of the touch screen can be reduced for water detection and rejection purposes if high resolution water rejection is not required (e.g., if water detection on a touch node electrode-level is not required). FIG. 8C illustrates an exemplary reduced-resolution fully bootstrapped scan on touch screen 800, according to examples of the disclosure. In the scan of FIG. 8C, instead of each touch node 802 individually being driven and sensed by individual sense circuitry (whether simultaneously or otherwise), groups of four touch nodes can be driven and sensed by the same sense circuitry. This can reduce the amount of sense circuitry required as compared with the scan of FIG. 8A and/or can reduce the amount of time required to scan the entire touch screen 800, because larger portions of the touch screen can be driven and sensed at once. However, as a result, the resolution of the resulting touch image can be reduced to 2×2 "compound touch nodes" (2×2 touch node groups). This reduced-resolution touch image can be compared to, for example, the touch image obtained from the partially bootstrapped scan of FIG. 8B to determine whether water is present on touch screen 800, and the location(s) at which the water may be present, as before—the parts of the touch image that are associated with the water can then be discarded or ignored when analyzing touch on the touch screen, albeit at a lower resolution than before.

FIGS. 8A-8C describe a water detection and rejection scheme in which a fully bootstrapped touch scan is compared with a partially bootstrapped touch scan to determine the presence and/or location of water on the touch screen. In some examples, an alternative water detection and rejection scheme can be utilized that can be based on a fully bootstrapped touch scan and a mutual capacitance scan.

Figure 9A:
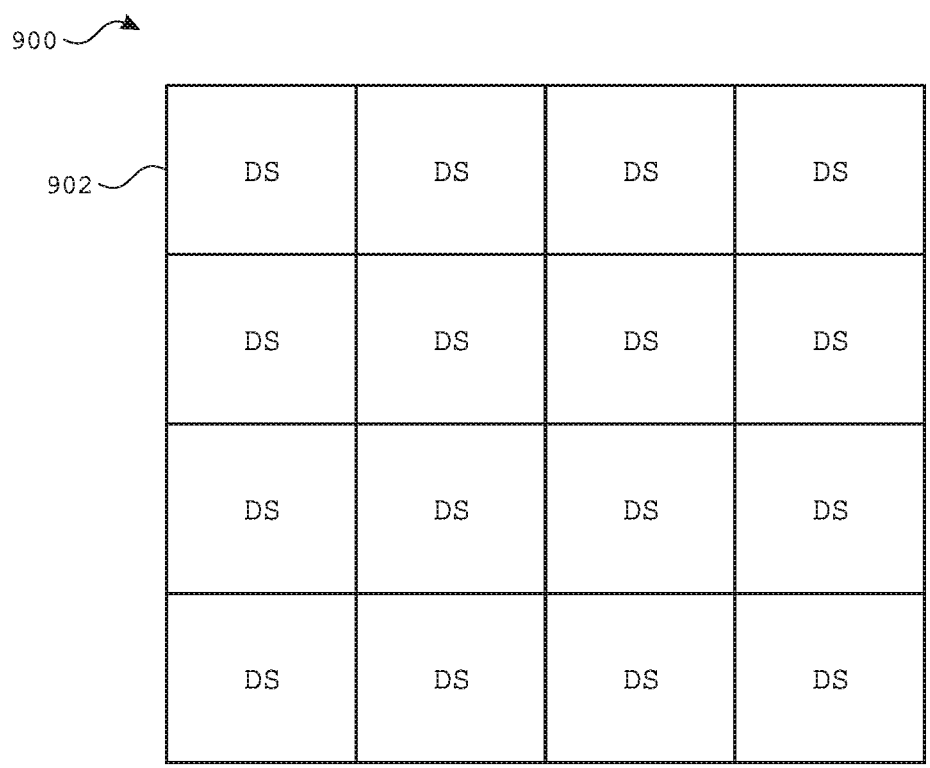
FIG. 9A illustrates an exemplary fully bootstrapped scan on a touch screen according to examples of the disclosure.

FIG. 9A illustrates an exemplary fully bootstrapped scan on touch screen 900, according to examples of the disclosure. The scan of FIG. 9A can be the same as the scan of FIG. 8A, the details of which will be omitted here for brevity.

Figure 9B:
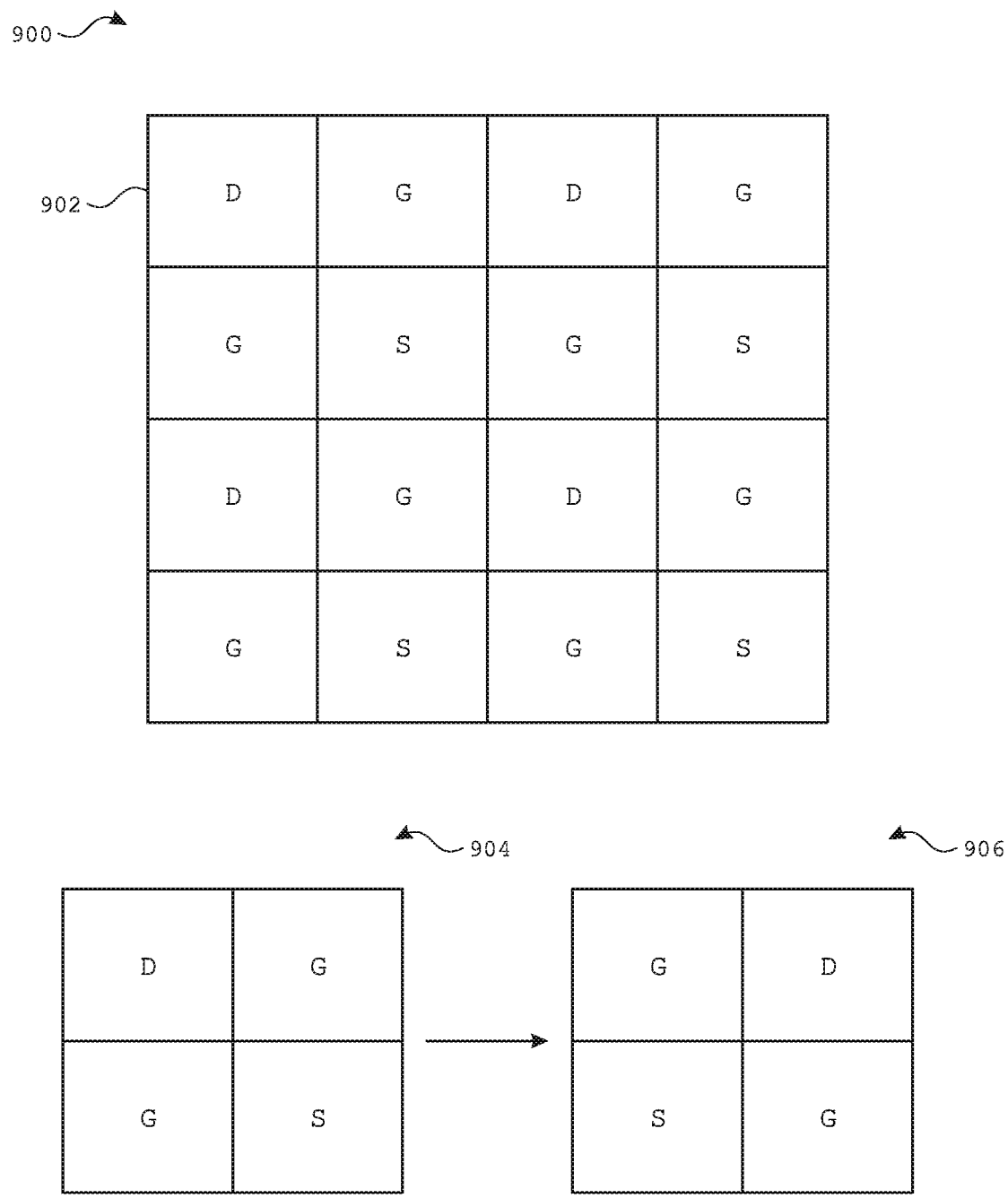
FIG. 9B illustrates an exemplary mutual capacitance scan on a touch screen according to examples of the disclosure.

FIG. 9B illustrates an exemplary mutual capacitance scan on touch screen 900, according to examples of the disclosure. The mutual capacitance scan illustrated in FIG. 9B can be substantially similar to the mutual capacitance scan illustrated in FIG. 6C. In some examples, the mutual capacitance scan can proceed in at least two steps, during which different ones of touch nodes 902 in a group of four touch nodes can be driven, sensed and grounded, as previously described. Specifically, in a first step 904, an upper-left touch node 902 can be driven, a lower-right touch node can be sensed, and the remaining two touch nodes (lower-left and upper-right) can be grounded. The second step 906 can drive, sense and ground different permutations of touch nodes, as illustrated, such that at the end of the second step, a mutual capacitance of both pairs of the touch nodes in the group of four touch nodes has been sensed at some point in time. The order and exact configuration of scan steps provided is exemplary only, and it is understood that a different order of scan steps could be utilized.

Because water that may be on touch screen 900 can be reflected in a mutual capacitance scan of the touch screen, as described above, the mutual capacitance scan of FIG. 9B can result in a touch image that includes touch activity and water. This touch image can be compared to the touch image obtained in FIG. 9A, which can include touch activity but not water, to determine whether water is present on touch screen 900, and the location(s) at which the water may be present—the parts of the touch image that are associated with the water can then be discarded or ignored when analyzing touch on the touch screen.

Figure 9C:
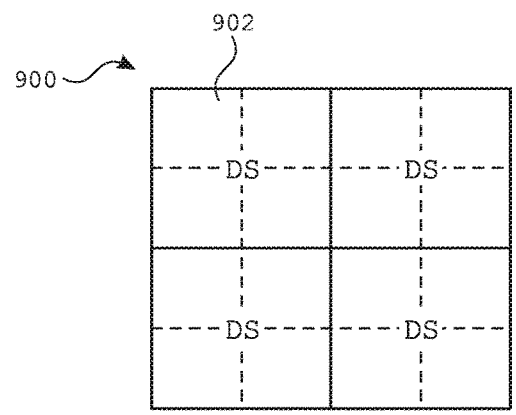
FIG. 9C illustrates an exemplary reduced-resolution fully bootstrapped scan on a touch screen according to examples of the disclosure.

As before, in some examples, in order to save time or reduce the utilization of resources (e.g., sense circuitry), or both, the resolution of the fully bootstrapped scan of the touch screen can be reduced for water detection and rejection purposes if high resolution water rejection is not required (e.g., if water detection on a touch node electrode-level is not required). FIG. 9C illustrates an exemplary reduced-resolution fully bootstrapped scan on touch screen 900, according to examples of the disclosure. The scan of FIG. 9C, and the resulting water detection and rejection scheme, can be similar to as described with reference to FIG. 8C, the details of which will not be repeated here for brevity.

Various touch screen display frame and touch frame configurations will now be described in which the water detection and rejection schemes of FIGS. 8A-8C and 9A-9C can be utilized. The configurations provided are exemplary only, and it is understood that other configurations based on similar principles can be utilized with similar results.

Figure 10A:
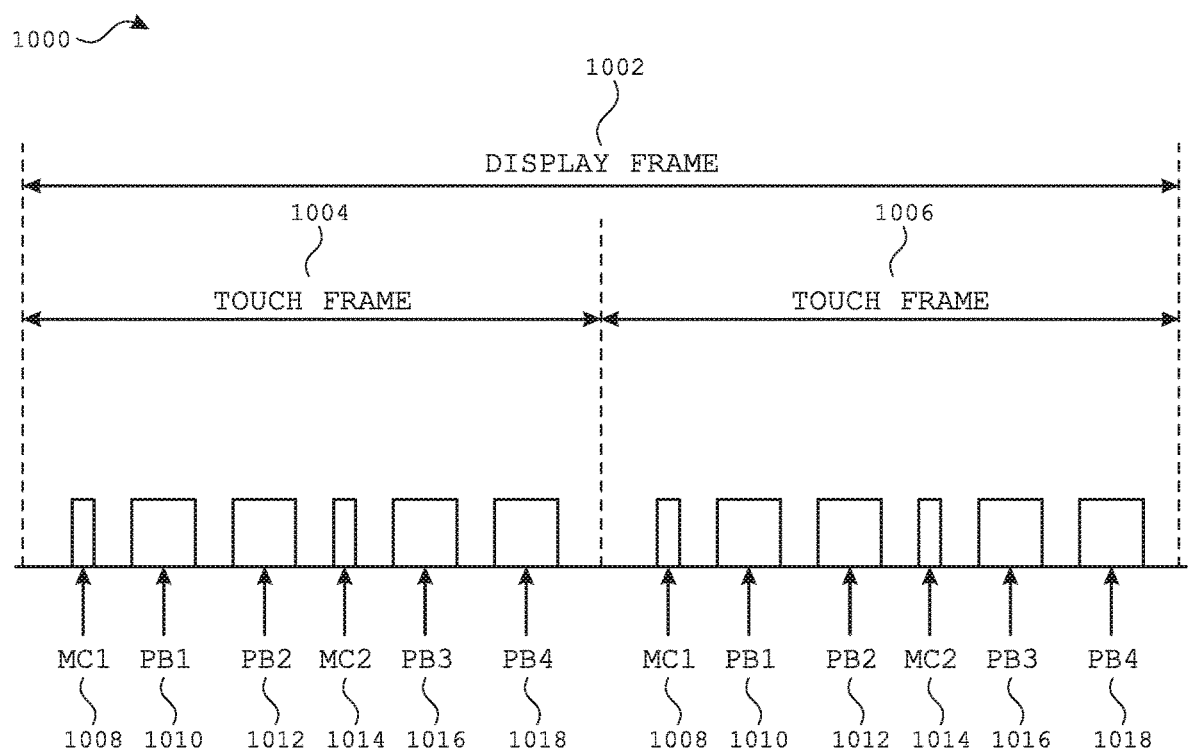
FIG. 10A illustrates an exemplary foundational touch screen display frame and touch frame configuration according to examples of the disclosure.

FIG. 10A illustrates an exemplary foundational touch screen display frame and touch frame configuration 1000 according to examples of the disclosure. Display frame 1002 can be a duration during which a display portion of the touch screen of the disclosure can be updated. Display frame 1002 can include two touch frames—touch frame 1004 and touch frame 1006—during which touch activity on all portions of the touch screen can be detected (e.g., touch activity can be scanned at a faster rate than the display can be updated—in some examples, twice the rate). In other words, in some examples, touch frame 1004 can be a first duration during which touch activity on all portions of the touch screen can be detected, and touch frame 1006 can be a second duration during which touch activity on all portions of the touch screen can be detected. The one-to-two relationship of display frame 1002 to touch frames 1004 and 1006 is provided by way of example only, and it is understood that for the example of FIG. 10A, and all examples of the disclosure, other ratios of display frames to touch frames can be utilized.

Touch frame 1004 can include scan steps MC1 1008 and MC2 1014. MC1 1008 and MC2 1014 can correspond to mutual capacitance scan steps 904 and 906 in FIG. 9B, respectively. As described above, in some examples, MC1 1008 and MC2 1014 can be used to correct for ungrounded user touch signal attenuation, or water detection and rejection, or both.

In touch frame 1004, MC1 1008 and MC2 1014 can be separated by PB1 1010 and PB2 1012. PB1 1010 and PB2 1012 can correspond to partially bootstrapped scan steps 804, 806, 808 and 810 performed in different regions of the touch screen. In other words, PB1 1010 can correspond to a partially bootstrapped scan step performed in a first region of the touch screen, and PB2 1012 can correspond to a partially bootstrapped scan step performed in a second region of the touch screen. Similarly, PB3 1016 and PB4 1018 can correspond to partially bootstrapped scan steps performed in a third and fourth region of the touch screen, respectively. Taken together, PB1 1010, PB2 1012, PB3 1016 and PB4 1018 can provide a complete, partially bootstrapped touch image across the touch screen. The details of PB1 1010, PB2 1012, PB3 1016 and PB4 1018 will be described in further detail below. As described above, in some examples, PB1 1010, PB2 1012, PB3 1016 and PB4 1018 can be used to obtain a touch image on the touch screen and/or to correct for ungrounded user touch signal attenuation. Touch frame 1006 can be the same as touch frame 1004.

Figure 10B:
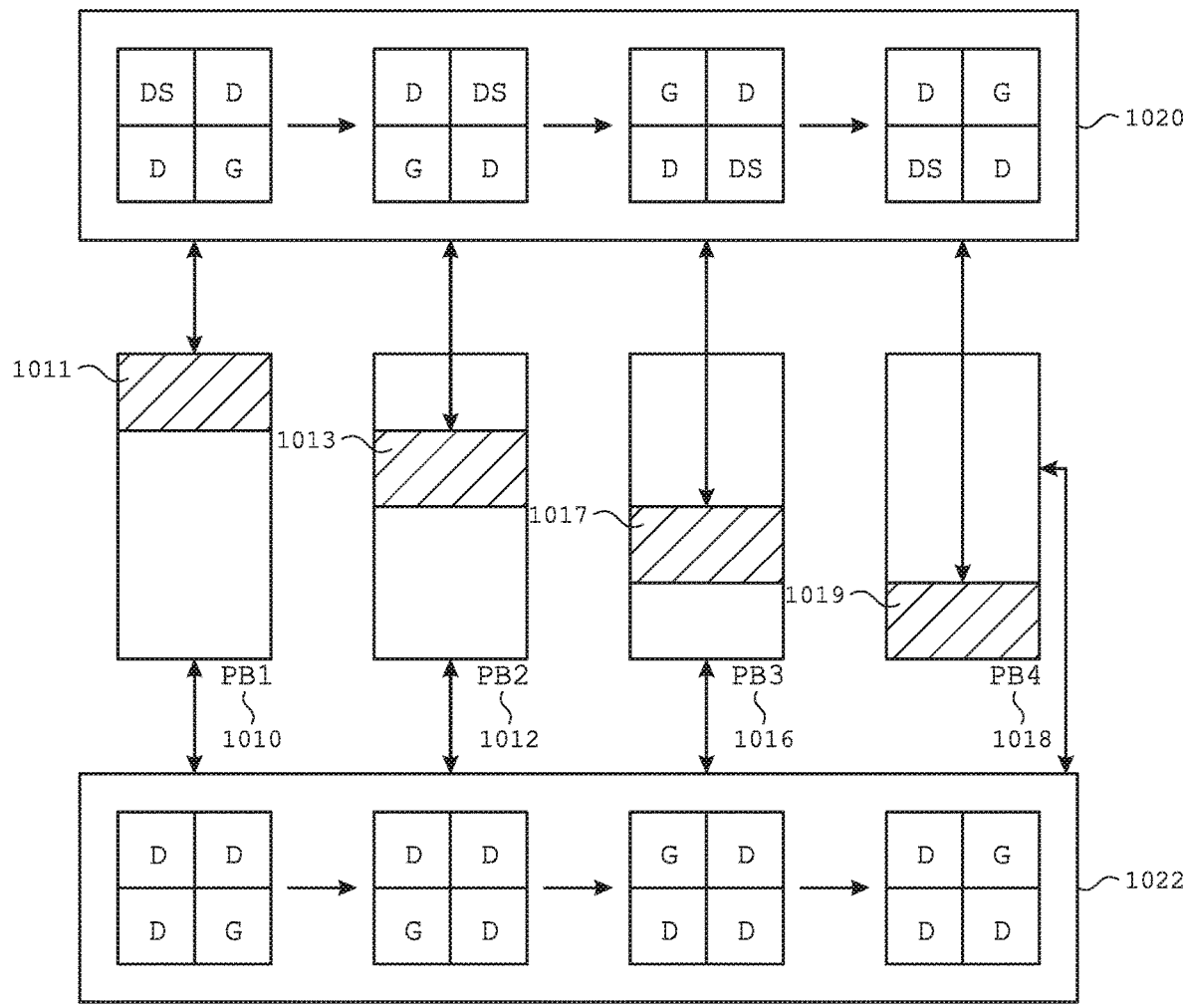
FIG. 10B illustrates exemplary details of the partially bootstrapped scan steps in FIG. 10A according to examples of the disclosure.

FIG. 10B illustrates exemplary details of the partially bootstrapped scan steps in FIG. 10A. In some examples, the amount of sense circuitry required to scan the touch screen of the disclosure can be reduced by scanning the touch screen portion by portion, instead of all at once, as will be described in more detail below. During PB1 1010, a first portion 1011 (e.g., a first quarter) of the touch screen can be scanned using a partial bootstrapping scanning scheme. As part of this scan, the touch node electrodes of the first portion 1011 of the touch screen can be scanned in configurations illustrated in pattern 1020 (similar to scan steps 804, 806, 808 and 810 as described with reference to FIG. 8C). The remaining portions of the touch screen can be driven in configurations illustrated in pattern 1022 that can be in correspondence with the configurations illustrated in pattern 1020. The scan configurations in pattern 1022 can be the same as the scan configurations in pattern 1020, except that the DS touch node electrodes in pattern 1020 can be driven but not sensed in pattern 1022 (i.e., the DS touch node electrodes can become D touch node electrodes).

The details of scan steps PB2 1012, PB3 1016 and PB4 1018 can be analogous to those of PB1 1010, the details of which will not be repeated for brevity. When taken together, PB1 1010, PB2 1012, PB3 1016 and PB4 1018 can provide a partially bootstrapped touch image of the entire touch screen. It is understood that in some examples, a partially bootstrapped touch image of the entire touch screen can be obtained in fewer or more than the number of scans presented here (e.g., all of touch screen can be scanned according to pattern 1020 at the same time); however, scanning of only portions of the touch screen at a given time can reduce the amount of sense circuitry required. The examples of the disclosure will generally be provided assuming scans of portions of the touch screen, but the scope of the disclosure is not so limited.

Figure 11A:
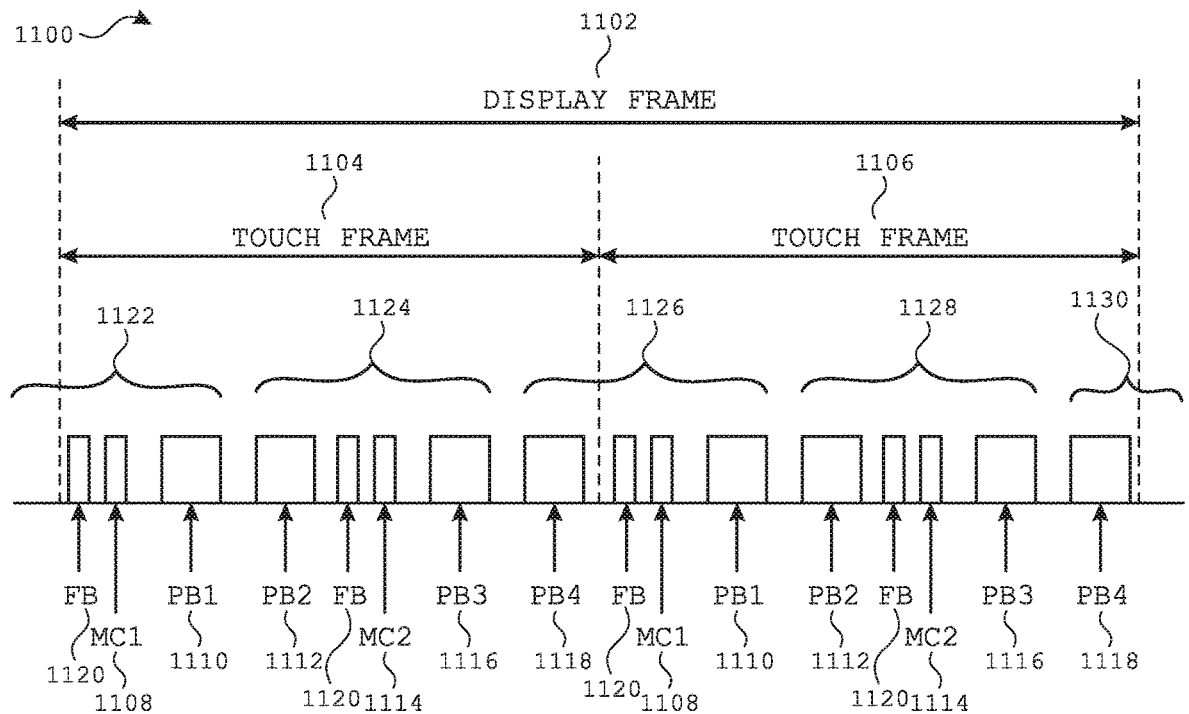
FIG. 11A illustrates an exemplary water detection and rejection display frame and touch frame configuration according to examples of the disclosure.

FIG. 11A illustrates an exemplary water detection and rejection display frame and touch frame configuration 1100, according to examples of the disclosure. Similar to before, display frame 1102 can include two touch frames 1104 and 1106. Touch frame 1104 can be substantially similar to touch frame 1004 in FIG. 10A, except that touch frame 1104 can additionally include scan steps FB 1120 before scan step MC1 1108 and MC2 1114. FB 1120 can correspond to a fully bootstrapped scan step as illustrated in FIG. 8A, 8C, 9A or 9C. PB1 1110, PB2 1112, PB3 1116, PB4 1118, MC1 1108 and MC2 1114 can correspond to PB1 1010, PB2 1012, PB3 1016, PB4 1018, MC1 1008 and MC2 1014 in FIG. 10A.

FB 1120 can provide a fully bootstrapped touch image of the entire touch screen. In some examples, this fully bootstrapped touch image can be full-resolution (sensed all at once or portion by portion), or can be reduced-resolution, as previously described—this can apply to one or more of the example scan configurations described in this disclosure. The partially bootstrapped touch images from PB1 1110, PB2 1112, PB3 1116 and PB4 1118 can be compared with the fully bootstrapped touch images from FB 1120 to detect and reject water, as described above. In some examples, the fully bootstrapped touch images from FB 1120 can be compared with less than all of PB1 1110, PB2 1112, PB3 1116 and PB4 1118 such that water can be detected and rejected one or more portions of touch screen at a time. For example, FB 1120 in portion 1124 of touch frame 1104 can be compared with PB2 1112 and PB3 1116 in portion 1124 of touch frame 1104 to detect and reject water in the portions of the touch screen corresponding to scan steps PB2 and PB3. Similarly, FB 1120 in portion 1126 of touch frames 1104 and 1106 can be compared with PB4 1118 and PB1 1110 in portion 1126 of touch frames 1104 and 1106 to detect and reject water in the portions of the touch screen corresponding to scan steps PB4 and PB1. Other portions of touch frames (e.g., portions 1122, 1128 and 1130) can operate analogously to above.

An advantage to distributing FB 1120 at various positions within the touch frames, and detecting and rejecting water within portions of the touch frames, can be that changes in touch images (e.g., due to a moving finger, or moving water) during water detection and rejection periods can be minimized—such changes in touch images can adversely affect proper water detection and rejection, as it can be more difficult to accurately align various types of touch images (e.g., fully bootstrapped touch images and mutual capacitance touch images, or fully bootstrapped touch images and partially bootstrapped touch images) when comparing the touch images.

In some examples, MC1 1108 and MC2 1114 may be utilized for water detection and rejection in conjunction with FB 1120 in a manner similar to above, for other purposes such as correcting for ungrounded user touch signal attenuation, or both. Alternatively, in some examples, MC1 1108, MC2 1114, or both, may be removed from touch frames 1104 and 1106. In some examples, the order of FB 1120 and MC1 1108/MC2 1114 can be swapped to achieve substantially the same result. Such swapping of scan order can analogously be implemented in one or more of the other examples of the disclosure.

Figure 11B:
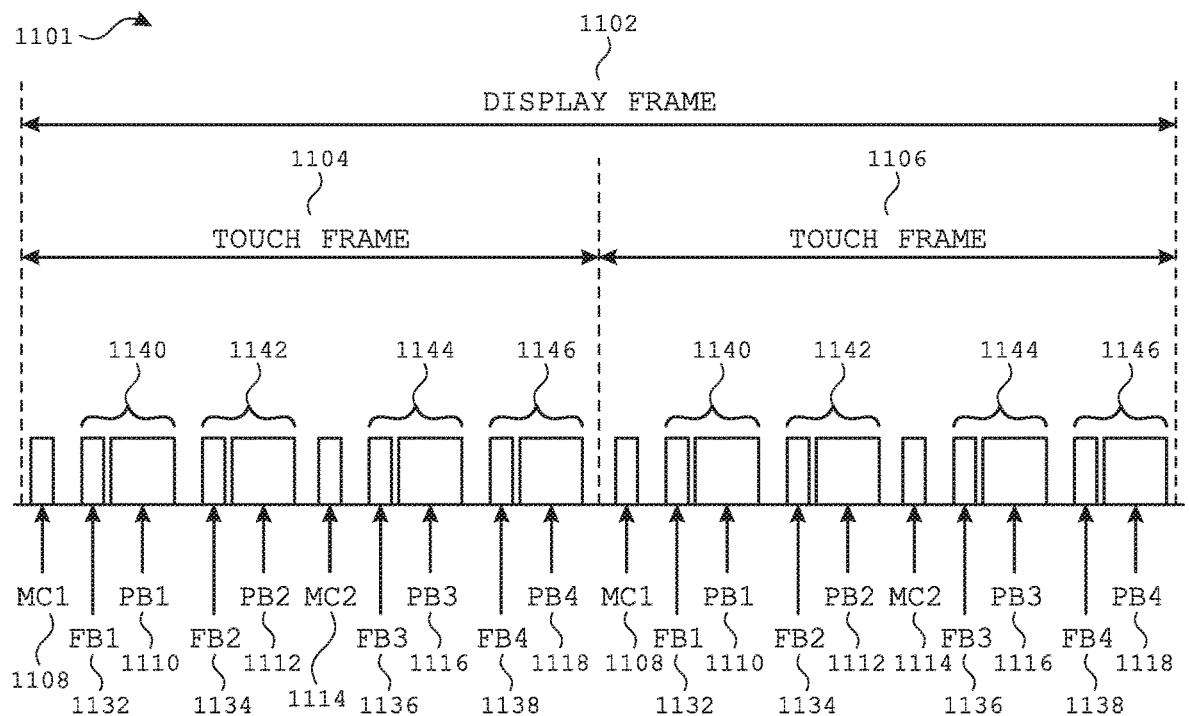
FIG. 11B illustrates another exemplary water detection and rejection display frame and touch frame configuration according to examples of the disclosure.

FIG. 11B illustrates another exemplary water detection and rejection display frame and touch frame configuration 1101 according to examples of the disclosure. Similar to before, display frame 1102 can include two touch frames 1104 and 1106. Touch frames 1104 and 1106 in configuration 1101 can be substantially similar to touch frames 1104 and 1106 in configuration 1100 in FIG. 11A, except that FB 1120 in configuration 1100 can be separated into FB1 1132, FB2 1134, FB3 1136 and FB4 1138 in configuration 1101 in FIG. 11B.

Specifically, FB1 1132 can precede PB1 1110 in touch frame 1104. FB1 1132 can correspond to a fully bootstrapped scan step as illustrated in FIG. 8A, 8C, 9A or 9C performed in a first region of the touch screen, similar to how PB1 1110 can correspond to a partially bootstrapped scan step performed in the first region of the touch screen, as described previously. The details of FB1 1132 will be described with reference to FIG. 11C.

FB1 1132 can provide a fully bootstrapped touch image in the first region of the touch screen, and PB1 1110 can provide a partially bootstrapped touch image in the first region of the touch screen. Thus, in region 1140 of touch frame 1104, FB1 1132 and PB1 1110 can be used to perform water detection and rejection in the first portion of the touch screen. FB2 1134, FB3 1136 and FB4 1138 and corresponding PB2 1112, PB3 1116 and PB4 1118 can analogously be used to perform water detection and rejection in second, third and fourth regions of the touch screen, respectively. As before, an advantage to distributing FB1 1132, FB2 1134, FB3 1136 and FB4 1138 at various positions within the touch frames, and detecting and rejecting water within corresponding portions of the touch screen, can be that changes in touch images (e.g., due to a moving finger, or moving water) during water detection and rejection periods can be minimized—such changes in touch images can adversely affect proper water detection and rejection, as it can be more difficult to accurately align various types of touch images (e.g., fully bootstrapped touch images and mutual capacitance touch images, or fully bootstrapped touch images and partially bootstrapped touch images) when comparing the touch images.

In some examples, MC1 1108 and MC2 1114 may be utilized for water detection and rejection in conjunction with FB1 1132, FB2 1134, FB3 1136 and FB4 1138 in a manner similar to above, for other purposes such as correcting for ungrounded user touch signal attenuation, or both. Alternatively, in some examples, MC1 1108, MC2 1114, or both, may be removed from touch frames 1104 and 1106.

Figure 11C:
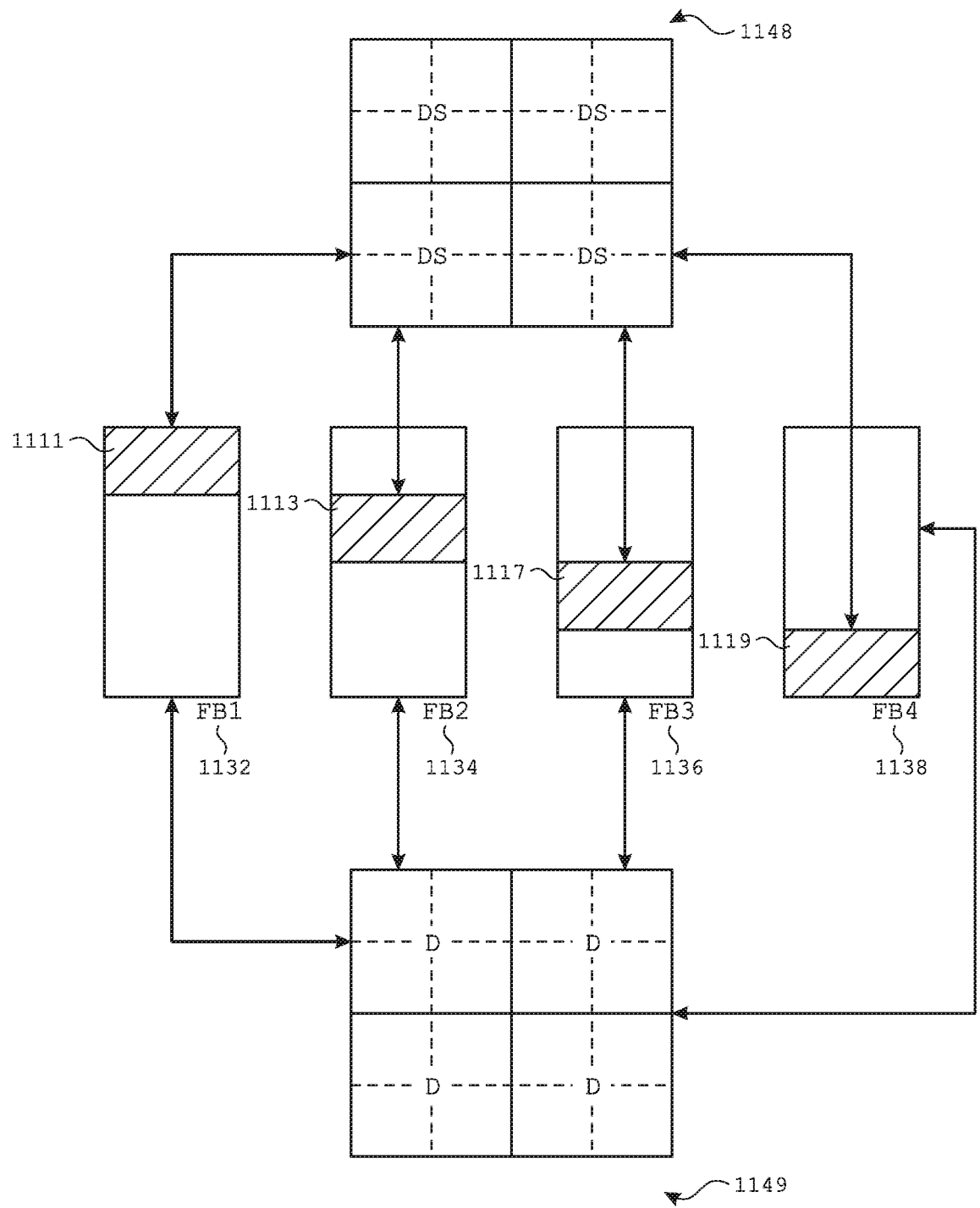
FIG. 11C illustrates exemplary details of the fully bootstrapped scan steps in FIG. 11B according to examples of the disclosure.

FIG. 11C illustrates exemplary details of the fully bootstrapped scan steps in FIG. 11B. During FB1 1132, a first portion 1111 (e.g., a first quarter) of the touch screen can be scanned using a fully bootstrapped scanning scheme. As part of this scan, the touch node electrodes of the first portion 1111 of the touch screen can be scanned in configurations illustrated in pattern 1148 (similar to the scan steps of FIGS. 8C and 9C), although it is understood the touch node electrodes of the first portion of the touch screen can be scanned as described with reference to FIGS. 8A and 9A, instead. The remaining portions of the touch screen can be driven in the configuration illustrated in pattern 1149. The scan configuration in pattern 1149 can be the same as the scan configuration in pattern 1148, except that the DS touch node electrodes in pattern 1148 can be driven but not sensed in pattern 1149 (i.e., the DS touch node electrodes can become D touch node electrodes).

The details of scan steps FB2 1134, FB3 1136 and FB4 1138 can be analogous to those of FB1 1132, and will not be repeated for brevity. When taken together, FB1 1132, FB2 1134, FB3 1134 and FB4 1138 can provide a fully bootstrapped touch image of the entire touch screen. It is understood that in some examples, a fully bootstrapped touch image of the entire touch screen can be obtained in fewer or more than the number of scans presented here (e.g., all of touch screen can be scanned according to pattern 1148 at the same time); however, scanning of only portions of the touch screen at a given time can reduce the amount of sense circuitry required. The examples of the disclosure will generally be provided assuming scans of portions of the touch screen, but the scope of the disclosure is not so limited.

Figure 11D:
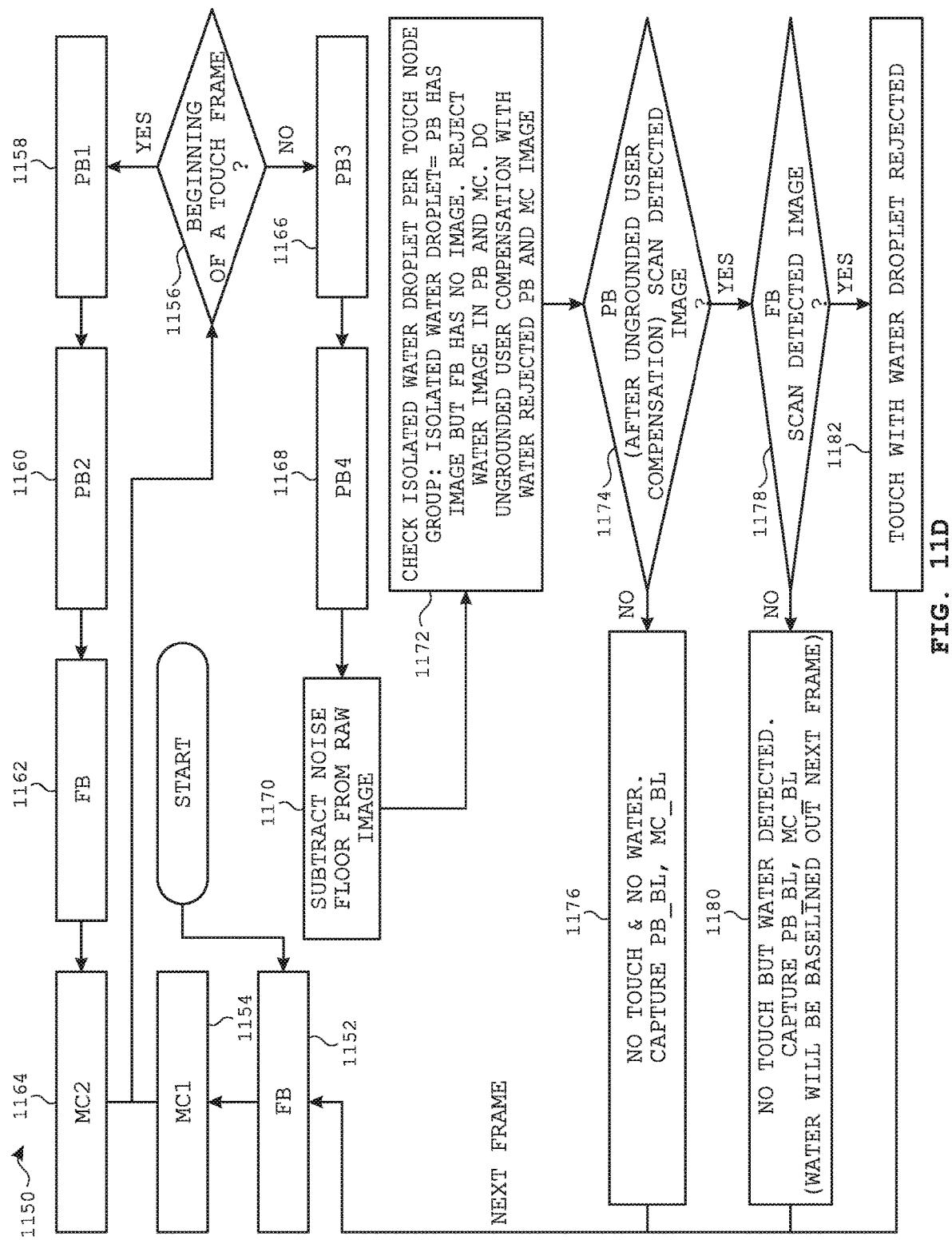
FIG. 11D illustrates an exemplary process corresponding to the water detection and rejection steps of FIG. 11A according to examples of the disclosure.

FIG. 11D illustrates an exemplary process 1150 corresponding to the water detection and rejection steps of FIG. 11A. At 1152, process 1150 can start with a fully bootstrapped scan of the touch screen (e.g., FB 1120). At 1154, a first mutual capacitance scan of the touch screen can be performed (e.g., MC1 1108). At 1156, whether process 1150 is at the beginning of a touch frame (e.g., touch frame 1104) can be determined. In some examples, this can be determined by checking whether one or two fully bootstrapped scans of the touch screen (e.g., FB 1120) have occurred—if one, then the answer to 1156 can be yes, if two, then the answer to 1156 can be no. If process 1150 is at the beginning of a touch frame, a first partially bootstrapped scan of the touch screen can be performed at 1158 (e.g., PB1 1110). At 1160, a second partially bootstrapped scan of the touch screen can be performed (e.g., PB2 1112). At 1162, a fully bootstrapped scan of the touch screen can be performed (e.g., FB 1120). At 1164, a second mutual capacitance scan of the touch screen can be performed (e.g., MC2 1114).

If process 1150 is not at the beginning of a touch frame at 1156, a third partially bootstrapped scan of the touch screen can be performed at 1166 (e.g., PB3 1116). At 1168, a fourth partially bootstrapped scan of the touch screen can be performed (e.g., PB4 1118).

At 1170, a noise floor can be subtracted from the total partially bootstrapped touch image obtained from the first, second, third and fourth partially bootstrapped scans of the touch screen. Step 1170 can include subtracting any baseline touch measurements that may be stored from previous scans (e.g., baseline partially bootstrapped touch images, baseline mutual capacitance touch images, etc.).

At 1172, the presence of water on the touch screen can be checked. Specifically, if the partially bootstrapped scans of the touch screen contain portions of touch images that are not contained in the fully bootstrapped scans of the touch screen, then those portions of touch images can be attributed to water present on the touch screen. The portions of the partially bootstrapped touch images attributed to water can be removed from the original partially bootstrapped touch images to give water-rejected partially bootstrapped touch images, and the portions of the partially bootstrapped touch images attributed to the water can be removed from the original mutual capacitance touch images as well to give water-rejected mutual capacitance touch images. The water-rejected partially bootstrapped touch images and the water-rejected mutual capacitance touch images can be used to perform ungrounded user compensation on the original partially bootstrapped touch images to give compensated partially bootstrapped touch images.

At 1174, the compensated partially bootstrapped touch images can be analyzed to determine whether touch activity (whether due to water or actual touch) exists in the touch images. If no touch activity exists, then at 1176, it can be determined that there is no touch and no water on the touch screen, and the above-measured partially bootstrapped touch images and mutual capacitance touch images can be captured/stored to be used as baseline measurements in subsequent scans.

If touch activity exists in the compensated partially bootstrapped touch images at 1174, at 1178, it can be determined whether the fully bootstrapped touch images contain touch activity. If no touch activity exists, then at 1180, it can be determined that there is no actual touch on the touch screen, but there is water on the touch screen. The above-measured partially bootstrapped touch images and mutual capacitance touch images can be captured/stored to be used as baseline measurements that can be used to baseline out the effect of water in subsequent scans.

If touch activity exists in the fully bootstrapped touch images at 1178, at 1182, it can be determined that actual touch activity and water exist on the touch screen. The touch activity due to water can be rejected from the compensated partially bootstrapped touch images by comparing the fully bootstrapped touch images and the compensated partially bootstrapped touch images, as described in this disclosure, and water-rejected touch activity can result, which can be utilized by the system to perform touch-related functions.

Figure 11E:
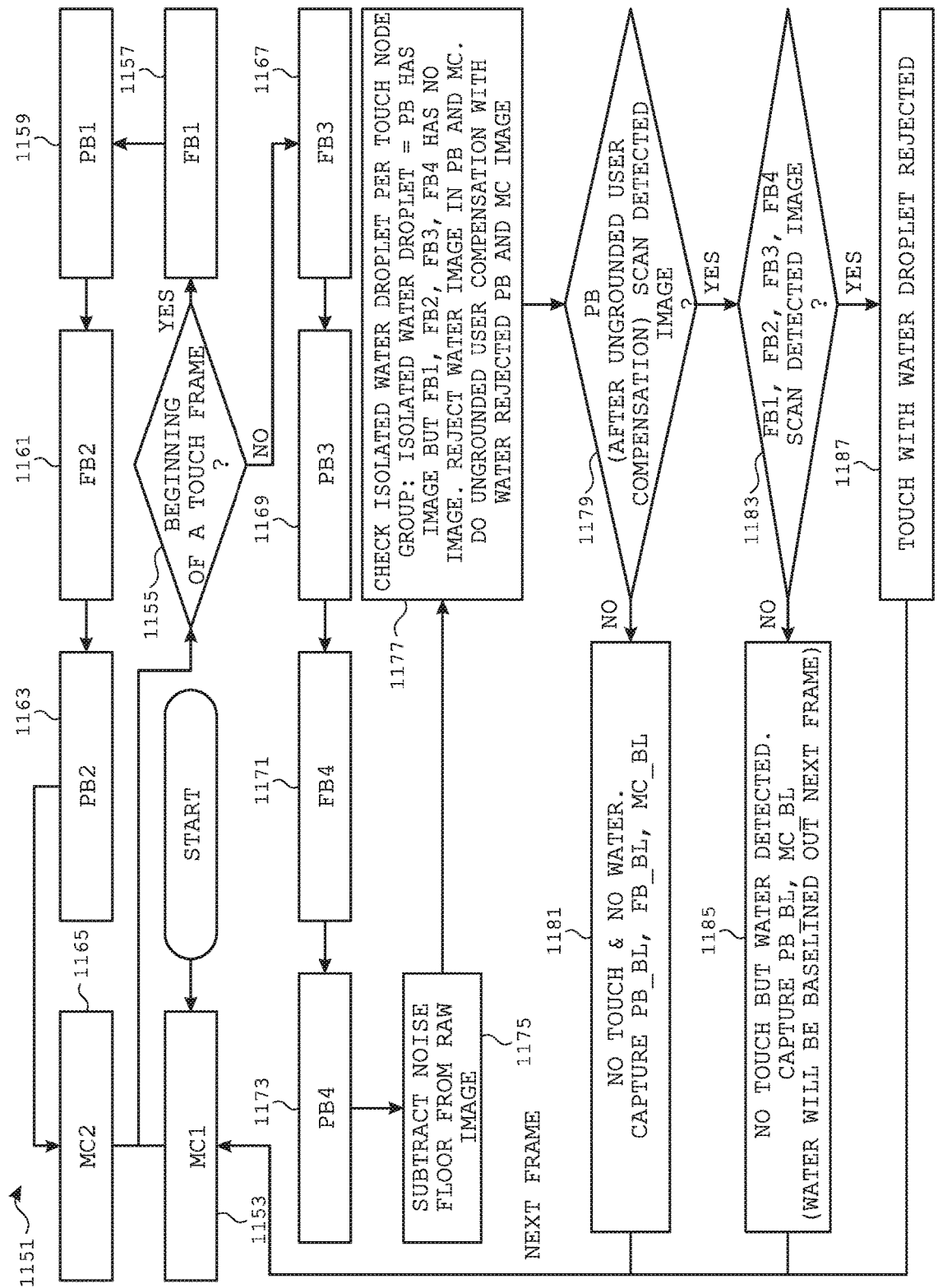
FIG. 11E illustrates an exemplary process corresponding to the water detection and rejection steps of FIG. 11B according to examples of the disclosure.

FIG. 11E illustrates an exemplary process 1151 corresponding to the water detection and rejection steps of FIG. 11B. At 1153, process 1151 can start with a first mutual capacitance scan of the touch screen (e.g., MC1 1108). At 1155, whether process 1151 is at the beginning of a touch frame (e.g., touch frame 1104) can be determined. In some examples, this can be determined by checking whether one or two mutual capacitance scans of the touch screen (e.g., MC1 1108, MC2 1114) have occurred—if one, then the answer to 1155 can be yes, if two, then the answer to 1155 can be no. If process 1151 is at the beginning of a touch frame, a first fully bootstrapped scan of the touch screen can be performed at 1157 (e.g., FB1 1132). At 1159, a first partially bootstrapped scan of the touch screen can be performed (e.g., PB1 1110). At 1161, a second fully bootstrapped scan of the touch screen can be performed (e.g., FB2 1134). At 1163, a second partially bootstrapped scan of the touch screen can be performed (e.g., PB2 1112). At 1165, a second mutual capacitance scan of the touch screen can be performed (e.g., MC2 1114).

If process 1151 is not at the beginning of a touch frame at 1155, a third fully bootstrapped scan of the touch screen can be performed at 1167 (e.g., FB3 1136). At 1169, a third partially bootstrapped scan of the touch screen can be performed (e.g., PB3 1116). At 1171, a fourth fully bootstrapped scan of the touch screen can be performed (e.g., FB4 1138). At 1173, a fourth partially bootstrapped scan of the touch screen can be performed (e.g., PB4 1118).

At 1175, a noise floor can be subtracted from the total partially bootstrapped touch image obtained from the first, second, third and fourth partially and/or fully bootstrapped scans of the touch screen. Step 1175 can include subtracting any baseline touch measurements that may be stored from previous scans (e.g., baseline partially bootstrapped touch images, baseline mutual capacitance touch images, baseline fully bootstrapped touch images, etc.).

At 1177, the presence of water on the touch screen can be checked. Specifically, if the partially bootstrapped scans of the touch screen contain portions of touch images that are not contained in the fully bootstrapped scans of the touch screen, then those portions of touch images can be attributed to water present on the touch screen. The portions of the partially bootstrapped touch images attributed to water can be removed from the original partially bootstrapped touch images to give water-rejected partially bootstrapped touch images, and the portions of the partially bootstrapped touch images attributed to the water can be removed from the original mutual capacitance touch images as well to give water-rejected mutual capacitance touch images. The water-rejected partially bootstrapped touch images and the water-rejected mutual capacitance touch images can be used to perform ungrounded user compensation on the original partially bootstrapped touch images to give compensated partially bootstrapped touch images.

At 1179, the compensated partially bootstrapped touch images can be analyzed to determine whether touch activity (whether due to water or actual touch) exists in the touch images. If no touch activity exists, then at 1181, it can be determined that there is no touch and no water on the touch screen, and the partially bootstrapped touch images, the above-measured mutual capacitance touch images and fully bootstrapped touch images can be captured/stored to be used as baseline measurements in subsequent scans.

If touch activity exists in the compensated partially bootstrapped touch images at 1179, at 1183, it can be determined whether the fully bootstrapped touch images contain touch activity. If no touch activity exists, then at 1185, it can be determined that there is no actual touch on the touch screen, but there is water on the touch screen. The above-measured partially bootstrapped touch images and mutual capacitance touch images can be captured/stored to be used as baseline measurements that can be used to baseline out the effect of water in subsequent scans.

If touch activity exists in the fully bootstrapped touch images at 1183, at 1187, it can be determined that actual touch activity and water exist on the touch screen. The touch activity due to water can be rejected from the compensated partially bootstrapped touch images by comparing the fully bootstrapped touch images and the compensated partially bootstrapped touch images, as described in this disclosure, and water-rejected touch activity can result, which can be utilized by the system to perform touch-related functions.

Figure 12A:
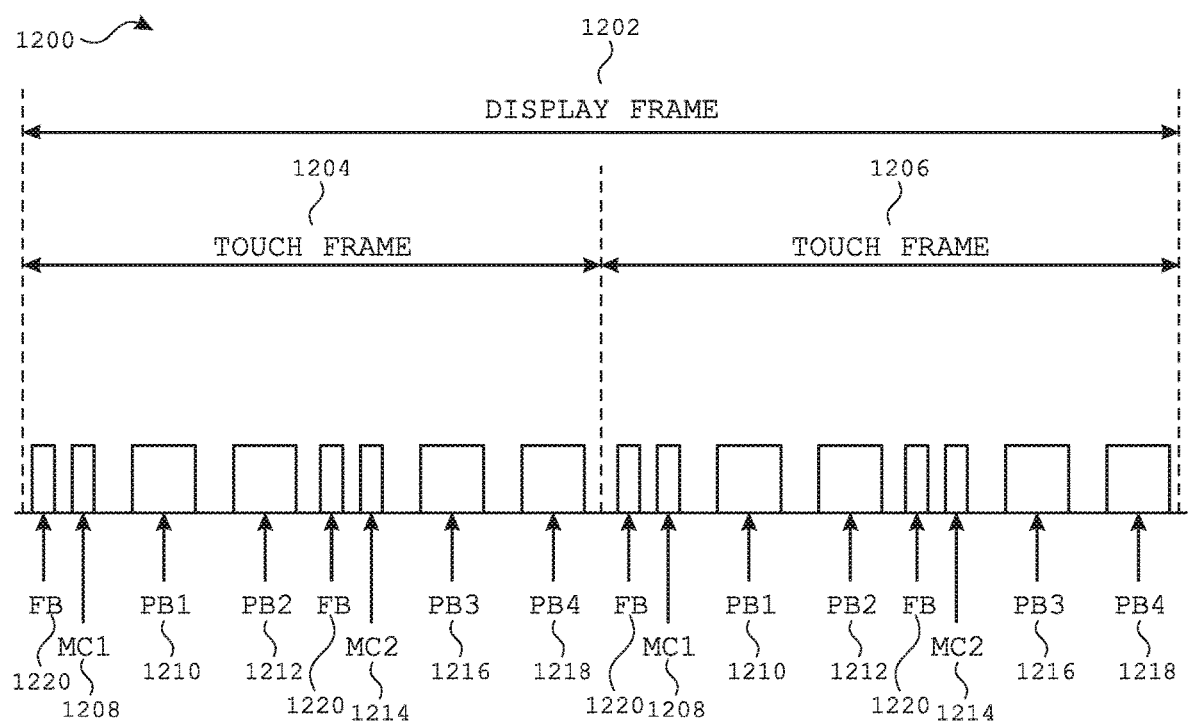
FIG. 12A illustrates an exemplary water detection and rejection display frame and touch frame configuration according to examples of the disclosure.

FIG. 12A illustrates an exemplary water detection and rejection display frame and touch frame configuration 1200 according to examples of the disclosure. Water detection and rejection display frame and touch frame configuration 1200 can contain the same scan steps in the same scan order as water detection and rejection display frame and touch frame configuration 1100 in FIG. 11A. For example, similar to FIG. 11A, FB 1220 can correspond to a fully bootstrapped scan step as illustrated in FIG. 8A, 8C, 9A or 9C. However, whereas in FIG. 11A, fully bootstrapped scans FB 1120 were utilized in combination with (e.g., compared with) partially bootstrapped scans PB1 1110, PB2 1112, PB3 1116 and PB4 1118 to perform water detection and rejection, in FIG. 12A, fully bootstrapped scans FB 1220 can be utilized in combination with (e.g., compared with) mutual capacitance scans MC1 1208 and MC2 1214 to perform water detection and rejection, as described in this disclosure.

One advantage to utilizing FB 1220 with adjacently-positioned MC1 1208 and/or MC2 1214 to perform water rejection can be that changes in touch images (e.g., due to a moving finger, or moving water) during water detection and rejection periods can be minimized—such changes in touch images can adversely affect proper water detection and rejection, as it can be more difficult to accurately align various types of touch images (e.g., fully bootstrapped touch images and mutual capacitance touch images, or fully bootstrapped touch images and partially bootstrapped touch images) when comparing the touch images. For example, FB 1220 can be utilized with adjacently-positioned MC1 1208 to perform water detection and rejection, and separately another FB 1220 can be utilized with adjacently-positioned MC2 1214 to perform further water detection and rejection. In some examples, MC1 1208 and MC2 1214 can both be performed before water detection and rejection is initiated for a touch frame.

In some examples, MC1 1208 and MC2 1214 may be utilized additionally or alternatively for purposes other than water detection and rejection; for example, in some examples, MC1 and MC2 may be utilized to correct for ungrounded user touch signal attenuation.

Figure 12B:
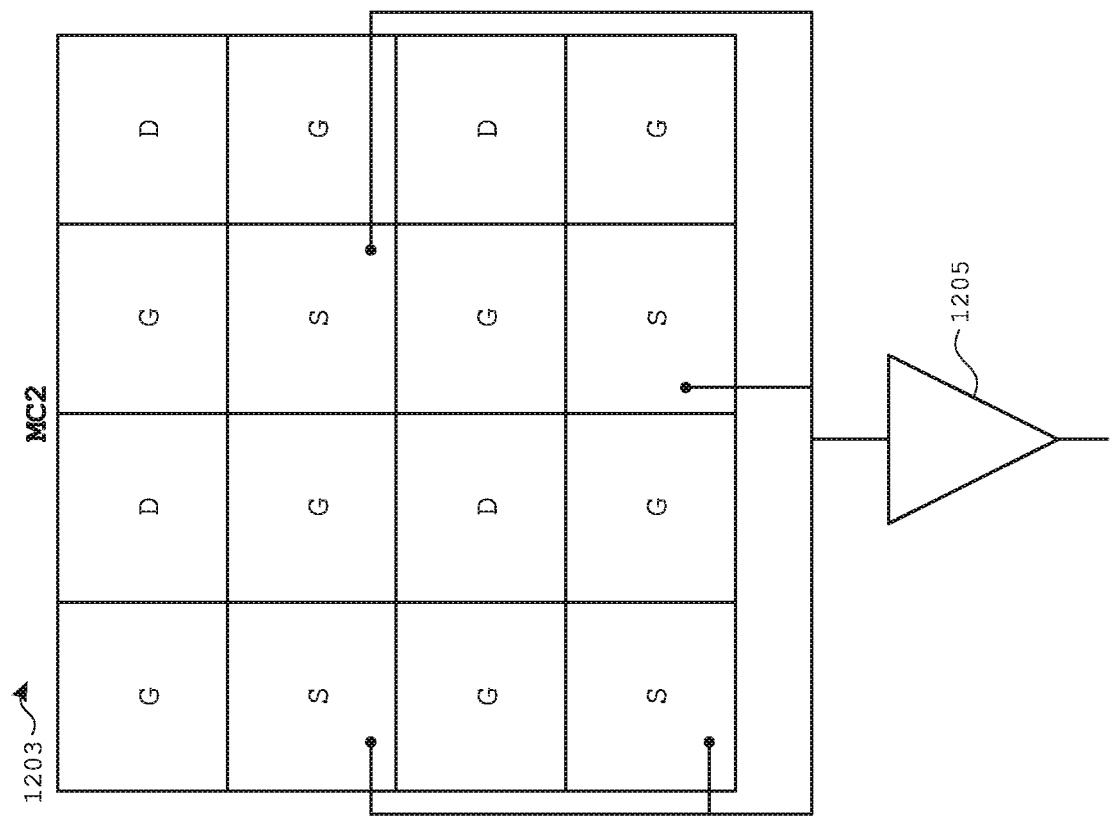
FIG. 12B illustrates exemplary details of the mutual capacitance scan steps in FIG. 12A according to examples of the disclosure.
Figure 12B:
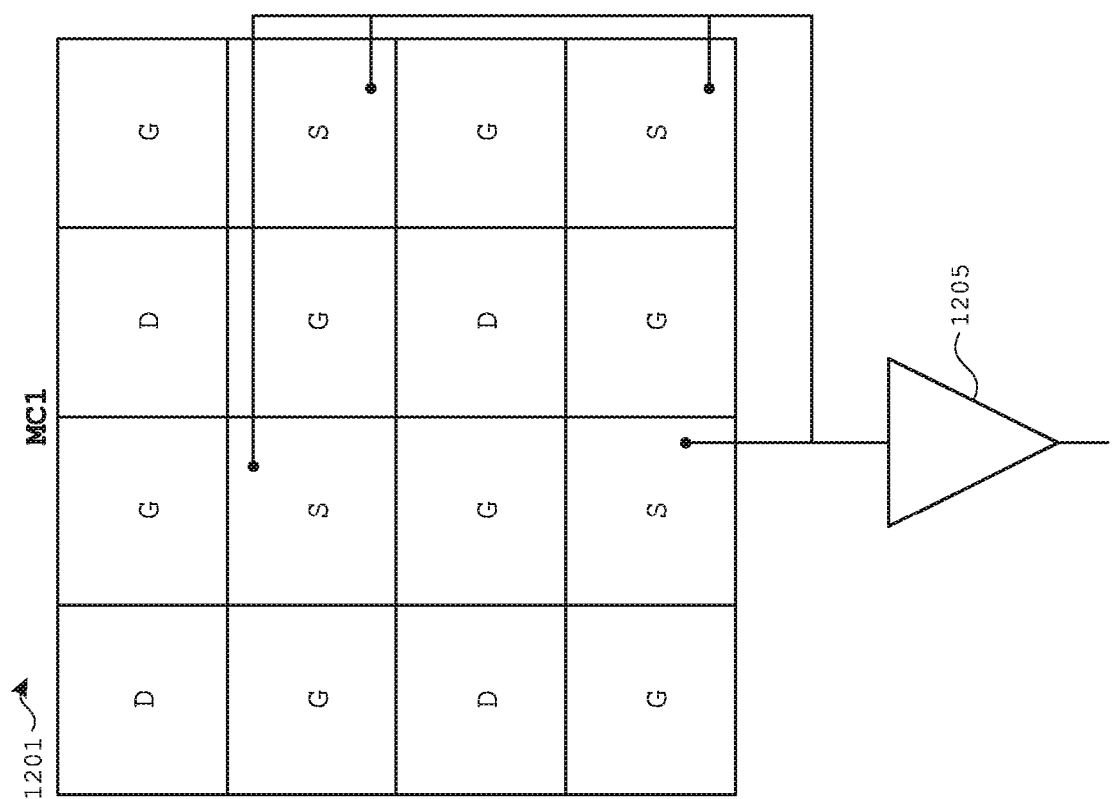

FIG. 12B illustrates exemplary details of the mutual capacitance scan steps in FIG. 12A. As discussed above, in some examples, the fully bootstrapped scan steps of the disclosure (e.g., FB 1220) can be full-resolution scans (e.g., as in FIG. 8A). However, in some examples, the fully bootstrapped scan steps of the disclosure (e.g., FB 1220) can be reduced-resolution scans in which multiple touch node electrodes are driven and sensed by the same sense circuitry (e.g., as in FIG. 8C). In some examples, a 4×4 group of touch node electrodes can be driven and sensed by the same circuitry during the fully-bootstrapped scan steps of the disclosure (e.g., FB 1220).

In such examples, the corresponding mutual capacitance scan steps (e.g., MC1 1208 and MC2 1214) can similarly be performed at a reduced-resolution so that the resolution of the fully bootstrapped touch images and the mutual capacitance touch images can substantially correspond when performing water detection and rejection (e.g., the reduced-resolution fully bootstrapped touch image can be a 2×2 touch node image, and the reduced-resolution mutual capacitance touch image can be a 2×2 touch node image with commonly-sensed touch values). Specifically, during MC1 1208, for example, multiple touch node electrodes in a 4×4 group of touch node electrodes can be sensed by the same sense amplifier 1205, as illustrated in configuration 1201. Similarly, during MC2 1214, multiple other touch node electrodes in the 4×4 group of touch node electrodes can be sensed by the same sense amplifier 1205, as illustrated in configuration 1203. In this way, reduced resolution mutual capacitance touch images can be captured on the touch screen that substantially correspond with the resolution of a reduced-resolution fully bootstrapped touch image that can be captured on the touch screen. It is understood that the above-discussed 4×4 groupings of touch node electrodes are exemplary only, and that other group arrangements and driving, sensing and grounding configurations can similarly be utilized to achieve analogous results.

Figure 12C:
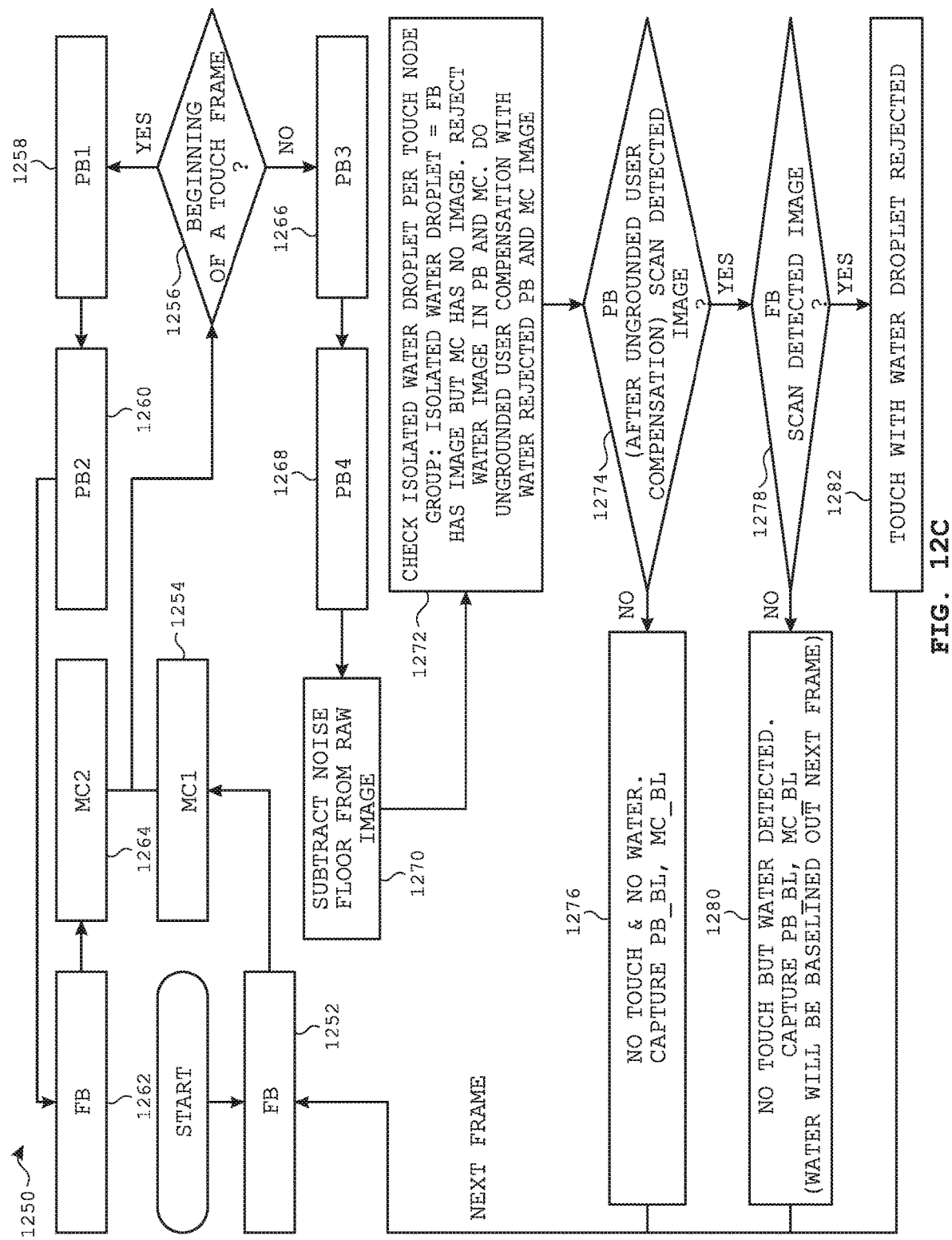
FIG. 12C illustrates an exemplary process corresponding to the water detection and rejection steps of FIG. 12A according to examples of the disclosure.

FIG. 12C illustrates an exemplary process 1250 corresponding to the water detection and rejection steps of FIG. 12A. At 1252, process 1250 can start with a fully bootstrapped scan of the touch screen (e.g., FB 1220). At 1254, a first mutual capacitance scan of the touch screen can be performed (e.g., MC1 1208). At 1256, whether process 1250 is at the beginning of a touch frame (e.g., touch frame 1204) can be determined. In some examples, this can be determined by checking whether one or two fully bootstrapped scans of the touch screen (e.g., FB 1220) have occurred—if one, then the answer to 1256 can be yes, if two, then the answer to 1256 can be no. If process 1250 is at the beginning of a touch frame, a first partially bootstrapped scan of the touch screen can be performed at 1258 (e.g., PB1 1210). At 1260, a second partially bootstrapped scan of the touch screen can be performed (e.g., PB2 1212). At 1262, a fully bootstrapped scan of the touch screen can be performed (e.g., FB 1220). At 1264, a second mutual capacitance scan of the touch screen can be performed (e.g., MC2 1214).

If process 1250 is not at the beginning of a touch frame at 1256, a third partially bootstrapped scan of the touch screen can be performed at 1266 (e.g., PB3 1216). At 1268, a fourth partially bootstrapped scan of the touch screen can be performed (e.g., PB4 1218).

At 1270, a noise floor can be subtracted from the total partially bootstrapped touch image obtained from the first, second, third and fourth partially bootstrapped scans of the touch screen. Step 1270 can include subtracting any baseline touch measurements that may be stored from previous scans (e.g., baseline partially bootstrapped touch images, baseline mutual capacitance touch images, etc.).

At 1272, the presence of water on the touch screen can be checked. Specifically, if the mutual capacitance scans of the touch screen contain portions of touch images that are not contained in the fully bootstrapped scans of the touch screen, then those portions of touch images can be attributed to water present on the touch screen. The portions of the mutual capacitance touch images attributed to water can be removed from the original partially bootstrapped touch images to give water-rejected partially bootstrapped touch images, and the portions of the mutual capacitance touch images attributed to the water can be removed from the original mutual capacitance touch images as well to give water-rejected mutual capacitance touch images. The water-rejected partially bootstrapped touch images and the water-rejected mutual capacitance touch images can be used to perform ungrounded user compensation on the original partially bootstrapped touch images to give compensated partially bootstrapped touch images.

At 1274, the compensated partially bootstrapped touch images can be analyzed to determine whether touch activity (whether due to water or actual touch) exists in the touch images. If no touch activity exists, then at 1276, it can be determined that there is no touch and no water on the touch screen, and the above-measured partially bootstrapped touch images and mutual capacitance touch images can be captured/stored to be used as baseline measurements in subsequent scans.

If touch activity exists in the compensated partially bootstrapped touch images at 1274, at 1278, it can be determined whether the fully bootstrapped touch images contain touch activity. If no touch activity exists, then at 1280, it can be determined that there is no actual touch on the touch screen, but there is water on the touch screen. The above-measured partially bootstrapped touch images and mutual capacitance touch images can be captured/stored to be used as baseline measurements that can be used to baseline out the effect of water in subsequent scans.

If touch activity exists in the fully bootstrapped touch images at 1278, at 1282, it can be determined that actual touch activity and water exist on the touch screen. The touch activity due to water can be rejected from the compensated partially bootstrapped touch images by comparing the mutual capacitance touch images and the fully bootstrapped touch images, as described in this disclosure, and water-rejected touch activity can result, which can be utilized by the system to perform touch-related functions.

Figure 13A:
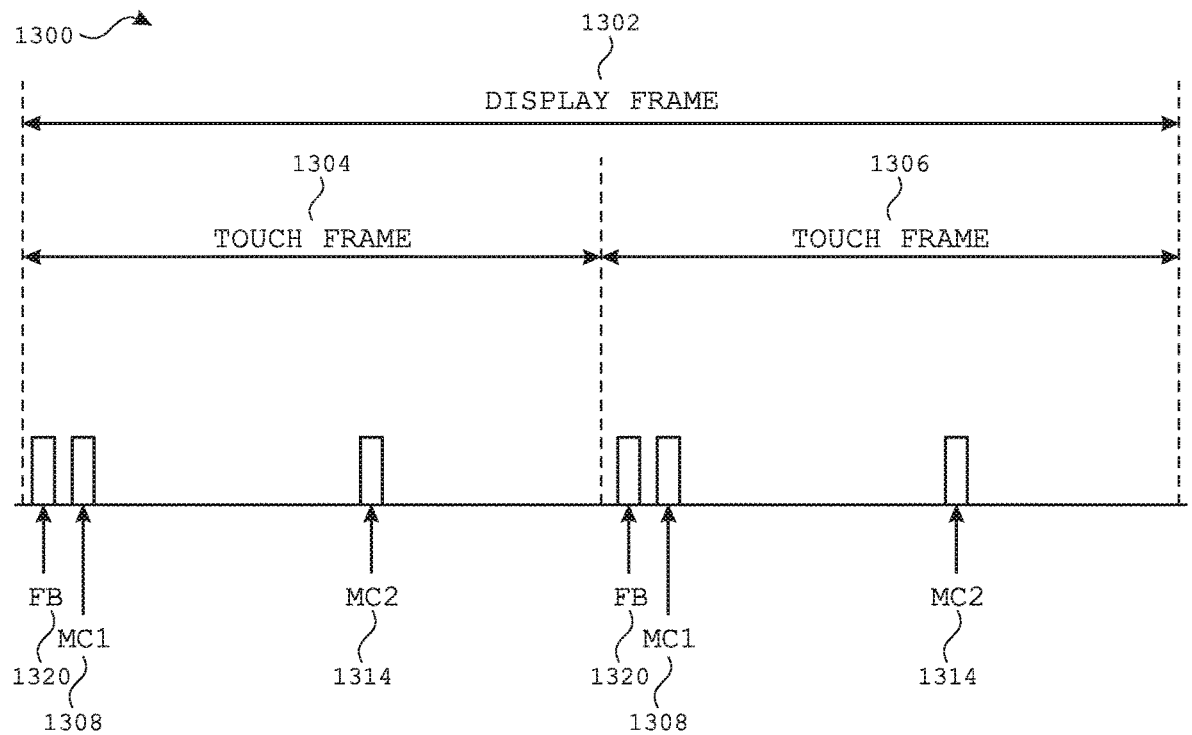
FIG. 13A illustrates an exemplary dynamic water detection and rejection display frame and touch frame configuration in ready mode according to examples of the disclosure.

In some examples, the scan steps in the touch and display frames of the touch screen can be dynamically determined in response to water or touch activity, for example. FIG. 13A illustrates an exemplary dynamic water detection and rejection display frame and touch frame configuration 1300 in ready mode according to examples of the disclosure. Configuration 1300 can correspond to a ready mode of the touch screen. During the ready mode, touch frames 1304 and 1306 can include fully bootstrapped scan step FB 1320, as well as first and second mutual capacitance scan steps MC1 1308 and MC2 1314.

The touch screen can remain in the ready mode until an actual touch is detected on the touch screen. As discussed previously, an actual touch on the touch screen can appear on the fully bootstrapped touch images (e.g., from FB 1320) and the mutual capacitance touch images (e.g., from MC1 1308 and MC2 1314), whereas water may only appear in the mutual capacitance touch images. Thus, in ready mode, the touch screen can differentiate between an actual touch and water, and can remain in ready mode until an actual touch is detected on the touch screen. In some examples, one of MC1 1308 and MC2 1314 may not be required and may be removed from touch frames 1304 and 1306, because only one of MC1 and MC2 may be needed to determine the presence of water on the touch screen—thus, power can be conserved by removing one of MC1 and MC2 from the touch frames. In some examples, both MC1 and MC2 may be removed from the touch frames, and the presence of actual touch on the touch screen can be determined based on FB alone (which can automatically reject water on the touch screen, as discussed above).

Figure 13B:
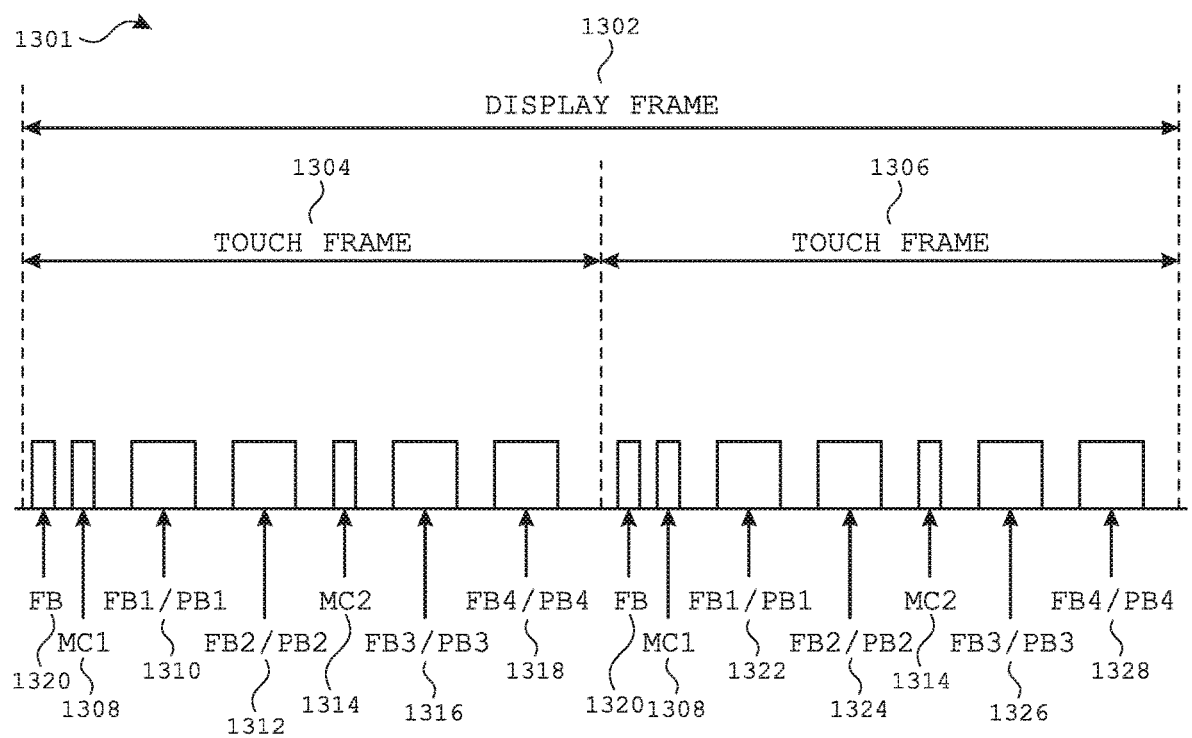
FIG. 13B illustrates an exemplary dynamic water detection and rejection display frame and touch frame configuration in active mode according to examples of the disclosure.

When an actual touch is detected on the touch screen, the touch screen can transition to active mode. FIG. 13B illustrates an exemplary dynamic water detection and rejection display frame and touch frame configuration 1301 in active mode, according to examples of the disclosure. In the active mode, scan steps 1310, 1312, 1316, 1318, 1322, 1324, 1326 and 1328 can be added to touch frames 1304 and 1306, as illustrated. Scan steps 1310, 1312, 1316, 1318, 1322, 1324, 1326 and 1328 can be partially bootstrapped scan steps or fully bootstrapped scan steps, depending on various criteria, as will be described in more detail below.

For example, if an actual touch is detected but no water is detected on the touch screen, then scan steps 1310, 1312, 1316, 1318, 1322, 1324, 1326 and 1328 in touch frames 1304 and 1306 can all be partially bootstrapped scan steps or fully bootstrapped scan steps. The partially bootstrapped scan steps can correspond to PB1, PB2, PB3 and PB4 discussed previously with respect to FIGS. 11A and 12A, for example. The fully bootstrapped can steps can correspond to FB1, FB2, FB3 and FB4 discussed previously with respect to FIG. 11B, for example.

If an actual touch is detected on the touch screen and water is detected on the touch screen, then scan steps 1310, 1312, 1316 and 1318 in touch frame 1304 can differ from scan steps 1322, 1324, 1326 and 1328 in touch frame 1306—specifically, the scan steps in one touch frame can be partially bootstrapped scan steps, while the scan steps in the other touch frame can be fully bootstrapped scan steps. As above, the partially bootstrapped scan steps can correspond to PB1, PB2, PB3 and PB4 discussed previously with respect to FIGS. 11A and 12A, and the fully bootstrapped can steps can correspond to FB1, FB2, FB3 and FB4 discussed previously with respect to FIG. 11B, for example.

In some examples, in active mode, water detection and rejection can be performed by comparing fully bootstrapped touch images with partially bootstrapped touch images, or by comparing fully bootstrapped touch images with mutual capacitance touch images, as described in this disclosure. Thus, FIGS. 13A and 13B illustrate exemplary dynamic water detection and rejection display frame and touch frame configurations.

Figure 13C:
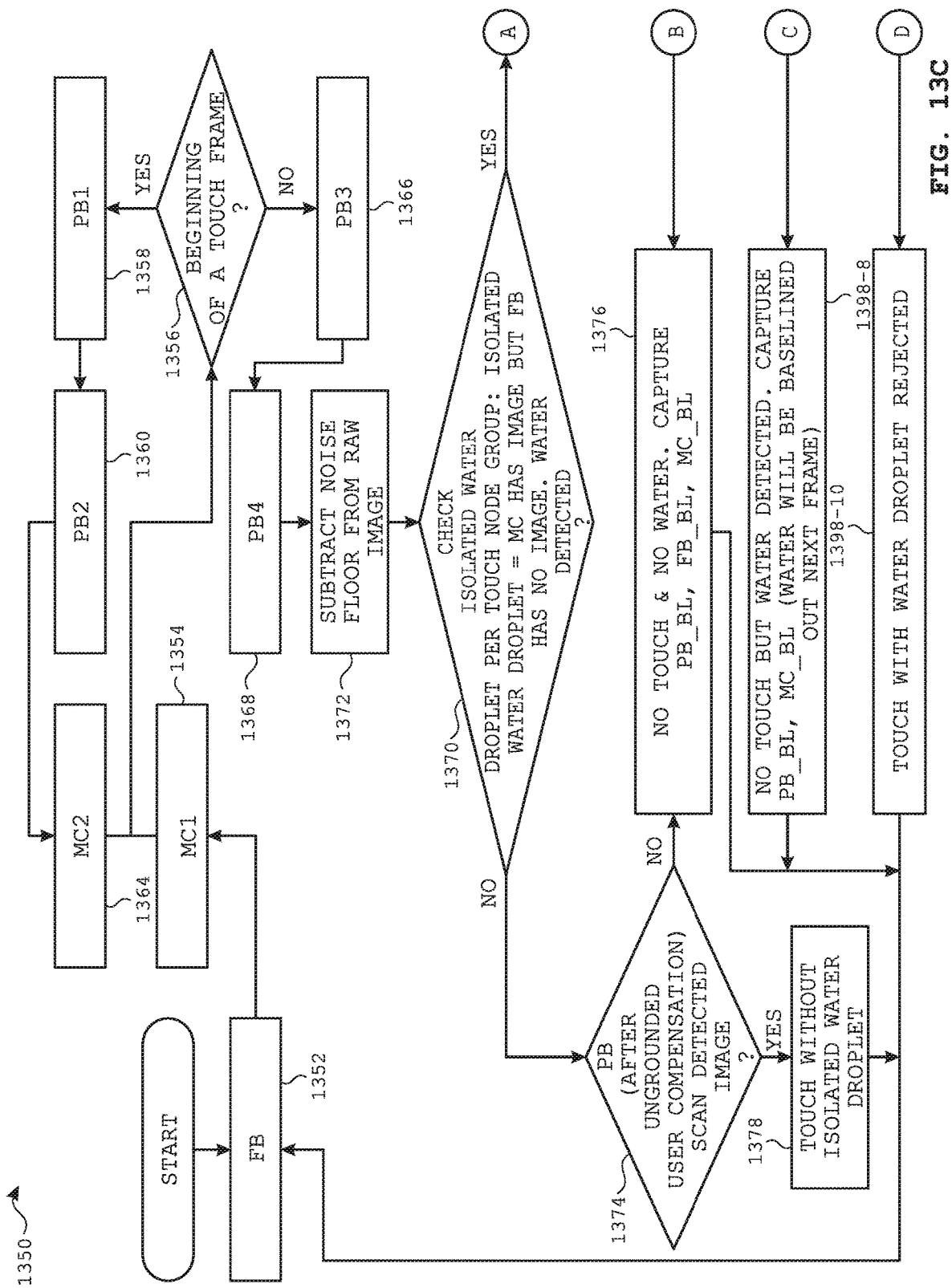
FIG. 13C illustrates an exemplary process corresponding to the water detection and rejection steps of FIG. 13B according to examples of the disclosure.
Figure 13C:
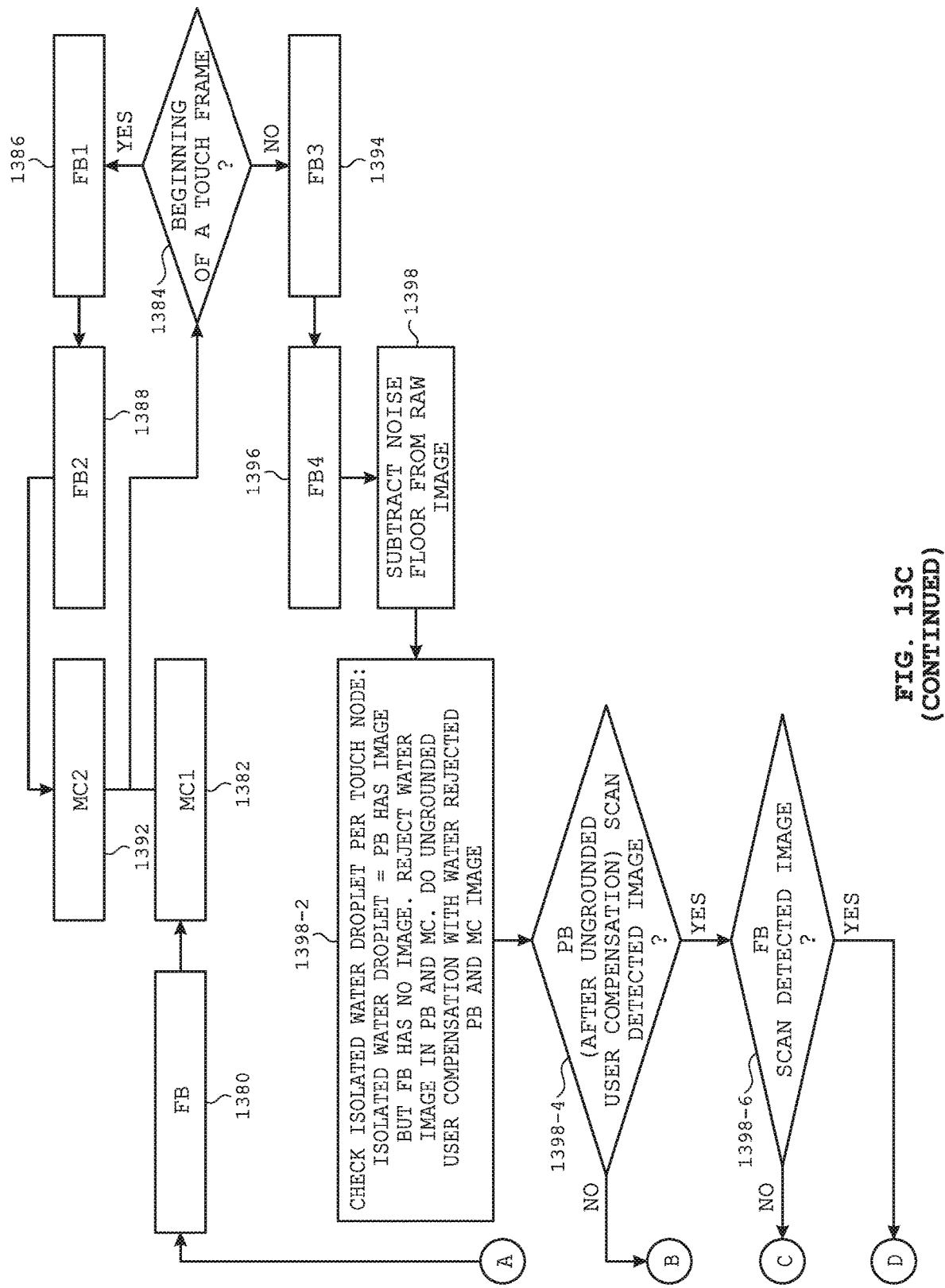

FIG. 13C illustrates an exemplary process 1350 corresponding to the water detection and rejection steps of FIG. 13B. At 1352, process 1350 can start with a fully bootstrapped scan of the touch screen (e.g., FB 1320). At 1354, a first mutual capacitance scan of the touch screen can be performed (e.g., MC1 1308). In some examples, if no touch is detected as a result of the FB and/or MC1 scans, process 1350 can return back to the beginning (step 1352) and can skip subsequent scans that will be described below to save power—this skipping of subsequent scan steps to save power when no touch is detected on the touch screen at the beginning of a touch frame can similarly apply to all of the other scan plans described in other figures (e.g., FIGS. 11A-14E). In some examples, however, even if no touch is detected as a result of the FB and/or MC1 scans, process 1350 can continue as illustrated in FIG. 13C because the touch screen may require capture of a new baseline for use in future scan steps. A new baseline may be required based on a number of factors, such as touch screen temperature, time, etc. This baseline capture algorithm can similarly apply to all of the other scan plans described in other figures (e.g., FIGS. 11A-14E). If process continues after 1354 for any reason, at 1356, whether process 1350 is at the beginning of a touch frame (e.g., touch frame 1304) can be determined. In some examples, this can be determined by checking whether one or two mutual capacitance scans of the touch screen (e.g., MC1 1308, MC2 1314) have occurred—if one, then the answer to 1356 can be yes, if two, then the answer to 1356 can be no. If process 1350 is at the beginning of a touch frame, a first partially bootstrapped scan of the touch screen can be performed at 1358 (e.g., at scan step 1310). At 1360, a second partially bootstrapped scan of the touch screen can be performed (e.g., at scan step 1312). At 1364, a second mutual capacitance scan of the touch screen can be performed (e.g., MC2 1314).

If process 1350 is not at the beginning of a touch frame at 1356, a third partially bootstrapped scan of the touch screen can be performed at 1366 (e.g., at scan step 1316). At 1368, a fourth partially bootstrapped scan of the touch screen can be performed (e.g., at scan step 1318).

A noise floor can be subtracted from the total partially bootstrapped touch images obtained from the first, second, third and fourth partially bootstrapped scans of the touch screen at 1372. Step 1372 can include subtracting any baseline touch measurements that may be stored from previous scans (e.g., baseline partially bootstrapped touch images, baseline mutual capacitance touch images, baseline fully bootstrapped touch images, etc.).

At 1370, the presence of water on the touch screen can be checked. Specifically, if the mutual capacitance scans of the touch screen contain portions of touch images that are not contained in the fully bootstrapped scans of the touch screen, then those portions of touch images can be attributed to water present on the touch screen. The portions of the mutual capacitance touch images attributed to water can be removed from the original partially bootstrapped touch images to give water-rejected partially bootstrapped touch images, and the portions of the mutual capacitance touch images attributed to the water can be removed from the original mutual capacitance touch images as well to give water-rejected mutual capacitance touch images. The water-rejected partially bootstrapped touch images and the water-rejected mutual capacitance touch images can be used to perform ungrounded user compensation on the original partially bootstrapped touch images to give compensated partially bootstrapped touch images.

If no water is detected on the touch screen at 1370, at 1374, the compensated partially bootstrapped touch images can be analyzed to determine whether touch activity (whether due to water or actual touch) exists in the touch images. If no touch activity exists, then at 1376, it can be determined that there is no touch and no water on the touch screen, and the above-measured partially bootstrapped touch images, mutual capacitance touch images and fully bootstrapped touch images can be captured/stored to be used as baseline measurements in subsequent scans.

If touch activity exists in the compensated partially bootstrapped touch images at 1374, at 1378, it can be determined that actual touch activity, but no water, exists on the touch screen. The touch activity can be utilized by the system to perform touch-related functions.

Referring back to step 1370, if water is detected on the touch screen, then the touch screen can switch between performing partially bootstrapped touch scans during one touch frame (e.g., touch frame 1304) and performing fully bootstrapped touch scans during a next touch frame (e.g., touch frame 1306). Specifically, at 1380, process 1350 can continue with a fully bootstrapped scan of the touch screen (e.g., FB 1320). At 1382, a first mutual capacitance scan of the touch screen can be performed (e.g., MC1 1308). At 1384, whether process 1350 is at the beginning of a touch frame (e.g., touch frame 1306) can be determined. In some examples, this can be determined by checking whether one or two mutual capacitance scans of the touch screen (e.g., MC1 1308, MC2 1314) have occurred—if one, then the answer to 1384 can be yes, if two, then the answer to 1384 can be no. If process 1350 is at the beginning of a touch frame, a first fully bootstrapped scan of the touch screen can be performed at 1386 (e.g., at scan step 1322). At 1388, a second fully bootstrapped scan of the touch screen can be performed (e.g., at scan step 1324). At 1392, a second mutual capacitance scan of the touch screen can be performed (e.g., MC2 1314).

If process 1350 is not at the beginning of a touch frame at 1384, a third fully bootstrapped scan of the touch screen can be performed at 1394 (e.g., at scan step 1326). At 1396, a fourth fully bootstrapped scan of the touch screen can be performed (e.g., at scan step 1328).

At 1398, a noise floor can be subtracted from the total fully bootstrapped touch images obtained from the first, second, third and fourth fully bootstrapped scans of the touch screen. Step 1398 can include subtracting any baseline touch measurements that may be stored from previous scans (e.g., baseline partially bootstrapped touch images, baseline mutual capacitance touch images, baseline fully bootstrapped touch images, etc.).

At 1398-2, the presence of water on the touch screen can be checked. Specifically, if the partially bootstrapped scans of the touch screen contain portions of touch images that are not contained in the fully bootstrapped scans of the touch screen, then those portions of touch images can be attributed to water present on the touch screen. The portions of the partially bootstrapped touch images attributed to water can be removed from the original partially bootstrapped touch images to give water-rejected partially bootstrapped touch images, and the portions of the partially bootstrapped touch images attributed to the water can be removed from the original mutual capacitance touch images as well to give water-rejected mutual capacitance touch images. The water-rejected partially bootstrapped touch images and the water-rejected mutual capacitance touch images can be used to perform ungrounded user compensation on the original partially bootstrapped touch images to give compensated partially bootstrapped touch images.

At 1398-4, the compensated partially bootstrapped touch images can be analyzed to determine whether touch activity (whether due to water or actual touch) exists in the touch images. If no touch activity exists, then at 1376, it can be determined that there is no touch and no water on the touch screen, and the above-measured partially bootstrapped touch images, mutual capacitance touch images and fully bootstrapped touch images can be captured/stored to be used as baseline measurements in subsequent scans.

If touch activity exists in the compensated partially bootstrapped touch images at 1398-4, at 1398-6, it can be determined whether the fully bootstrapped touch images contain touch activity. If no touch activity exists, then at 1398-8, it can be determined that there is no actual touch on the touch screen, but there is water on the touch screen. The above-measured partially bootstrapped touch images and mutual capacitance touch images can be captured/stored to be used as baseline measurements that can be used to baseline out the effect of the water in subsequent scans.

If touch activity exists in the compensated fully bootstrapped touch images at 1398-6, at 1398-10, it can be determined that actual touch activity and water exist on the touch screen. The touch activity due to water can be rejected from the compensated partially bootstrapped touch images by comparing the partially bootstrapped touch images and the fully bootstrapped touch images, as described in this disclosure, and water-rejected touch activity can result, which can be utilized by the system to perform touch-related functions.

Figure 13D:
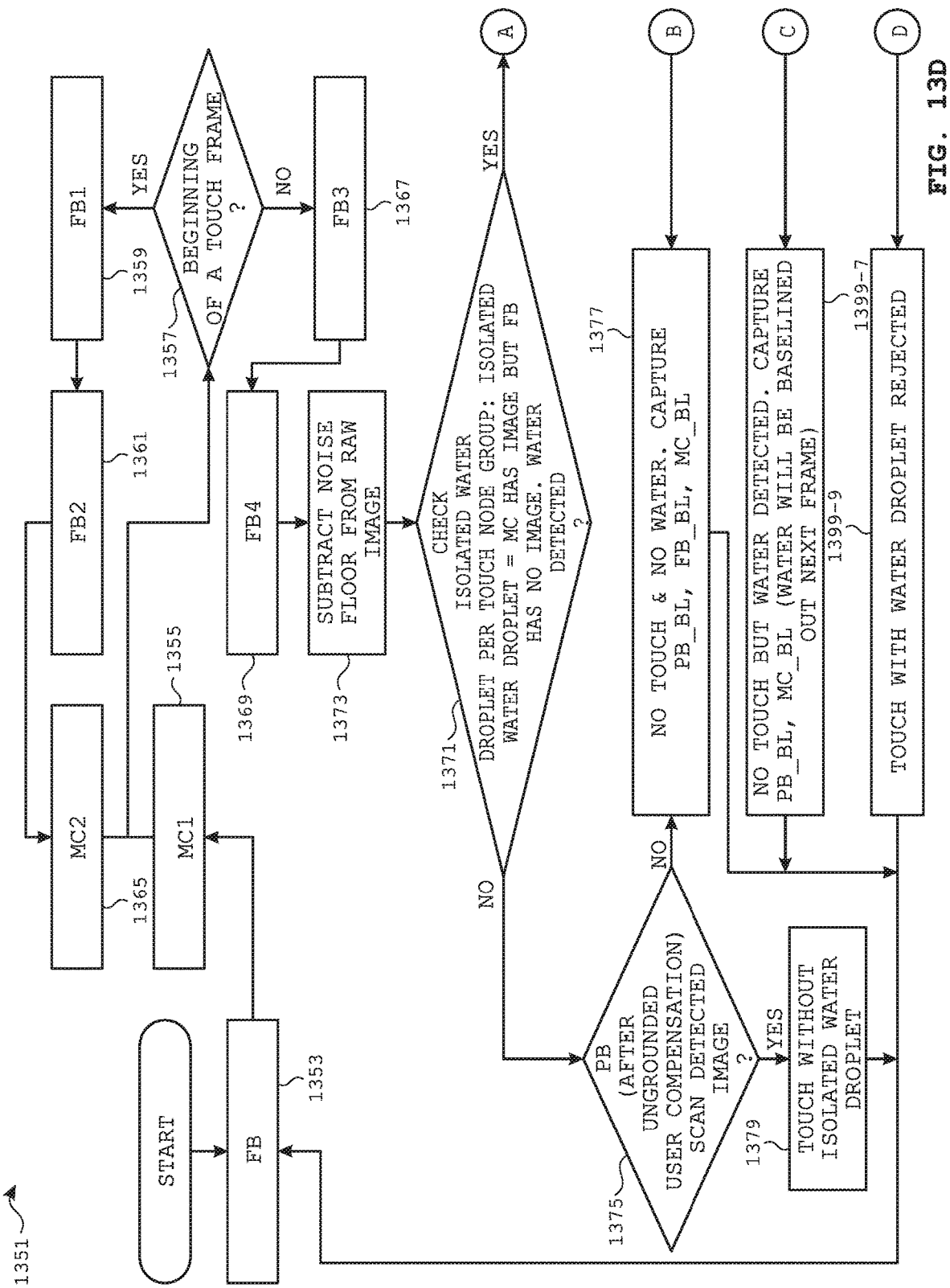
FIG. 13D another exemplary process corresponding to the water detection and rejection steps of FIG. 13B according to examples of the disclosure.
Figure 13D:
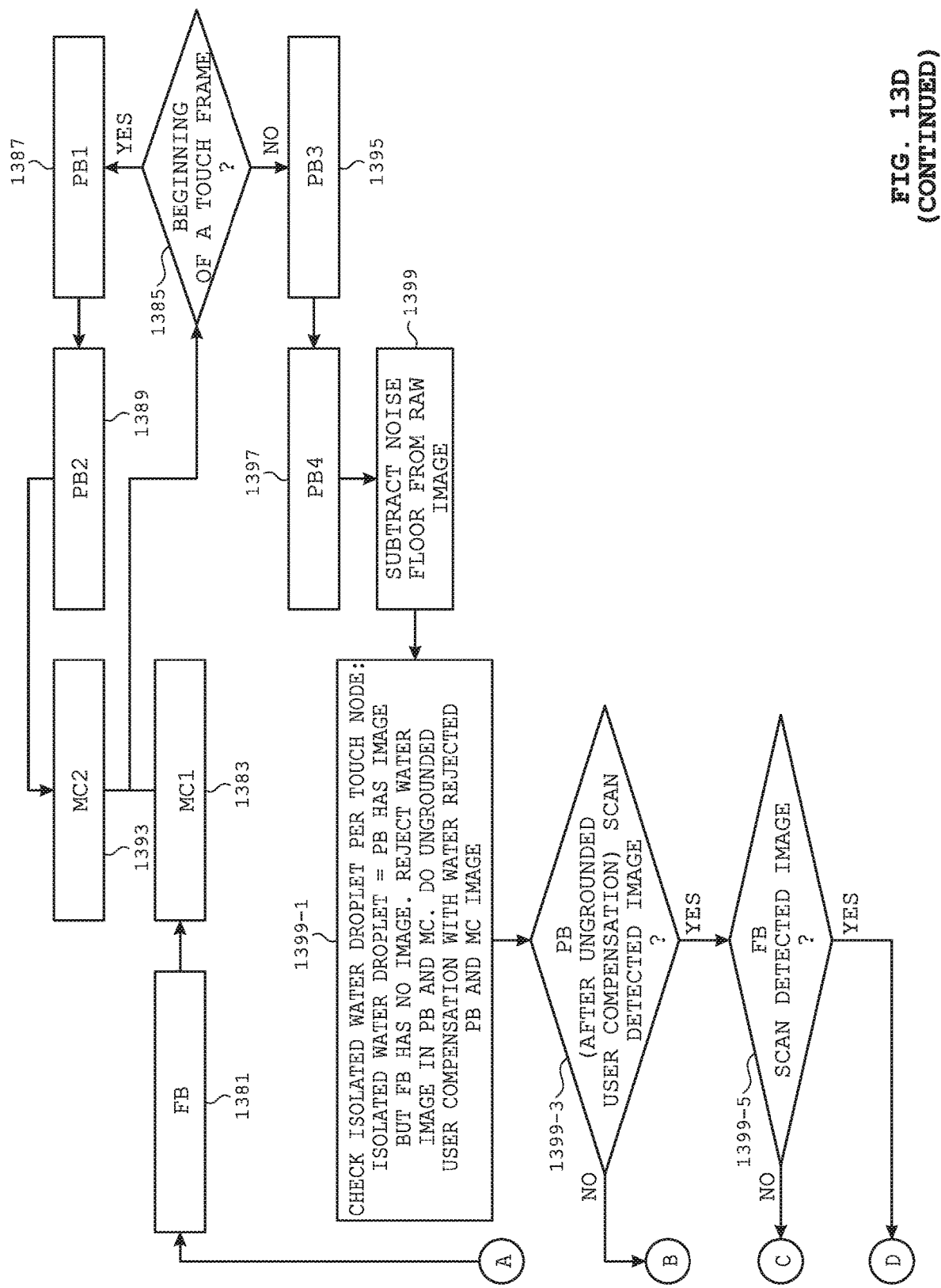

FIG. 13D another exemplary process 1351 corresponding to the water detection and rejection steps of FIG. 13B. Process 1351 can be substantially the same as process 1350 in FIG. 13C, except that partially bootstrapped scans performed at 1358, 1360, 1366 and 1368 in process 1350 can be replaced by fully bootstrapped scans performed at 1359, 1361, 1367 and 1369, respectively, in process 1351. Further, fully bootstrapped scans performed at 1386, 1388, 1394 and 1396 in process 1350 can be replaced by partially bootstrapped scans performed at 1387, 1389, 1395 and 1397, respectively, in process 1351. The remaining details of process 1351, which are substantially the same as in process 1350, will not be repeated here for brevity.

In some examples, the touch screen of the disclosure can switch between fully bootstrapped touch scans and partially bootstrapped touch scans depending on whether a user interacting with the touch screen is well- or poorly-grounded. Specifically, the touch screen can perform fully bootstrapped touch scans by default, because fully bootstrapped touch scans can automatically reject water (i.e., water may not appear on fully bootstrapped touch scans). However, if touch signal attenuation becomes too great due to poorly-grounded user interaction (e.g., if an appropriate figure of merit is exceeded or fallen short of), the touch screen can transition to performing partially bootstrapped touch scans to counteract the poorly-grounded touch signal attenuation. Additionally, the touch screen can utilize the water detection and rejection schemes discussed in this disclosure (e.g., fully bootstrapped and partially bootstrapped touch image comparison, and/or fully bootstrapped and mutual capacitance touch image comparison) to detect and reject water that may appear in the partially bootstrapped touch scans.

Figure 14A:
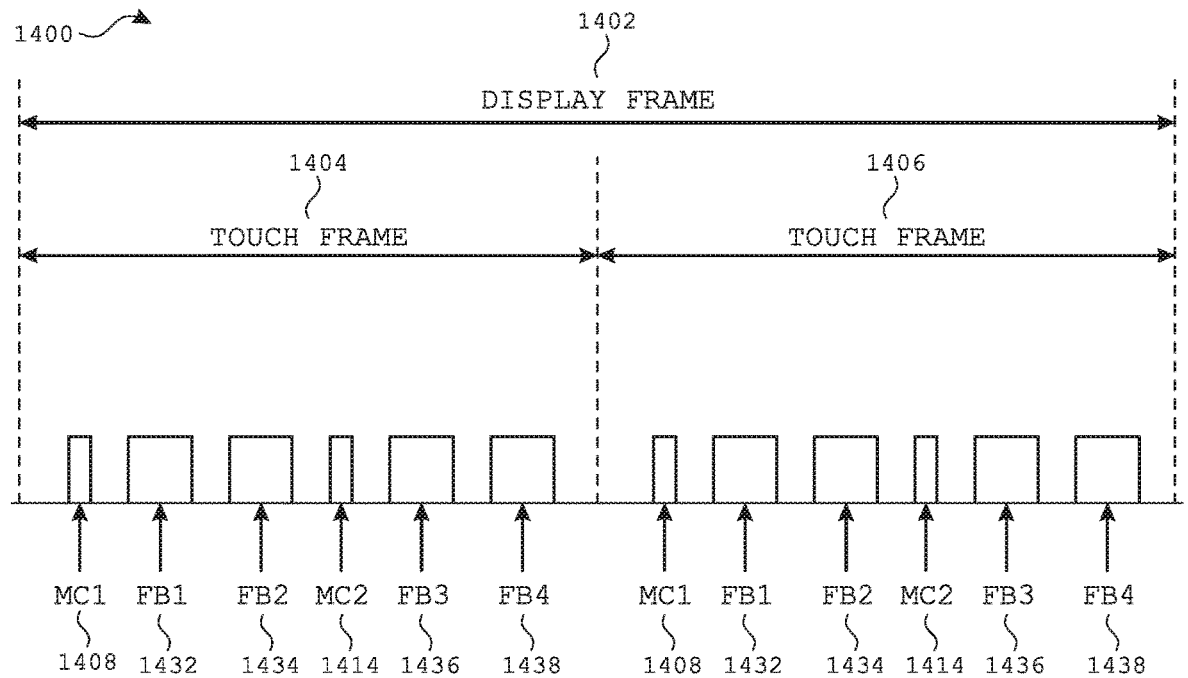
FIG. 14A illustrates an exemplary default display frame and touch frame configuration according to examples of the disclosure.

FIG. 14A illustrates an exemplary default display frame and touch frame configuration 1400, according to examples of the disclosure. As before, display frame 1402 can include touch frames 1404 and 1406. As mentioned above, configuration 1400 can be based primarily on fully bootstrapped scans of the touch screen, as such scans can automatically reject water that may be present on the touch screen. Thus, touch frame 1404 can include fully bootstrapped scan steps FB1 1432, FB2 1434, FB3 1436 and FB4 1438. FB1 1432, FB2 1434, FB3 1436 and FB4 1438 can correspond to FB1 1132, FB2 1134, FB3 1136 and FB4 1138 described in FIG. 11B, for example. Touch frame 1406 can similarly include fully bootstrapped scan steps FB1 1432, FB2 1434, FB3 1436 and FB4 1438. Touch frames 1404 and 1406 can also include mutual capacitance scan steps MC1 1408 and MC2 1414, which can be utilized to perform ungrounded user compensation, as appropriate. Touch activity can be determined from FB1 1432, FB2 1434, FB3 1436 and FB4 1438, and can be utilized by the system to perform touch-related functions.

If ungrounded user touch signal attenuation becomes too great, then the touch screen can transition to a partially bootstrapped operation mode. This attenuation can be determined using any appropriate metric that can reflect how well-grounded the user is. In some examples, an appropriate metric can be a Zdensity metric, which can be expressed for a given touch as:

$$\text{Zdensity} = (\text{amount of touch})/(\text{radius of touch}) \tag{11}$$

A high Zdensity can reflect a well-grounded user, while a low Zdensity can reflect a poorly-grounded user. Various Zdensity thresholds can be used to control whether the touch screen can operate in a fully bootstrapped operation mode or a partially bootstrapped operation mode, as will be described in more detail below.

Figure 14B:
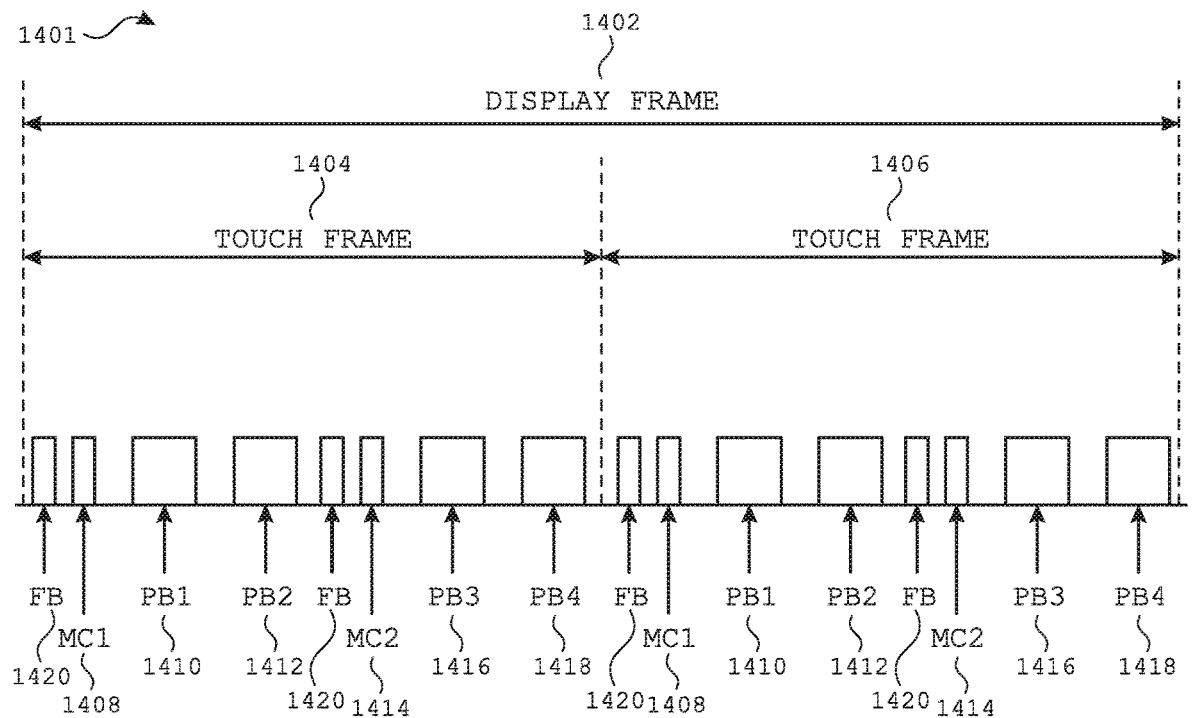
FIG. 14B illustrates an exemplary display frame and touch frame configuration for a touch screen operating in a partially bootstrapped operation mode according to examples of the disclosure.

FIG. 14B illustrates an exemplary display frame and touch frame configuration 1401 for a touch screen operating in a partially bootstrapped operation mode, according to examples of the disclosure. As before, display frame 1402 can include touch frames 1404 and 1406. In response to detecting a poorly-grounded user in FIG. 14A, the fully bootstrapped scan steps FB1 1432, FB2 1434, FB3 1436 and FB4 1438 in configuration 1400 can become partially bootstrapped scan steps PB1 1410, PB2 1412, PB3 1416 and PB4 1418 in configuration 1401. Further, separate fully bootstrapped scan steps 1420 can be added to touch frame 1404. Touch frame 1406 can be substantially the same as touch frame 1404.

Thus, the touch screen can utilize partially bootstrapped scan steps PB1 1410, PB2 1412, PB3 1416 and PB4 1418 and mutual capacitance scan steps MC1 1408 and MC2 1414 to perform touch detection, ungrounded user compensation, or both. The touch screen can additionally or alternatively utilize partially bootstrapped scan steps PB1 1410, PB2 1412, PB3 1416 and PB4 1418, mutual capacitance scan steps MC1 1408 and MC2 1414, and/or fully bootstrapped scan steps 1420 to perform water detection and rejection, as discussed in this disclosure. Specifically, the touch screen can utilize fully bootstrapped and partially bootstrapped touch image comparison, and/or fully bootstrapped and mutual capacitance touch image comparison, to detect and reject water that may appear in the partially bootstrapped touch scans of the touch screen.

Figure 14C:
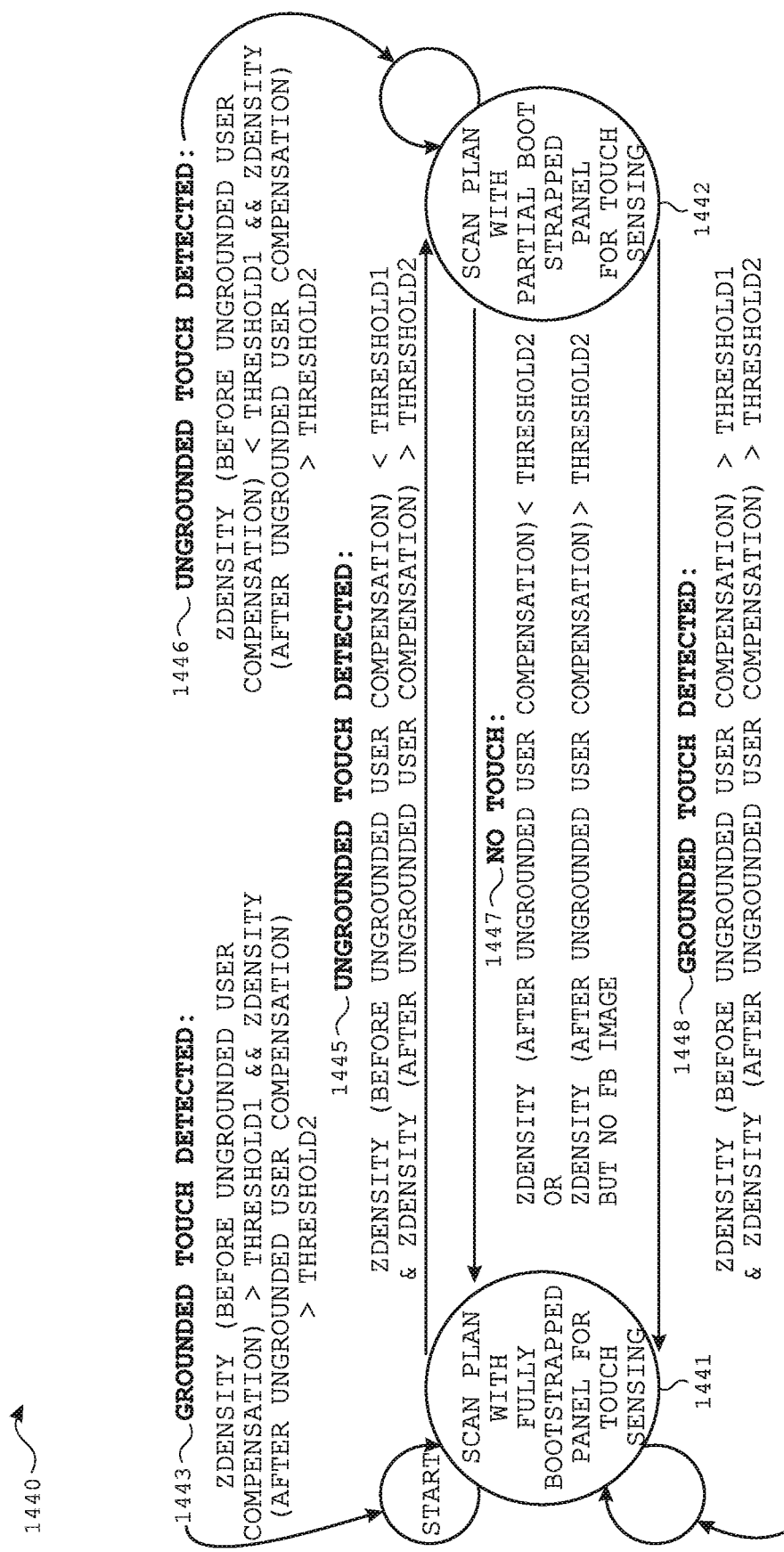
FIG. 14C illustrates exemplary conditions under which the touch screen of the disclosure can transition between fully bootstrapped operation and partially bootstrapped operation according to examples of the disclosure.

FIG. 14C illustrates exemplary conditions 1440 under which the touch screen of the disclosure can transition between fully bootstrapped operation and partially bootstrapped operation, according to examples of the disclosure. As stated previously, the touch screen can start in fully bootstrapped operation mode 1441. Fully bootstrapped operation mode can correspond to the scan steps in configuration 1400 in FIG. 14A.

While no touch is detected on the touch screen, the touch screen can remain in fully bootstrapped operation mode 1441 via 1444. In some examples, no touch on the touch screen can be signified by a Zdensity for a detected touch image (after the touch image is compensated for ungrounded user touch signal attenuation) that is less than a second threshold.

Additionally, the touch screen can remain in fully bootstrapped operation mode 1441 via 1443 while a grounded user (grounded touch) is detected on the touch screen. In some examples, a grounded user can be signified by a Zdensity for a detected touch image before ungrounded user compensation that is greater than a first threshold, and a Zdensity for the detected touch image after ungrounded user compensation that is greater than the second threshold. In the discussion above and below, the first threshold can correspond to a touch that, even before being compensated for ungrounded user effects, would qualify as a touch (e.g., a strong touch signal). The second threshold can correspond to a touch that, after being compensated for ungrounded user effects, would qualify as a touch (e.g., a moderate touch signal). As previously stated, Zdensity and its associated thresholds are provided by way of example only, and it is understood that other figures of merit can similarly be used that can reflect how well- or poorly grounded a user is when interacting with the touch screen.

The touch screen can transition from fully bootstrapped operation mode 1441 to partially bootstrapped operation mode 1442 via 1445 when an ungrounded user (ungrounded touch) is detected on the touch screen. In some examples, an ungrounded user can be signified by a Zdensity for a detected touch image before ungrounded user compensation that is less than the first threshold, and a Zdensity for the detected touch image after ungrounded user compensation that is greater than the second threshold. The touch screen can remain in partially bootstrapped operation mode 1442, via 1446, while ungrounded touch is detected on the touch screen.

The touch screen can transition back to fully bootstrapped operation mode 1441 from partially bootstrapped operation mode 1442 in response to two conditions: either no touch is detected on the touch screen for some threshold amount or time, or well-grounded user interaction is detected on the touch screen. In some examples, a no touch condition can be signified by a Zdensity for a detected touch image (if any) after ungrounded user compensation that is less than the second threshold, or a Zdensity for the detected touch image after ungrounded user compensation that is greater than the second threshold but the fully bootstrapped scan steps in the partially bootstrapped operation mode (e.g., scan steps 1420 in FIG. 14B) exhibiting no touch image. In some examples, well-grounded user interaction can be signified by a Zdensity for a detected touch image before ungrounded user compensation that is greater than the first threshold, and a Zdensity for the detected touch image after ungrounded user compensation that is greater than the second threshold.

Figure 14D:
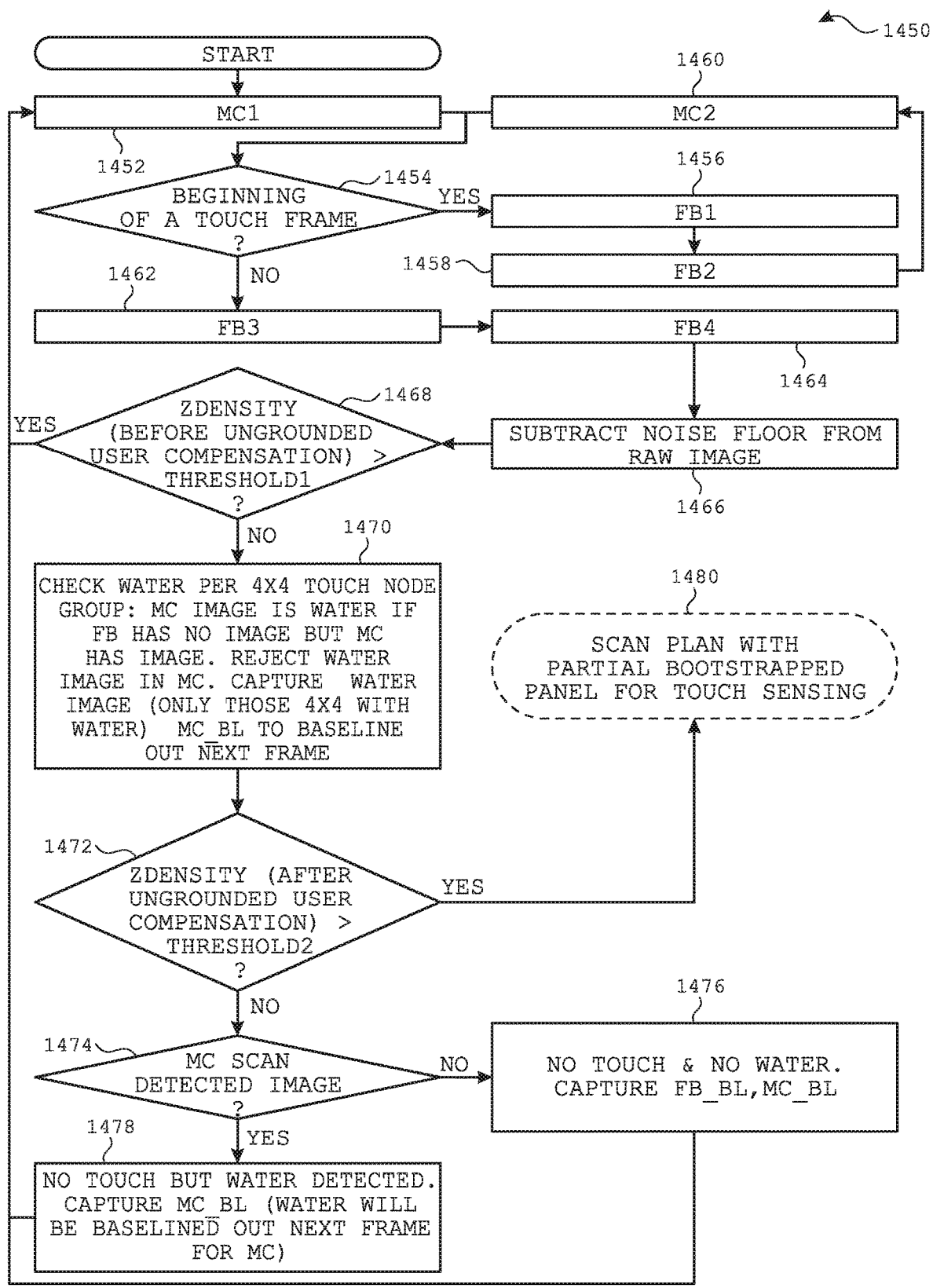
FIG. 14D illustrates an exemplary process corresponding to the water detection and rejection steps of FIG. 14A according to examples of the disclosure.

FIG. 14D illustrates an exemplary process 1450 corresponding to the water detection and rejection steps of FIG. 14A. At 1452, a first mutual capacitance scan of the touch screen can be performed (e.g., MC1 1408). At 1454, whether process 1450 is at the beginning of a touch frame (e.g., touch frame 1404) can be determined. In some examples, this can be determined by checking whether one or two mutual capacitance scans of the touch screen (e.g., MC1 1408, MC2 1414) have occurred—if one, then the answer to 1454 can be yes, if two, then the answer to 1454 can be no. If process 1450 is at the beginning of a touch frame, a first fully bootstrapped scan of the touch screen can be performed at 1456 (e.g., FB1 1432). At 1458, a second fully bootstrapped scan of the touch screen can be performed (e.g., FB2 1434). At 1460, a second mutual capacitance scan of the touch screen can be performed (e.g., MC2 1414).

If process 1450 is not at the beginning of a touch frame at 1454, a third fully bootstrapped scan of the touch screen can be performed at 1462 (e.g., FB3 1436). At 1464, a fourth fully bootstrapped scan of the touch screen can be performed (e.g., FB4 1438).

At 1466, a noise floor can be subtracted from the total fully bootstrapped touch images obtained from the first, second, third and fourth fully bootstrapped scans of the touch screen. Step 1466 can include subtracting any baseline touch measurements that may be stored from previous scans (e.g., baseline partially bootstrapped touch images, baseline mutual capacitance touch images, baseline fully bootstrapped touch images, etc.).

At 1468, the Zdensity for any touch that may have been detected in the fully bootstrapped touch images can be determined. If the Zdensity of the touch before ungrounded user compensation is greater than a first threshold, then it can be determined that the user interacting with the touch screen is well-grounded. The detected touch activity can be utilized by the system to perform touch-related functions.

If the Zdensity of the touch before ungrounded user compensation is not greater than the first threshold at 1468, then the presence of water on the touch screen can be checked at 1470. Specifically, if the mutual capacitance scans of the touch screen contain portions of touch images that are not contained in the fully bootstrapped scans of the touch screen, then those portions of touch images can be attributed to water present on the touch screen. The portions of the mutual capacitance touch images attributed to water can be removed from the original mutual capacitance touch images to give water-rejected mutual capacitance touch images. The water-rejected mutual capacitance touch images can be used to perform ungrounded user compensation on the original fully bootstrapped touch images to give compensated fully bootstrapped touch images.

At 1472, it can be determined whether the Zdensity of the touch after ungrounded user compensation is greater than a second threshold. If it is, then it can be determined that the user interacting with the touch screen is poorly-grounded, and the touch screen can transition to a partially bootstrapped operation mode in the next touch frame via 1480 (explained in more detail in FIG. 14E).

If the Zdensity of the touch after ungrounded user compensation is not greater than the second threshold, then at 1474, it can be determined whether the mutual capacitance touch images contain any touch images. If they do not, it can be determined that there is no touch and no water on the touch screen, and the above-measured mutual capacitance touch images and fully bootstrapped touch images can be captured/stored to be used as baseline measurements in subsequent scans at 1476.

If the mutual capacitance touch images do contain touch images, then, at 1478, it can be determined that there is no actual touch on the touch screen, but there is water on the touch screen. The above-measured mutual capacitance touch images can be captured/stored to be used as baseline measurements that can be used to baseline out the effect of the water in subsequent scans.

Figure 14E:
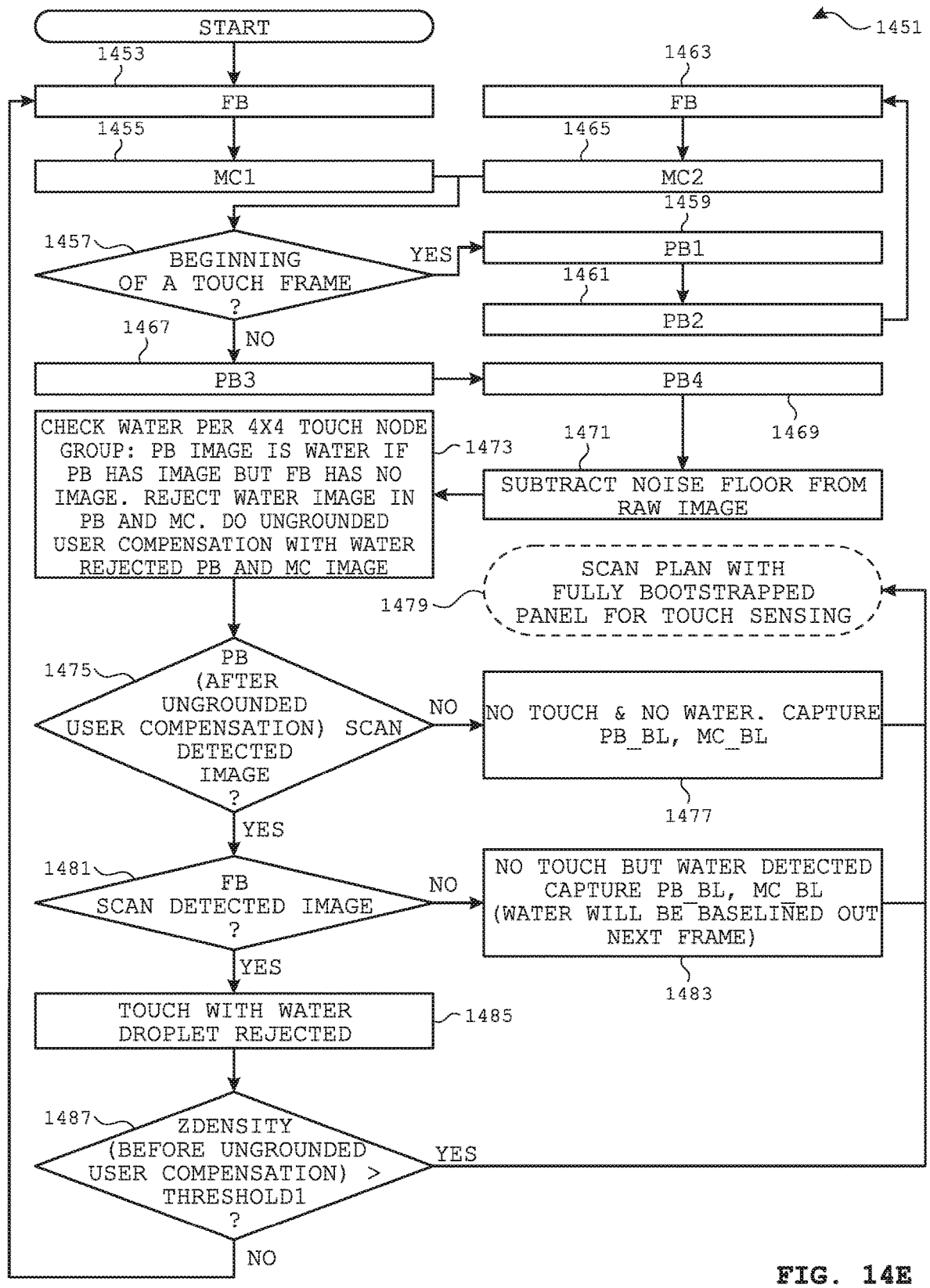
FIG. 14E illustrates an exemplary process corresponding to the water detection and rejection steps of FIG. 14B according to examples of the disclosure.

FIG. 14E illustrates an exemplary process 1451 corresponding to the water detection and rejection steps of FIG. 14B. At 1453, process 1451 can start with a fully bootstrapped scan of the touch screen (e.g., FB 1420). At 1455, a first mutual capacitance scan of the touch screen can be performed (e.g., MC1 1408). At 1457, whether process 1451 is at the beginning of a touch frame (e.g., touch frame 1404) can be determined. In some examples, this can be determined by checking whether one or two fully bootstrapped scans of the touch screen (e.g., FB 1420) have occurred—if one, then the answer to 1457 can be yes, if two, then the answer to 1457 can be no. If process 1451 is at the beginning of a touch frame, a first partially bootstrapped scan of the touch screen can be performed at 1459 (e.g., PB1 1410). At 1461, a second partially bootstrapped scan of the touch screen can be performed (e.g., PB2 1412). At 1463, another fully bootstrapped scan of the touch screen ca be performed (e.g., FB 1420). At 1465, a second mutual capacitance scan of the touch screen can be performed (e.g., MC2 1414).

If process 1451 is not at the beginning of a touch frame at 1457, a third partially bootstrapped scan of the touch screen can be performed at 1467 (e.g., PB3 1416). At 1469, a fourth partially bootstrapped scan of the touch screen can be performed (e.g., PB4 1418).

At 1471, a noise floor can be subtracted from the total partially bootstrapped touch images obtained from the first, second, third and fourth partially bootstrapped scans of the touch screen at 1471. Step 1471 can include subtracting any baseline touch measurements that may be stored from previous scans (e.g., baseline partially bootstrapped touch images, baseline mutual capacitance touch images, baseline fully bootstrapped touch images, etc.).

At 1473, the presence of water on the touch screen can be checked. Specifically, if the partially bootstrapped scans of the touch screen contain portions of touch images that are not contained in the fully bootstrapped scans of the touch screen, then those portions of touch images can be attributed to water present on the touch screen. The portions of the partially bootstrapped touch images attributed to water can be removed from the original partially bootstrapped touch images to give water-rejected partially bootstrapped touch images, and the portions of the partially bootstrapped touch images attributed to the water can be removed from the original mutual capacitance touch images as well to give water-rejected mutual capacitance touch images. The water-rejected partially bootstrapped touch images and the water-rejected mutual capacitance touch images can be used to perform ungrounded user compensation on the original partially bootstrapped touch images to give compensated partially bootstrapped touch images.

At 1475, the compensated partially bootstrapped touch images can be analyzed to determine whether touch activity (whether due to water or actual touch) exists in the touch images. If no touch activity exists, then at 1477, it can be determined that there is no touch and no water on the touch screen, and the above-measured partially bootstrapped touch images and mutual capacitance touch images can be captured/stored to be used as baseline measurements in subsequent scans. Further, the touch screen can return to a fully bootstrapped operation mode in the next touch frame via 1479.

If touch activity exists in the compensated partially bootstrapped touch images at 1475, at 1481, it can be determined whether the fully bootstrapped touch images contain touch activity. If no touch activity exists, then at 1483, it can be determined that there is no actual touch on the touch screen, but there is water on the touch screen. The above-measured partially bootstrapped touch images and mutual capacitance touch images can be captured/stored to be used as baseline measurements that can be used to baseline out the effect of water in subsequent scans. Further, the touch screen can return to a fully bootstrapped operation mode in the next touch frame via 1479.

If touch activity exists in the fully bootstrapped touch images at 1481, at 1485, it can be determined that actual touch activity and water exist on the touch screen. The touch activity due to water can be rejected from the compensated partially bootstrapped touch images by comparing the partially bootstrapped touch images and the fully bootstrapped touch images, as described in this disclosure, and water-rejected touch activity can result, which can be utilized by the system to perform touch-related functions.

At 1487, it can be determined whether the Zdensity for the identified touch activity is great than a first threshold. If the Zdensity is greater than the first threshold, it can be determined that the user interacting with the touch screen is well-grounded, and the touch screen can return to a fully bootstrapped operation mode via 1479. If the Zdensity is not greater than the first threshold, it can be determined that the user interacting with the touch screen is poorly-grounded, and the touch screen can remain in the partially bootstrapped operation mode illustrated in FIG. 14E.

Ungrounded User Compensation

Sometimes, a touch screen can be a partially bootstrapped touch screen in which some of the touch nodes can be driven and sensed, some of the touch nodes can be driven but not sensed, and some of the touch nodes can be grounded, as described above. However, in some examples, a user or object interacting with the touch screen may not be fully grounded, which can cause attenuation of self-capacitance touch signals detected on the touch screen. Ungrounded user compensation can utilize various techniques for reducing the effects of such ungrounded interaction with the touch screen, including with a partially bootstrapped touch screen. Exemplary schemes for performing ungrounded user compensation, as discussed above in this disclosure, will now be described.

Figure 15A:
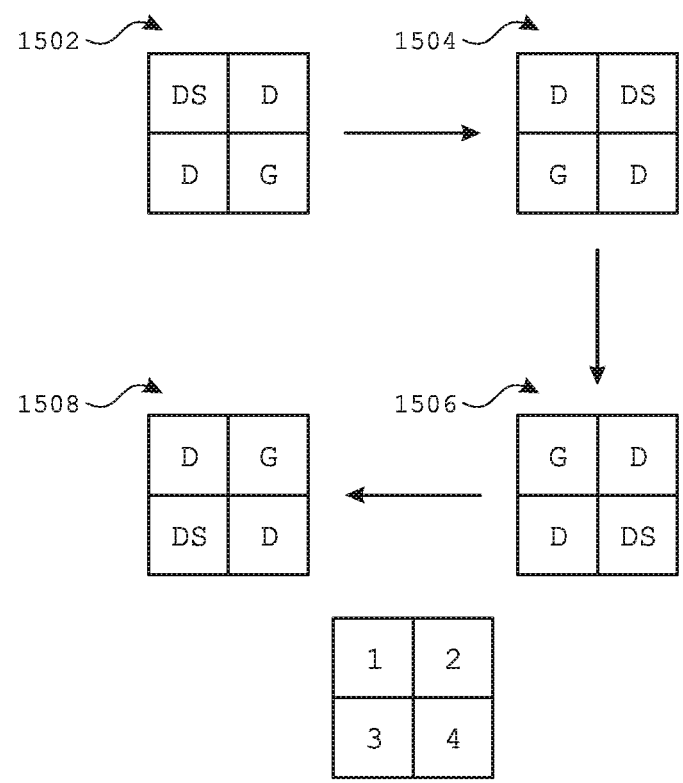
FIG. 15A illustrates an exemplary driving and sensing scheme in which every touch node electrode on the touch screen can be driven and sensed at some point in time according to examples of the disclosure.

FIG. 15A illustrates an exemplary driving and sensing scheme in which every touch node electrode on the touch screen can be driven and sensed at some point in time according to examples of the disclosure. The exemplary driving and sensing scheme of FIG. 15A illustrates the scheme as applied to four touch node electrodes, but it is understood that the scheme can similarly extend to additional touch node electrodes that may exist on the touch screen of the disclosure. For example, every group of four touch node electrodes on the touch screen can be driven, sensed and grounded as described below. In some examples, the groups of four touch node electrodes can be driven, sensed and grounded sequentially, one at a time. In some examples, the groups of four touch node electrodes can be driven, sensed and grounded at least partially simultaneously, more than one at a time. The appropriate numbers of sense circuitry 714, stimulation buffers 716 and/or AC ground buffers 718 (as described with reference to FIG. 7A) that can be utilized can depend on the number of touch node electrodes on the touch screen, and whether the touch screen is to be operated in a single stimulation or multi-stimulation mode.

A first self-capacitance scan can be performed during a first self-capacitance scan time period, the touch node electrodes can be driven and sensed as shown in configuration 1502. Specifically, the top-left touch node electrode can be driven and sensed (DS touch node electrode), the top-right and bottom-left touch node electrodes can be driven but not sensed (D touch node electrodes), and the bottom-right touch node electrode can be grounded (G touch node electrode). The mechanisms for driving, sensing and/or grounding these touch node electrodes can be as described previously, and the details of which will not be repeated here for brevity.

After the first self-capacitance scan time period, a second self-capacitance scan can be performed during a second self-capacitance scan time period. During the second self-capacitance scan time period, the touch node electrodes can be driven and sensed as shown in configuration 1504. Specifically, the top-right touch node electrode can be driven and sensed, the top-left and bottom-right touch node electrodes can be driven but not sensed, and the bottom-left touch node electrode can be grounded. In other words, the driving, sensing and grounding scheme of configuration 1502 can be rotated in a clockwise direction to arrive at configuration 1504. The driving, sensing and grounding scheme of configuration 1504 can similarly be rotated in a clockwise direction to arrive at configuration 1506 during a third self-capacitance scan time period, and again rotated in a clockwise direction to arrive at configuration 1508 during a fourth self-capacitance scan time period. After the four self-capacitance scan time periods have elapsed, all of the touch node electrodes on the touch screen can have been driven and sensed—thus a full touch image can be captured—while the benefits of the partially bootstrapped driving and sensing scheme described previously can continue to be realized. It is understood that other driving and sensing configurations can be utilized to scan every touch node electrode on the touch screen, and that the provided configurations are only one example. For example, the driving and sensing configurations can be rotated in a counter-clockwise direction instead of in a clockwise direction to achieve substantially the same result. Further, in some examples, the DS and G touch node electrodes need not be diagonally disposed, but rather can be adjacent touch node electrodes—the techniques described in this disclosure can be appropriately adjusted for proper operation in such examples. Other spatial arrangements of DS, D and/or G touch node electrodes across the touch screen are similarly contemplated.

Each of the four driving and sensing configurations illustrated in FIG. 15A can be associated with its own attenuation factor. In accordance with the discussion of FIG. 5B, the attenuation factor for configuration 1502 can be expressed as:

$$\alpha_1 = (C_g + \Sigma C_4)/C_{Total} \tag{12}$$

where $C_g$ can represent a capacitance between a finger (or other object) and system ground, $\Sigma C_4$ can be the total self-capacitance associated with touch node electrodes in position 4 (i.e., bottom-right) across the entire touch screen, and $C_{Total}$ can be $C_g+\Sigma C_1+\Sigma C_2+\Sigma C_3+\Sigma C_4$. $\Sigma C_1$, $\Sigma C_2$, and $\Sigma C_3$ can be the total self-capacitance associated with touch node electrodes in positions 1 (top-left), 2 (top-right) and 3 (bottom-left), respectively, across the entire touch screen.

The attenuation factors for configurations 1504, 1506 and 1508, respectively, can be analogously expressed as:

$$\alpha_2 = (C_g+\Sigma C_3)/C_{Total} \quad (13)$$

$$\alpha_3 = (C_g+\Sigma C_2)/C_{Total} \quad (14)$$

$$\alpha_4 = (C_g+\Sigma C_1)/C_{Total} \quad (15)$$

While the attenuation factors for the partially bootstrapped touch screen of the disclosure can be greater than the attenuation factor for a fully bootstrapped touch screen as described with respect to FIG. 5A, it can still be beneficial to correct for the partially bootstrapped attenuation so as to recover a greater magnitude of touch signal from the partially bootstrapped touch screen. Having a greater magnitude of touch signal can make identifying touch activity, and the associated touch processing, easier.

One way of canceling or correcting for the attenuation in the partially bootstrapped touch screen can be to scale the self-capacitance values measured at the touch screen by a scaling factor that can be the inverse of the above attenuation factors. In this way, the attenuation can be effectively completely canceled, and the unattenuated self-capacitance values for each touch node electrode can be substantially recovered—or, the self-capacitance values associated with a well-grounded finger (or object) can be substantially determined. Exemplary scaling factors with which to scale the measured self-capacitance values for each of the driving and sensing configurations illustrated in FIG. 15A can be expressed as:

$$K_1 = 1/\alpha_1 = C_{Total}/(C_g+\Sigma C_4) \quad (16)$$

$$K_2 = 1/\alpha_2 = C_{Total}/(C_g+\Sigma C_3) \quad (17)$$

$$K_3 = 1/\alpha_3 = C_{Total}/(C_g+\Sigma C_2) \quad (18)$$

$$K_4 = 1/\alpha_4 = C_{Total}/(C_g+\Sigma C_1) \quad (19)$$

One difficulty in applying the above scaling can be that each of $C_g$, $\Sigma C_2$, $\Sigma C_3$ and $\Sigma C_4$ can be unknown quantities, as $\Sigma C_1$, $\Sigma C_2$, $\Sigma C_3$ and $\Sigma C_4$ can represent the unattenuated total self-capacitances of touch node electrodes in those respective positions, not the measured (i.e., attenuated) self-capacitances of those touch node electrodes. $C_g$, the capacitance between a finger (or other object) and system ground can also be unknown. As a result, it can be necessary to perform further measurements in addition to the self-capacitance measurements discussed above to be able to determine the above scaling factors.

Figure 15B:
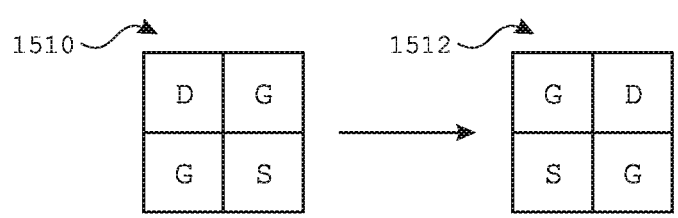
FIG. 15B illustrates an exemplary mutual capacitance driving and sensing scheme that can be utilized with the touch screen of the disclosure.

One way to determine the above scaling factors can be to perform one or more mutual capacitance measurements, in addition to the self-capacitance measurements, using the touch node electrodes of the disclosure. FIG. 15B illustrates an exemplary mutual capacitance driving and sensing scheme that can be utilized with the touch screen of the disclosure. The mutual capacitance driving and sensing scheme can be utilized before, after, or during the self-capacitance driving and sensing scheme described above. Additionally, the exemplary mutual capacitance driving and sensing scheme of FIG. 15B illustrates the scheme as applied to four touch node electrodes, but it is understood that the scheme can similarly extend to additional touch node electrodes that may exist on the touch screen of the disclosure. For example, every group of four touch node electrodes on the touch screen can be driven, sensed and grounded as described below. In some examples, the groups of four touch node electrodes can be driven, sensed and grounded sequentially, one at a time. In some examples, the groups of four touch node electrodes can be driven, sensed and grounded at least partially simultaneously, more than one at a time.

A first mutual capacitance scan can be performed during a first mutual capacitance scan time period. During the first mutual capacitance scan time period, the touch node electrodes of the touch screen can be driven and sensed as shown in configuration 1510. Specifically, the top-left touch node electrode can be driven (D touch node electrode), the bottom-right touch node electrode can be sensed (S touch node electrode), and the top-right and bottom-left touch node electrodes (G touch node electrodes) can be grounded. This configuration 1510 can allow for measurement of a mutual capacitance between the D and S touch node electrodes. The first mutual capacitance measurement obtained during the first mutual capacitance scan time period can be a common mode measurement (i.e., all of the sensed mutual capacitance signals between D and S touch node electrodes across the touch screen can be added together). In some examples, this common mode measurement can be obtained by stimulating multiple D touch node electrodes with a single stimulation buffer, grounding multiple G touch node electrodes with a single AC ground buffer, and/or sensing multiple S touch node electrodes with a single sense amplifier (e.g., sense circuitry). In some examples, touch node electrodes can be driven, sensed and/or grounded by individual stimulation buffers, sense amplifiers and/or AC ground buffers, and the resulting sense outputs can be added together to obtain the common mode mutual capacitance measurement. The mechanisms for driving, sensing and/or grounding the touch node electrodes can be similar to the schemes described previously (e.g., with respect to FIG. 7A), and/or other equivalent schemes, the details of which will not be repeated here for brevity.

After the first mutual capacitance scan time period, a second mutual capacitance scan can be performed during a second mutual capacitance scan time period. During the second mutual capacitance scan time period, the touch node electrodes can be driven and sensed as shown in configuration 1512. Specifically, the top-right touch node electrode can be driven, the bottom-left touch node electrode can be sensed, and the top-left and bottom-right touch node electrodes can be grounded. The second mutual capacitance measurement obtained during the second mutual capacitance scan time period can also be a common mode measurement (i.e., all of the sensed mutual capacitance signals between D and S touch node electrodes across the touch screen can be added together). After the two mutual capacitance scan time periods have elapsed, mutual capacitance measurements between each pair of diagonal touch node electrodes on the touch screen can have been obtained. It is understood that other driving and sensing configurations can be utilized to obtain the mutual capacitance measurements of the examples of the disclosure, and that the provided configurations are only one example. For example, in configuration 1510, instead of driving the top-left touch node electrode and sensing the bottom-right touch node electrode, the bottom-right touch node electrode can be driven, and the top-left touch node electrode can be sensed to achieve substantially the same result. It is understood that "mutual capacitance," as used in this disclosure, can refer to the nominal capacitance seen between multiple components (e.g., between D and S touch node electrodes) of the touch screen, or the change in the nominal capacitance seen between the multiple components of the touch screen, as appropriate.

Figure 15C:
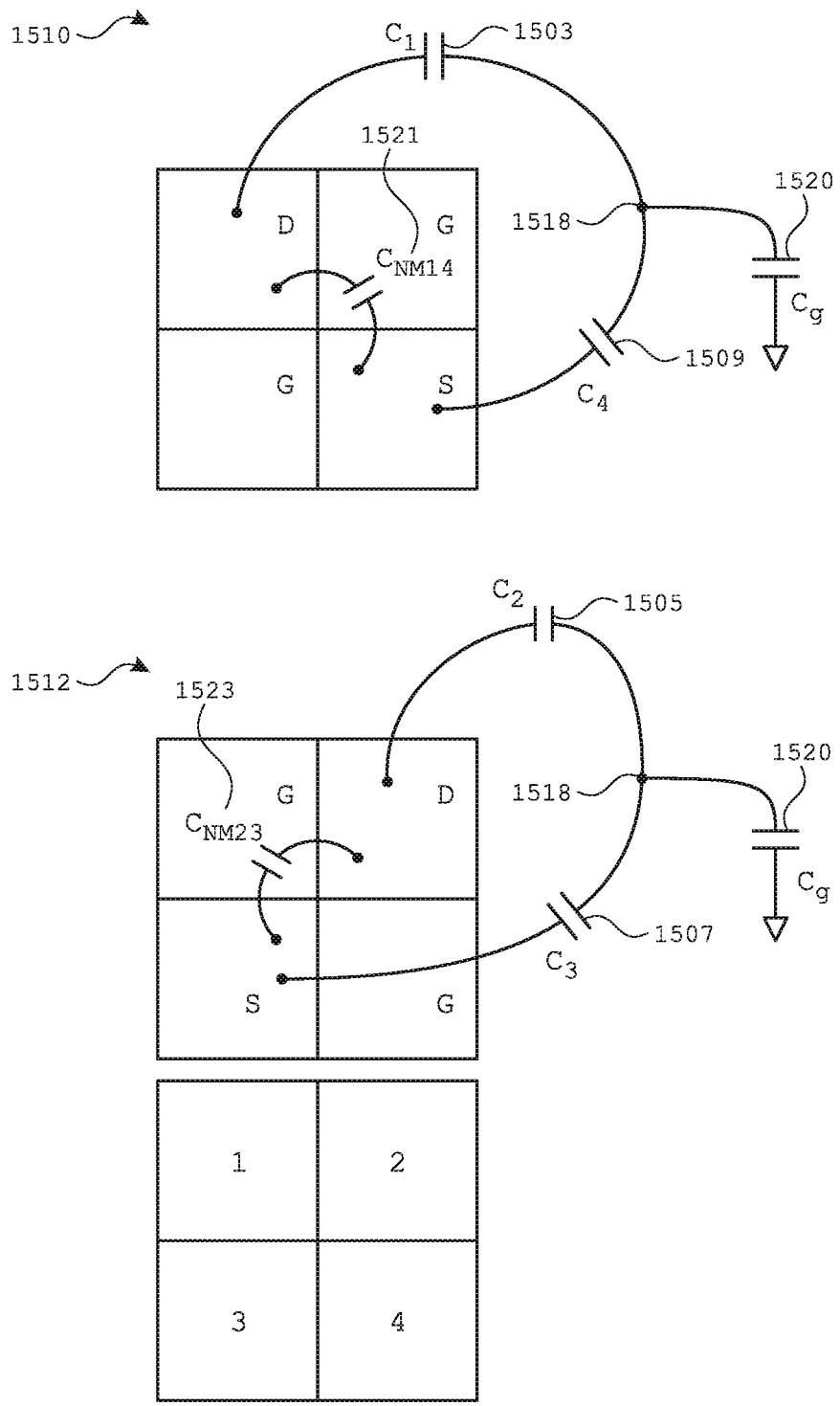
FIG. 15C illustrates various capacitances associated with the mutual capacitance driving and sensing schemes of the disclosure.

FIG. 15C illustrates various capacitances associated with the mutual capacitance driving and sensing schemes of the disclosure. The mutual capacitance driving and sensing schemes illustrated in FIG. 15B can be designed to measure a through-finger (or through-object) mutual capacitance; e.g., a mutual capacitance measurement from a touch node electrode to a finger or object (represented by node 1518), and from the finger or object back to another touch node electrode. However, a direct mutual capacitance that can exist directly between touch node electrodes can also be included in the measured results.

Specifically, the total common mode through-finger mutual capacitance measured in configuration 1510 between the D touch node electrode and the S touch node electrode can be expressed as:

$$\Sigma C_{M14} = (\Sigma C_1 * \Sigma C_4)/C_{Total} - \Sigma C_{NM14} \quad (20)$$

where $\Sigma C_1$ and $\Sigma C_4$ can be the total self-capacitance between touch node electrodes in positions 1 (top-left) and 4 (bottom-right), respectively, and finger 1518 across the entire touch screen. $C_{Total}$ can be $C_g + \Sigma C_1 + \Sigma C_2 + \Sigma C_3 + \Sigma C_4$, as before. Finally, $\Sigma C_{NM14}$ can be the total direct mutual capacitance ("near mutual capacitance") between touch node electrodes in positions 1 and 4.

Similarly, the total common mode through-finger mutual capacitance measured in configuration 1512 between the D touch node electrode and the S touch node electrode can be expressed as:

$$\Sigma C_{M23} = (\Sigma C_2 * \Sigma C_3)/C_{Total} - \Sigma C_{NM23} \quad (21)$$

where $\Sigma C_2$ and $\Sigma C_3$ can be the total self-capacitance between touch node electrodes in positions 2 (top-right) and 3 (bottom-left), respectively, and finger 1518 across the entire touch screen. $\Sigma C_{NM23}$ can be the total direct mutual capacitance ("near mutual capacitance") between touch node electrodes in positions 2 and 3.

Because $\Sigma C_{NM14}$ and $\Sigma C_{NM23}$ can be unwanted terms, approximations for those terms that can be based on electrical capacitance field simulation results can be determined and substituted into equations (20) and (21). These approximations can be based on one or more of the geometry/spacing of the touch node electrodes and the finger (object) position with respect to the touch node electrodes. Specifically, an approximate relationship between the self-capacitances and the mutual capacitance between diagonal touch node electrodes can be determined using electrical capacitance field simulations, and can be expressed as:

$$\Sigma C_{NM14} = \beta * (\Sigma C_1 * \Sigma C_4)/(\Sigma C_1 + \Sigma C_4) \quad (22)$$

$$\Sigma C_{NM23} = \beta * (\Sigma C_2 * \Sigma C_3)/(\Sigma C_2 + \Sigma C_3) \quad (23)$$

where $\beta$ can be approximated as a constant. By substituting equations (22) and (23) into equations (20) and (21), expressions for $\Sigma C_{M14}$ and $\Sigma C_{M23}$ can be obtained that can be functions of $C_1$, $C_2$, $C_3$, and $C_4$. Additionally, actual measurements for $\Sigma C_{M14}$ and $\Sigma C_{M23}$ can be obtained using the above-discussed mutual capacitance measurements.

In addition to the above measurements for $\Sigma C_{M14}$ and $\Sigma C_{M23}$, four self-capacitance measurements can be obtained across the touch screen during the four self-capacitance scan time periods discussed previously. These four measurements can be expressed as:

$$\Sigma XC_1 = \alpha_1 * \Sigma C_1 - \Sigma C_{NM14} \quad (24)$$

$$\Sigma XC_2 = \alpha_2 * \Sigma C_2 - \Sigma C_{NM23} \quad (25)$$

$$\Sigma XC_3 = \alpha_3 * \Sigma C_3 - \Sigma C_{NM23} \quad (26)$$

$$\Sigma XC_4 = \alpha_4 * \Sigma C_4 - \Sigma C_{NM14} \quad (27)$$

where $\Sigma XC_y$ can represent the total self-capacitance measured at touch node electrodes at position y across the touch screen, $\alpha_y$ can be as expressed in equations (17)-(20), $\Sigma C_y$ can be the total self-capacitance at touch node electrodes at position y across the touch screen, and $\Sigma C_{NMxy}$ can represent the total direct mutual capacitance ("near mutual capacitance") between touch node electrodes at positions x and y across the touch screen. This near mutual capacitance term can affect the self-capacitance that can be measured at each touch node electrode, because this mutual capacitance can exist between DS touch node electrodes and G touch node electrodes, and can behave in a manner opposite to that of the self-capacitance (i.e., the absolute value of the near mutual capacitance can increase when the self-capacitance increases, but the change in the mutual capacitance can be opposite in sign to that of the change in self-capacitance). Therefore, the near mutual capacitance term can be included in equations (24)-(27), as shown.

Equations (20)-(21) and (24)-(27) can be manipulated to obtain equations for $\Sigma C_1$, $\Sigma C_2$, $\Sigma C_3$ and $\Sigma C_4$—the unattenuated total self-capacitance at touch node electrodes at positions 1, 2, 3 and 4, respectively. Specifically, these equations can be determined to be:

$$\sum C_1 = \left( \frac{\sum C_{M14}}{\sum XC_4 - \sum C_{M14}} + \beta \cdot \frac{\sum XC_1 - \sum C_{M14}}{\sum XC_1 + \sum XC_4 - 2 \cdot \sum C_{M14}} \right) \cdot \frac{1}{1 - \beta - \beta \cdot \frac{\sum XC_2 + \sum XC_3 - 2 \cdot \sum C_{M23}}{\sum XC_1 + \sum XC_4 - 2 \cdot \sum C_{M14}}} \cdot C_g \quad (28)$$

$$\sum C_2 = \left( \frac{\sum C_{M23}}{\sum XC_3 - \sum C_{M23}} + \beta \cdot \frac{\sum XC_2 - \sum C_{M23}}{\sum XC_2 + \sum XC_3 - 2 \cdot \sum C_{M23}} \right) \cdot \frac{1}{1 - \beta - \beta \cdot \frac{\sum XC_1 + \sum XC_4 - 2 \cdot \sum C_{M14}}{\sum XC_2 + \sum XC_2 - 2 \cdot \sum C_{M23}}} \cdot C_g \quad (29)$$

$$\sum C_3 = \left( \frac{\sum C_{M23}}{\sum XC_2 - \sum C_{M23}} + \beta \cdot \frac{\sum XC_3 - \sum C_{M23}}{\sum XC_3 + \sum XC_3 - 2 \cdot \sum C_{M23}} \right) \cdot \frac{1}{1 - \beta - \beta \cdot \frac{\sum XC_1 + \sum XC_4 - 2 \cdot \sum C_{M14}}{\sum XC_2 + \sum XC_2 - 2 \cdot \sum C_{M23}}} \cdot C_g \quad (30)$$

$$\sum C_4 = \left( \frac{\sum C_{M14}}{\sum XC_1 - \sum C_{M14}} + \beta \cdot \frac{\sum XC_4 - \sum C_{M14}}{\sum XC_1 + \sum XC_4 - 2 \cdot \sum C_{M14}} \right) \cdot \frac{1}{1 - \beta - \beta \cdot \frac{\sum XC_2 + \sum XC_3 - 2 \cdot \sum C_{M23}}{\sum XC_1 + \sum XC_4 - 2 \cdot \sum C_{M14}}} \cdot C_g \quad (31)$$

In equations (28)-(31), the only unknown quantities can be $C_g$ and $\beta$, though $\beta$ can be approximated as an appropriate constant per an electrical capacitance field simulation result. The remaining terms can be known measurement quantities resulting from the four self-capacitance measurements and the two mutual capacitance measurements (e.g., $\Sigma XC_4$, $\Sigma C_{M14}$, etc.). Respective ones of equations (28)-(31) can be substituted into scaling factor equations (16)-(19) to obtain expressions for $K_1$, $K_2$, $K_3$ and $K_4$. For example, equation (31) can be substituted into equation (16) to obtain the following expression for $K_1$:

$$K_1 = \frac{1 + \left(\dfrac{\sum C_{M14}}{\sum XC_1 - \sum C_{M14}} + \dfrac{\sum C_{M14}}{\sum XC_4 - \sum C_{M14}} + \beta\right) \cdot \dfrac{1}{1-\beta-\dfrac{\beta}{p}} + \left(\dfrac{\sum C_{M23}}{\sum XC_2 - \sum C_{M23}} + \dfrac{\sum C_{M23}}{\sum XC_3 - \sum C_{M23}} + \beta\right) \cdot \dfrac{1}{1-\beta-\beta \cdot p}}{1 + \left(\dfrac{\sum C_{M14}}{\sum XC_1 - \sum C_{M14}} + \beta \cdot \dfrac{\sum XC_4 - \sum C_{M14}}{\sum XC_1 + \sum C_4 - 2 \cdot \sum C_{M14}}\right) \cdot \dfrac{1}{1-\beta-\dfrac{\beta}{p}}} \quad (32)$$

where:

$$p = \frac{\sum XC_1 + \sum XC_4 - 2 \cdot \sum C_{M14}}{\sum XC_2 + \sum XC_3 - 2 \cdot \sum C_{M23}} \quad (33)$$

In equation (32), the only unknown quantity can be $\beta$, as $C_g$ from equations (16) and (31) can cancel out of the numerator and the denominator. $\beta$ can be approximated as an appropriate constant per an electrical capacitance field simulation result, and the remaining terms can be known measurement quantities (e.g., $\Sigma XC_4$, $\Sigma C_{M14}$, etc.). Thus, $K_1$ can be determined based on the four self-capacitance and two mutual capacitance measurements obtained on the touch screen of the disclosure. A self-capacitance measurement obtained from a touch node electrode at position 1 on the touch screen can then be scaled by $K_1$ to effectively cancel the attenuation that can result from partially bootstrapping the touch screen. Self-capacitance measurements obtained from touch node electrodes at positions 2, 3 and 4 on the touch screen can analogously be scaled by the appropriate scaling factors represented by the following equations to effectively cancel their respective attenuation:

$$K_2 = \frac{1 + \left(\dfrac{\sum C_{M14}}{\sum XC_1 - \sum C_{M14}} + \dfrac{\sum C_{M14}}{\sum XC_4 - \sum C_{M14}} + \beta\right) \cdot \dfrac{1}{1-\beta-\dfrac{\beta}{p}} + \left(\dfrac{\sum C_{M23}}{\sum XC_2 - \sum C_{M23}} + \dfrac{\sum C_{M23}}{\sum XC_3 - \sum C_{M23}} + \beta\right) \cdot \dfrac{1}{1-\beta-\beta \cdot p}}{1 + \left(\dfrac{\sum C_{M23}}{\sum XC_2 - \sum C_{M23}} + \beta \cdot \dfrac{\sum XC_3 - \sum C_{M23}}{\sum XC_2 + \sum XC_3 - 2 \cdot \sum C_{M23}}\right) \cdot \dfrac{1}{1-\beta-\beta \cdot p}} \quad (34)$$

$$K_3 = \frac{1 + \left(\dfrac{\sum C_{M14}}{\sum XC_1 - \sum C_{M14}} + \dfrac{\sum C_{M14}}{\sum XC_4 - \sum C_{M14}} + \beta\right) \cdot \dfrac{1}{1-\beta-\dfrac{\beta}{p}} + \left(\dfrac{\sum C_{M23}}{\sum XC_2 - \sum C_{M23}} + \dfrac{\sum C_{M23}}{\sum XC_3 - \sum C_{M23}} + \beta\right) \cdot \dfrac{1}{1-\beta-\beta \cdot p}}{1 + \left(\dfrac{\sum C_{M23}}{\sum XC_3 - \sum C_{M23}} + \beta \cdot \dfrac{\sum XC_2 - \sum C_{M23}}{\sum XC_2 + \sum XC_3 - 2 \cdot \sum C_{M23}}\right) \cdot \dfrac{1}{1-\beta-\beta \cdot p}} \quad (35)$$

$$K_4 = \frac{1 + \left(\dfrac{\sum C_{M14}}{\sum XC_1 - \sum C_{M14}} + \dfrac{\sum C_{M14}}{\sum XC_4 - \sum C_{M14}} + \beta\right) \cdot \dfrac{1}{1-\beta-\dfrac{\beta}{p}} + \left(\dfrac{\sum C_{M23}}{\sum XC_2 - \sum C_{M23}} + \dfrac{\sum C_{M23}}{\sum XC_3 - \sum C_{M23}} + \beta\right) \cdot \dfrac{1}{1-\beta-\beta \cdot p}}{1 + \left(\dfrac{\sum C_{M14}}{\sum XC_4 - \sum C_{M14}} + \beta \cdot \dfrac{\sum XC_1 - \sum C_{M14}}{\sum XC_1 + \sum XC_4 - 2 \cdot \sum C_{M14}}\right) \cdot \dfrac{1}{1-\beta-\dfrac{\beta}{p}}} \quad (36)$$

Alternatively to scaling touch node electrodes at respective positions with individual scaling factors, in some examples, all self-capacitance measurements obtained at all touch node electrodes on the touch screen can be scaled by an average scaling factor. The average scaling factor can provide sufficient accuracy such that individualized scaling factors may not be required. The average scaling factor of the partially bootstrapped touch screen can be expressed as:

$$K_{ave} = \frac{1}{\dfrac{\alpha_1 + \alpha_2 + \alpha_3 + \alpha_4}{4}} = \frac{4}{\dfrac{3}{\left(\dfrac{\sum C_{M14}}{\sum XC_1 - \sum C_{M14}} + \dfrac{\sum C_{M14}}{\sum XC_4 - \sum C_{M14}} + \dfrac{\sum C_{M23}}{\sum XC_2 - \sum C_{M23}} + \dfrac{\sum C_{M23}}{\sum XC_3 - \sum C_{M23}} + 1\right) \cdot \dfrac{1}{1-2\cdot\beta}} + 1} \quad (37)$$

As described above, attenuation of touch signals that may be detected on the touch screen of the disclosure can be effectively canceled by scaling the touch signals with scaling factors, which can be determined using four self-capacitance measurements and two mutual capacitance measurements. These measurements can be captured using any combination of the fully bootstrapped, partially bootstrapped and/or mutual capacitance scans described above in the context of water rejection.

The above ungrounded user compensation schemes can apply to a partially bootstrapped touch screen. In some examples, ungrounded user compensation may be required for a fully bootstrapped touch screen (e.g., in process 1451 in FIG. 14D). Ungrounded user compensation for a fully bootstrapped touch screen may be performed in a manner similar to ungrounded user compensation for a partially bootstrapped touch screen, as will be described below.

Specifically, referring back to FIG. 5A, the attenuation factor for a fully bootstrapped touch screen can be expressed by equation (2), and the effective self-capacitance sensed at any one touch node electrode can be expressed by equation (4), both reproduced below:

$$\alpha = C_g / C_{Total} \tag{2}$$

$$C_{Eff,X} = \alpha * C_X \tag{4}$$

where $C_{Total} = C_g + C_1 + C_2 + C_3 + C_4$ (equation (3)), and $C_X$ can be $C_1$ 503, $C_2$ 505, $C_3$ 507 or $C_4$ 509. Thus, to substantially cancel the above attenuation, it can be beneficial to scale self-capacitance values of touch nodes by a scaling factor of $1/\alpha$, or $C_{Total}/C_g$.

As before, a mutual capacitance measurement can be used to determine the appropriate fully bootstrapped scaling factor, above. Specifically, the mutual capacitance scans of FIGS. 15B-15C can be utilized to obtain a through-finger mutual capacitance measurement that can be expressed as:

$$\Sigma C_M = (\Sigma C_{FD} * \Sigma C_{FS}) / C_{Total} \tag{38}$$

where $\Sigma C_{FD}$ can be the sum of all drive touch node electrodes-to-finger capacitances (e.g., $\Sigma C_1$ in configuration 1510 in FIG. 15C), and $\Sigma C_{FS}$ can be the sum of all sense touch node electrodes-to-finger capacitances (e.g., $\Sigma C_4$ in configuration 1512 in FIG. 15C). Equation (38) can be combined with the effective self-capacitance measurements obtained during the fully bootstrapped touch screen scans (e.g., equation (4)) to provide an equation for the fully bootstrapped scaling factor:

$$K_{FB} = C_{Total} / C_g = \Sigma C_M / \Sigma C_{Eff,FS} + \Sigma C_M / \Sigma C_{Eff,FD} + 1 \tag{39}$$

Because the mutual capacitance measurements above may contain direct mutual capacitance effects between diagonal touch node electrodes (as discussed previously), the fully bootstrapped scaling factor above may contain some non-ideality, which can be expressed as:

$$K_{FB,ideal} = K_{FB,non-ideal} / (1 - \beta) \tag{40}$$

where $\beta$ can be expressed as:

$$\beta = \Sigma C_{NM} / ((\Sigma C_{FS} * \Sigma C_{FD}) / (\Sigma C_{FS} + \Sigma C_{FD})) \tag{41}$$

where $\Sigma C_{NM}$ can be the total direct mutual capacitance ("near mutual capacitance") between touch node electrodes across the touch screen (e.g., between touch node electrodes 1 and 4 in configuration 1510 in FIG. 15C). Field software simulations can be used to show that the dependence of $\beta$ on exact touch position can be small, and thus need not be considered above, or can be determined using field software simulations.

Based on equation (38), the through-finger mutual capacitances of the two mutual capacitance configurations illustrated in FIG. 15C can be expressed as:

$$C_{M14} = (C_1 * C_4) / C_{Total} \tag{42}$$

$$C_{M23} = (C_2 * C_3) / C_{Total} \tag{43}$$

Further, based on equations (2) and (4), the effective self-capacitance ($XC_y$) measured at each of the touch nodes in FIG. 5A can be expressed as:

$$XC_1 = C_g / C_{Total} * C_1 \tag{44}$$

$$XC_2 = C_g / C_{Total} * C_2 \tag{45}$$

$$XC_3 = C_g / C_{Total} * C_3 \tag{46}$$

$$XC_4 = C_g / C_{Total} * C_4 \tag{47}$$

Combining the fully bootstrapped effective measurements and the mutual capacitance measurements from above (e.g., the scan of FIG. 5A and the scans of FIG. 15C yielding equations (42)-(47)), it can be determined that the ideal fully bootstrapped scaling factor can be expressed as:

$$K_{FB,ideal} = \Sigma C_{M14} / \Sigma X C_4 + \Sigma C_{M14} / \Sigma X C_1 + \Sigma C_{M23} / \Sigma X C_3 + \Sigma C_{M23} / \Sigma X C_2 + 1 \tag{48}$$

where $\Sigma X C_y$ can represent the total measured self-capacitance between touch node electrodes across the touch screen and a finger during the fully bootstrapped scan, and $\Sigma C_{Myz}$ can represent the total measured through-finger mutual capacitance across the touch screen.

Non-ideality can be addressed through $\beta$, as discussed above in equation (40). Specifically, equation (41) for $\beta$ can be expressed as follows for the configurations illustrated in FIG. 15C:

$$\beta = \Sigma C_{NM14} / ((\Sigma C_4 * \Sigma C_1) / (\Sigma C_4 + \Sigma C_1)) + \Sigma C_{NM23} / ((\Sigma C_3 * \Sigma C_2) / (\Sigma C_3 + \Sigma C_2)) \tag{49}$$

Therefore, using the above relationships, ungrounded user compensation for a fully bootstrapped touch screen can be performed.

Thus, the examples of the disclosure provide one or more configurations for detecting and rejecting water on a touch screen, and doing so with or without ungrounded user compensation.

Therefore, according to the above, some examples of the disclosure are directed to a touch sensor panel comprising: a plurality of touch node electrodes; and a touch controller configured to: drive and sense the plurality of touch node electrodes in a fully bootstrapped configuration to obtain a fully bootstrapped touch image, drive and sense the plurality of touch node electrodes in a second configuration, different from the fully bootstrapped configuration, to obtain a second touch image, the second touch image including an effect of water on the touch sensor panel, and determine a final touch image based on the fully bootstrapped touch image and the second touch image, the final touch image compensated for the effect of the water on the touch sensor panel. Additionally or alternatively to one or more of the examples disclosed above, in some examples, the second configuration comprises a mutual capacitance configuration. Additionally or alternatively to one or more of the examples disclosed above, in some examples, the second configuration comprises a partially bootstrapped configuration. Additionally or alternatively to one or more of the examples disclosed above, in some examples, the final touch image comprises a touch image of a first portion of the touch sensor panel, the touch sensor panel including the first portion of the touch sensor panel and a second portion of the touch sensor panel.

Additionally or alternatively to one or more of the examples disclosed above, in some examples, the first portion of the touch sensor panel includes the plurality of touch node electrodes. Additionally or alternatively to one or more of the examples disclosed above, in some examples, the first portion of the touch sensor panel includes a first portion of the plurality of touch node electrodes, the plurality of touch node electrodes including the first portion of the plurality of touch node electrodes and a second portion of the plurality of touch node electrodes. Additionally or alternatively to one or more of the examples disclosed above, in some examples, the touch controller is configured to drive and sense the plurality of touch node electrodes in the fully bootstrapped configuration and drive and sense the plurality of touch node electrodes in the second configuration during a touch frame. Additionally or alternatively to one or more of the examples disclosed above, in some examples, the touch controller is configured to drive and sense the plurality of touch node electrodes in a reduced-resolution fully bootstrapped configuration. Additionally or alternatively to one or more of the examples disclosed above, in some examples, the touch controller is configured to drive and sense the plurality of touch node electrodes in a reduced-resolution second configuration. Additionally or alternatively to one or more of the examples disclosed above, in some examples, the touch controller is configured to detect touch activity on the touch sensor panel and determine the second configuration based on the touch activity.

Some examples of the disclosure are directed to a method comprising: driving and sensing a plurality of touch node electrodes on a touch sensor panel in a fully bootstrapped configuration to obtain a fully bootstrapped touch image; driving and sensing the plurality of touch node electrodes in a second configuration, different from the fully bootstrapped configuration, to obtain a second touch image, the second touch image including an effect of water on the touch sensor panel; and determining a final touch image based on the fully bootstrapped touch image and the second touch image, the final touch image compensated for the effect of the water on the touch sensor panel. Additionally or alternatively to one or more of the examples disclosed above, in some examples, the second configuration comprises a mutual capacitance configuration. Additionally or alternatively to one or more of the examples disclosed above, in some examples, the second configuration comprises a partially bootstrapped configuration. Additionally or alternatively to one or more of the examples disclosed above, in some examples, the final touch image comprises a touch image of a first portion of the touch sensor panel, the touch sensor panel including the first portion of the touch sensor panel and a second portion of the touch sensor panel. Additionally or alternatively to one or more of the examples disclosed above, in some examples, the first portion of the touch sensor panel includes the plurality of touch node electrodes. Additionally or alternatively to one or more of the examples disclosed above, in some examples, the first portion of the touch sensor panel includes a first portion of the plurality of touch node electrodes, the plurality of touch node electrodes including the first portion of the plurality of touch node electrodes and a second portion of the plurality of touch node electrodes. Additionally or alternatively to one or more of the examples disclosed above, in some examples, driving and sensing the plurality of touch node electrodes in the fully bootstrapped configuration and driving and sensing the plurality of touch node electrodes in the second configuration are during a touch frame. Additionally or alternatively to one or more of the examples disclosed above, in some examples, driving and sensing the plurality of touch node electrodes in the fully bootstrapped configuration comprises driving and sensing the plurality of touch node electrodes in a reduced-resolution fully bootstrapped configuration. Additionally or alternatively to one or more of the examples disclosed above, in some examples, driving and sensing the plurality of touch node electrodes in the second configuration comprises driving and sensing the plurality of touch node electrodes in a reduced-resolution second configuration. Additionally or alternatively to one or more of the examples disclosed above, in some examples, the method further comprises: detecting touch activity on the touch sensor panel; and determining the second configuration based on the touch activity.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
a plurality of touch node electrodes; and
a touch controller configured to:
drive and sense the plurality of touch node electrodes in a fully bootstrapped configuration to obtain a fully bootstrapped touch image, wherein driving and sensing the plurality of touch node electrodes in the fully bootstrapped configuration comprises simultaneously driving and sensing each of the plurality of touch node electrodes,
drive and sense the plurality of touch node electrodes in a second configuration, different from the fully bootstrapped configuration, to obtain a second touch image, the second touch image including an effect of water on the touch sensor panel, wherein driving and sensing the plurality of touch node electrodes in the second configuration comprises simultaneously:
driving and sensing a self-capacitance of at least a first touch node electrode of the plurality of touch node electrodes;
driving, without sensing, at least a second touch node electrode of the plurality of touch node electrodes; and
grounding at least a third touch node electrode of the plurality of touch node electrodes, and
determine a final touch image based on the fully bootstrapped touch image and the second touch image, the final touch image compensated for the effect of the water on the touch sensor panel.

2. The touch sensor panel of claim 1, wherein the second configuration comprises a partially bootstrapped configuration.

3. The touch sensor panel of claim 1, wherein the final touch image comprises a touch image of a first portion of the touch sensor panel, the touch sensor panel including the first portion of the touch sensor panel and a second portion of the touch sensor panel.

4. The touch sensor panel of claim 3, wherein the first portion of the touch sensor panel includes the plurality of touch node electrodes.

5. The touch sensor panel of claim 3, wherein the first portion of the touch sensor panel includes a first portion of the plurality of touch node electrodes, the plurality of touch node electrodes including the first portion of the plurality of touch node electrodes and a second portion of the plurality of touch node electrodes.

6. The touch sensor panel of claim 1, wherein the touch controller is configured to drive and sense the plurality of touch node electrodes in the fully bootstrapped configuration and drive and sense the plurality of touch node electrodes in the second configuration during a touch frame.

7. The touch sensor panel of claim 1, wherein the touch controller is configured to drive and sense the plurality of touch node electrodes in a reduced-resolution fully bootstrapped configuration.

8. The touch sensor panel of claim 1, wherein the touch controller is configured to drive and sense the plurality of touch node electrodes in a reduced-resolution second configuration.

9. The touch sensor panel of claim 1, wherein the touch controller is configured to detect touch activity on the touch sensor panel and determine the second configuration based on the touch activity.

10. A method comprising:
   driving and sensing a plurality of touch node electrodes on a touch sensor panel in a fully bootstrapped configuration to obtain a fully bootstrapped touch image, wherein driving and sensing the plurality of touch node electrodes in the fully bootstrapped configuration comprises simultaneously driving and sensing each of the plurality of touch node electrodes;
   driving and sensing the plurality of touch node electrodes in a second configuration, different from the fully bootstrapped configuration, to obtain a second touch image, the second touch image including an effect of water on the touch sensor panel, wherein driving and sensing the plurality of touch node electrodes in the second configuration comprises simultaneously:
      driving and sensing a self-capacitance of at least a first touch node electrode of the plurality of touch node electrodes,
      driving, without sensing, at least a second touch node electrode of the plurality of touch node electrodes, and
      grounding at least a third touch node electrode of the plurality of touch node electrode; and
   determining a final touch image based on the fully bootstrapped touch image and the second touch image, the final touch image compensated for the effect of the water on the touch sensor panel.

11. The method of claim 10, wherein the second configuration comprises a partially bootstrapped configuration.

12. The method of claim 10, wherein the final touch image comprises a touch image of a first portion of the touch sensor panel, the touch sensor panel including the first portion of the touch sensor panel and a second portion of the touch sensor panel.

13. The method of claim 12, wherein the first portion of the touch sensor panel includes the plurality of touch node electrodes.

14. The method of claim 12, wherein the first portion of the touch sensor panel includes a first portion of the plurality of touch node electrodes, the plurality of touch node electrodes including the first portion of the plurality of touch node electrodes and a second portion of the plurality of touch node electrodes.

15. The method of claim 10, wherein driving and sensing the plurality of touch node electrodes in the fully bootstrapped configuration and driving and sensing the plurality of touch node electrodes in the second configuration are during a touch frame.

16. The method of claim 10, wherein driving and sensing the plurality of touch node electrodes in the fully bootstrapped configuration comprises driving and sensing the plurality of touch node electrodes in a reduced-resolution fully bootstrapped configuration.

17. The method of claim 10, wherein driving and sensing the plurality of touch node electrodes in the second configuration comprises driving and sensing the plurality of touch node electrodes in a reduced-resolution second configuration.

18. The method of claim 10, further comprising:
   detecting touch activity on the touch sensor panel; and
   determining the second configuration based on the touch activity.

19. A touch sensor panel comprising:
   a plurality of touch node electrodes; and
   a touch controller configured to:
      drive and sense the plurality of touch node electrodes in a fully bootstrapped configuration to obtain a fully bootstrapped touch image, wherein driving and sensing the plurality of touch node electrodes in the fully bootstrapped configuration comprises simultaneously driving and sensing each of the plurality of touch node electrodes,
      drive and sense the plurality of touch node electrodes in a second configuration, different from the fully bootstrapped configuration, to obtain a second touch image, the second touch image including an effect of water on the touch sensor panel, wherein driving and sensing the plurality of touch node electrodes in the second configuration comprises simultaneously:
         driving at least a first touch node electrode of the plurality of touch node electrodes;
         grounding at least a second touch node electrode of the plurality of touch node electrodes, wherein the second touch node electrode is adjacent to the first touch node electrode; and
         sensing at least a third touch node electrode of the plurality of touch node electrodes, wherein the third touch node electrode is diagonal to the first touch node electrode and adjacent to the second touch node electrode; and
      determine a final touch image based on the fully bootstrapped touch image and the second touch image, the final touch image compensated for the effect of the water on the touch sensor panel.

* * * * *